US010445821B2

United States Patent
Graham et al.

(10) Patent No.: US 10,445,821 B2
(45) Date of Patent: Oct. 15, 2019

(54) PLANOGRAM AND REALOGRAM ALIGNMENT

(71) Applicants: Jamey Graham, San Jose, CA (US); Michael Griffin, Redwood City, CA (US); Tiffany Romain, Oakland, CA (US); Daniel G Van Olst, Menlo Partk, CA (US)

(72) Inventors: Jamey Graham, San Jose, CA (US); Michael Griffin, Redwood City, CA (US); Tiffany Romain, Oakland, CA (US); Daniel G Van Olst, Menlo Partk, CA (US)

(73) Assignee: Ricoh Co., Ltd., Tokyo (JP)

( * ) Notice: Subject to any disclaimer, the term of this patent is extended or adjusted under 35 U.S.C. 154(b) by 666 days.

(21) Appl. No.: 15/164,832

(22) Filed: May 25, 2016

(65) Prior Publication Data

US 2017/0178227 A1    Jun. 22, 2017

Related U.S. Application Data

(60) Provisional application No. 62/269,899, filed on Dec. 18, 2015.

(51) Int. Cl.
*G06Q 30/00*    (2012.01)
*G06Q 30/06*    (2012.01)
*G06Q 10/08*    (2012.01)

(52) U.S. Cl.
CPC ....... *G06Q 30/0643* (2013.01); *G06Q 10/087* (2013.01)

(58) Field of Classification Search
CPC ....................................... G06Q 30/0601–0645
(Continued)

(56) References Cited

U.S. PATENT DOCUMENTS

| 5,848,399 A | 12/1998 | Burke |
| 7,949,568 B2 | 5/2011 | Fano et al. |

(Continued)

FOREIGN PATENT DOCUMENTS

EP    2913779 A1    9/2015

OTHER PUBLICATIONS

Bossa nova robotics IP inc.; researchers submit patent application, "data reduction in a bar code reading robot shelf monitoring system", for approval (USPTO 20190034864). (Feb. 18, 2019). Journal of Robotics & Machine Learning Retrieved from https://dialog.proquest.com/professional/docview/2183806579?accountid=161.*

(Continued)

*Primary Examiner* — Resha Desai
*Assistant Examiner* — Ashley D Preston
(74) *Attorney, Agent, or Firm* — Patent Law Works LLP

(57) ABSTRACT

The disclosure includes a system and method for aligning a realogram and a planogram. An alignment module of an image recognition application receives a realogram, the realogram including information about product recognitions, and a planogram corresponding to the realogram. The alignment module also generates a planogram brand chunk in the planogram, the planogram brand chunk grouping a plurality of planogram product facings belonging to a same brand, and a realogram brand chunk in the realogram based on the planogram brand chunk. The alignment module additionally identifies a planogram product facing in the planogram brand chunk and a realogram product facing in the realogram brand chunk and aligns the planogram product facing with the realogram product facing.

20 Claims, 71 Drawing Sheets

(58) Field of Classification Search
USPC .................................................. 705/26.1–27.2
See application file for complete search history.

(56) References Cited

U.S. PATENT DOCUMENTS

| | | |
|---|---|---|
| 8,725,595 B1 | 5/2014 | Siegel et al. |
| 2003/0033217 A1 | 2/2003 | Cutlip |
| 2003/0154141 A1 | 8/2003 | Capazario et al. |
| 2004/0133483 A1 | 7/2004 | Potter et al. |
| 2005/0021561 A1 | 1/2005 | Noonan |
| 2005/0203790 A1 | 9/2005 | Cohen |
| 2005/0256726 A1 | 11/2005 | Benson et al. |
| 2006/0190341 A1 | 8/2006 | Riley et al. |
| 2007/0288296 A1 | 12/2007 | Lewis |
| 2008/0077511 A1 | 3/2008 | Zimmerman |
| 2008/0144934 A1 | 6/2008 | Raynaud |
| 2008/0147475 A1* | 6/2008 | Gruttadauria ........ G06Q 10/087 705/7.31 |
| 2008/0208719 A1 | 8/2008 | Sharma et al. |
| 2008/0306787 A1 | 12/2008 | Hamilton et al. |
| 2009/0059270 A1 | 3/2009 | Opalach et al. |
| 2009/0063306 A1 | 3/2009 | Fano et al. |
| 2009/0063307 A1 | 3/2009 | Groenovelt et al. |
| 2009/0192921 A1 | 7/2009 | Hicks |
| 2010/0070388 A1 | 3/2010 | Spindler et al. |
| 2010/0171826 A1 | 7/2010 | Hamilton et al. |
| 2010/0217681 A1 | 8/2010 | Geikie et al. |
| 2011/0011936 A1* | 1/2011 | Morandi ................. G06K 9/00 235/454 |
| 2011/0050396 A1 | 3/2011 | Chaves |
| 2011/0295764 A1 | 12/2011 | Cook et al. |
| 2012/0022913 A1 | 1/2012 | Volkmann et al. |
| 2012/0223943 A1 | 9/2012 | Williams et al. |
| 2012/0323620 A1 | 12/2012 | Hofman et al. |
| 2012/0324515 A1 | 12/2012 | Dashevskiy et al. |
| 2013/0076726 A1 | 3/2013 | Ferrara et al. |
| 2013/0119138 A1 | 5/2013 | Winkel |
| 2013/0173435 A1 | 7/2013 | Cozad, Jr. |
| 2013/0204750 A1 | 8/2013 | Nordman et al. |
| 2013/0226825 A1 | 8/2013 | Hathaway et al. |
| 2014/0045515 A1 | 2/2014 | Austin et al. |
| 2014/0058781 A1 | 2/2014 | Padmanabhan et al. |
| 2014/0129354 A1 | 5/2014 | Soon-Shiong |
| 2014/0201040 A1 | 7/2014 | Birch |
| 2014/0304124 A1 | 10/2014 | Amelmann et al. |
| 2015/0046299 A1 | 2/2015 | Yan |
| 2015/0052027 A1 | 2/2015 | Pavani et al. |
| 2015/0088703 A1 | 3/2015 | Yan |
| 2015/0123973 A1 | 5/2015 | Larsen |
| 2015/0220784 A1 | 8/2015 | Gold |
| 2015/0262116 A1 | 9/2015 | Katircioglu et al. |
| 2015/0324725 A1 | 11/2015 | Roesbery et al. |
| 2016/0119540 A1 | 4/2016 | Wu |
| 2016/0224857 A1 | 8/2016 | Zhang et al. |
| 2016/0371634 A1 | 12/2016 | Kumar et al. |

OTHER PUBLICATIONS

Leonardo Weiss Ferreira Chaves et al. "Finding Misplaced items in Retail by Clustering RFID Data" dated Mar. 22, 2010, 12 pages.
European Search Report for EP Application No. 16201851.9-1901 dated May 30, 2017, 10 pages.

* cited by examiner

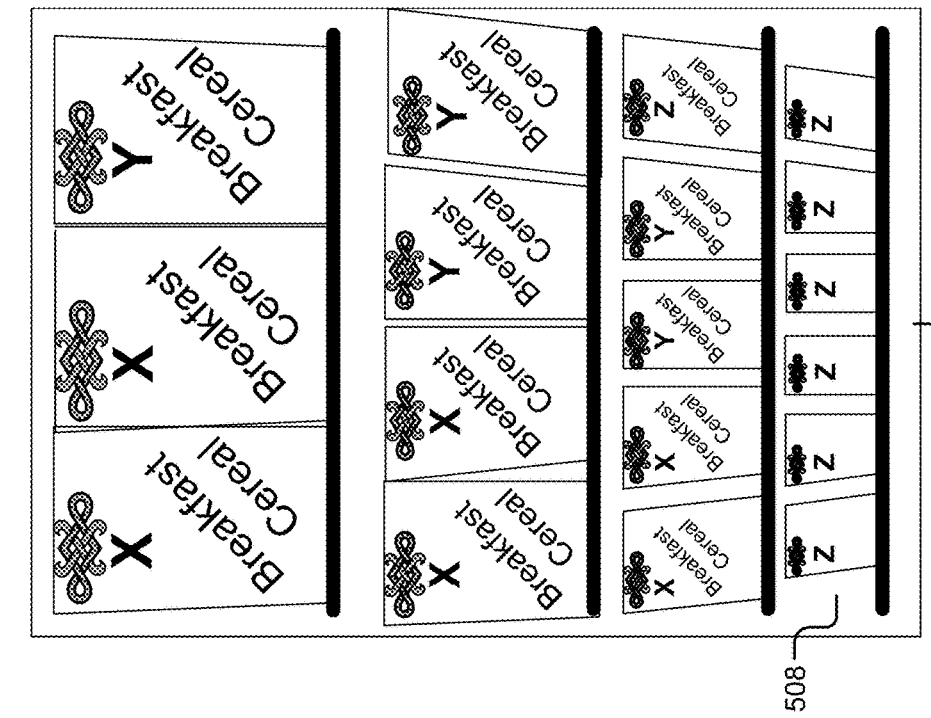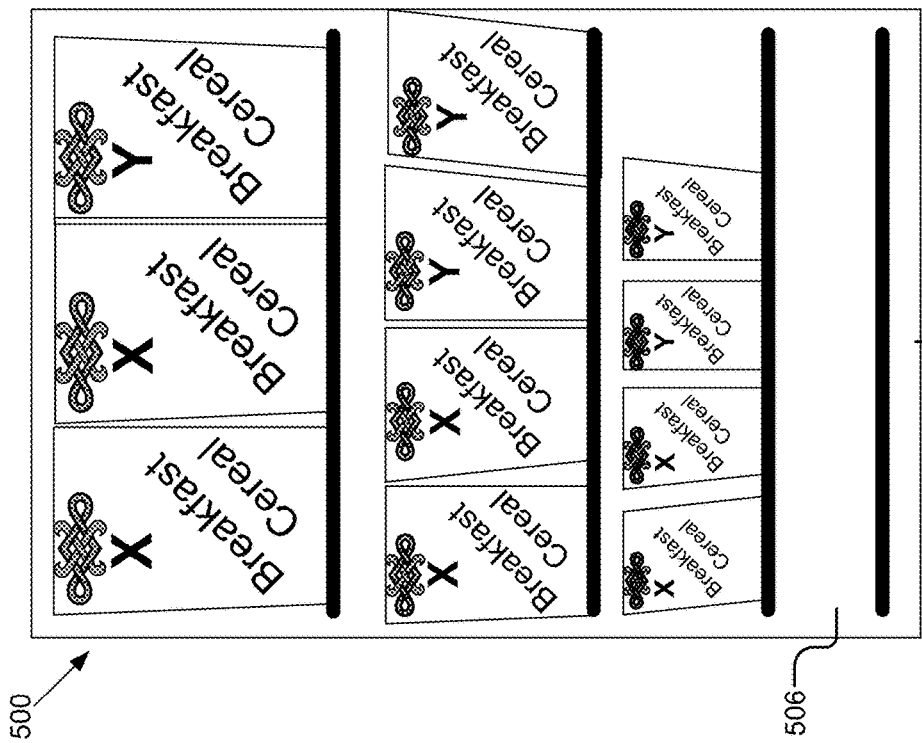
Figure 5

Share of shelf for job

| Brand | POG (Ideal) | REAL | Delta |
|---|---|---|---|
| XXXXXXX | 17.285418 | 16.597479 | 0.688 |
| XXX | 0.330742 | 0.551155 | 0.22 |
| XXXXXX | 14.620726 | 16.912154 | 2.291 |
| XXXXXXXX | 0.833107 | 0.767595 | 0.066 |
| XXXX | 5.068824 | 6.117992 | 1.049 |
| XXXXX | 0.143831 | 0 | |
| XXXXXXX | 0.323098 | 0.278551 | 0.044 |
| XXXXXXXXX | 1.164544 | 0.930361 | 0.234 |
| XXX | 2.298515 | 2.069341 | 0.229 |
| XXXXXXXX | 5.1661 | 5.163842 | 0.002 |
| XXXXXX | 0.288356 | 0 | |
| XXXXXX | 1.075605 | 0.41217 | 0.663 |
| XXXXXXXXXX | 3.994608 | 4.66058 | 0.666 |
| XXXXXXX | 17.573079 | 16.429395 | 1.144 |
| XXXXXXXXXX | 0.165371 | 0 | |
| XXXXX | 0.432882 | 0.593865 | 0.161 |
| XXXXXXXXXXXX | 0.591305 | 0.558407 | 0.033 |
| XXXXXXX | 2.049069 | 1.491465 | 0.558 |
| XXXXXXXXXX | 9.976443 | 9.374411 | 0.602 |
| XXXXXXX | 13.345701 | 14.410152 | 1.064 |
| XXXXXX | 2.896769 | 2.321485 | 0.575 |
| XXX | 0.175793 | 0.157819 | 0.018 |

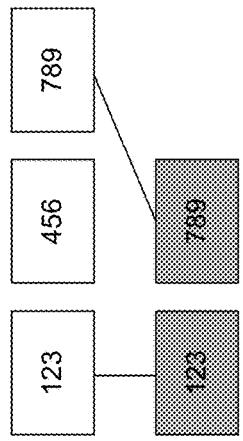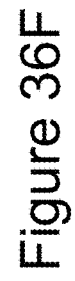

PLANOGRAM AND REALOGRAM ALIGNMENT

CROSS REFERENCE TO RELATED APPLICATIONS

The present application claims priority, under 35 U.S.C. § 119, of U.S. Provisional Patent Application No. 62/269,899, filed Dec. 18, 2015 and entitled "Suggestion Generation Based on Planogram Matching," which is incorporated by reference in its entirety.

BACKGROUND

1. Field of the Invention

The specification generally relates to analyzing and extracting data and product information from an image recognition result, comparing that data and the product information to a planogram to determine differences, and generating or providing a suggestion, for example a corrective action, based on the differences. In particular, the specification relates to a system and method for comparing an image recognition result and a planogram and providing corrective actions.

2. Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity of objects are placed to optimize profits or other parameters. However, presentation and maintenance of adequate levels of stock on shelves, racks and displays stands is a labor-intensive effort, thereby making enforcement of planograms difficult. In addition, planograms and the state of a real world retail environment (e.g., where products are placed on a shelf) change over time, which makes compliance with a planogram in the actual retail environment more difficult. An approach that can capture overall data about the state of the real-world shelf, including time-changing information and provide real-time feedback is desired.

SUMMARY

The techniques introduced herein overcome the deficiencies and limitations of the prior art, at least in part, with a system and method for aligning a realogram and a planogram. In one embodiment, the method includes receiving a realogram, the realogram including information about product recognitions, and a planogram corresponding to the realogram. The method further includes generating a planogram brand chunk in the planogram, the planogram brand chunk grouping a plurality of planogram product facings belonging to a same brand, and a realogram brand chunk in the realogram based on the planogram brand chunk. The method additionally includes identifying a planogram product facing in the planogram brand chunk and a realogram product facing in the realogram brand chunk and aligning the planogram product facing with the realogram product facing.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 5 is a graphical representation of one embodiment of an example out of stock condition.

FIGS. 29A-29B are graphical representations of embodiments of generating a share of shelf report.

FIGS. 36A-36F are graphical representations of embodiments of developed rules for corrective actions.

DETAILED DESCRIPTION

Figure 1:
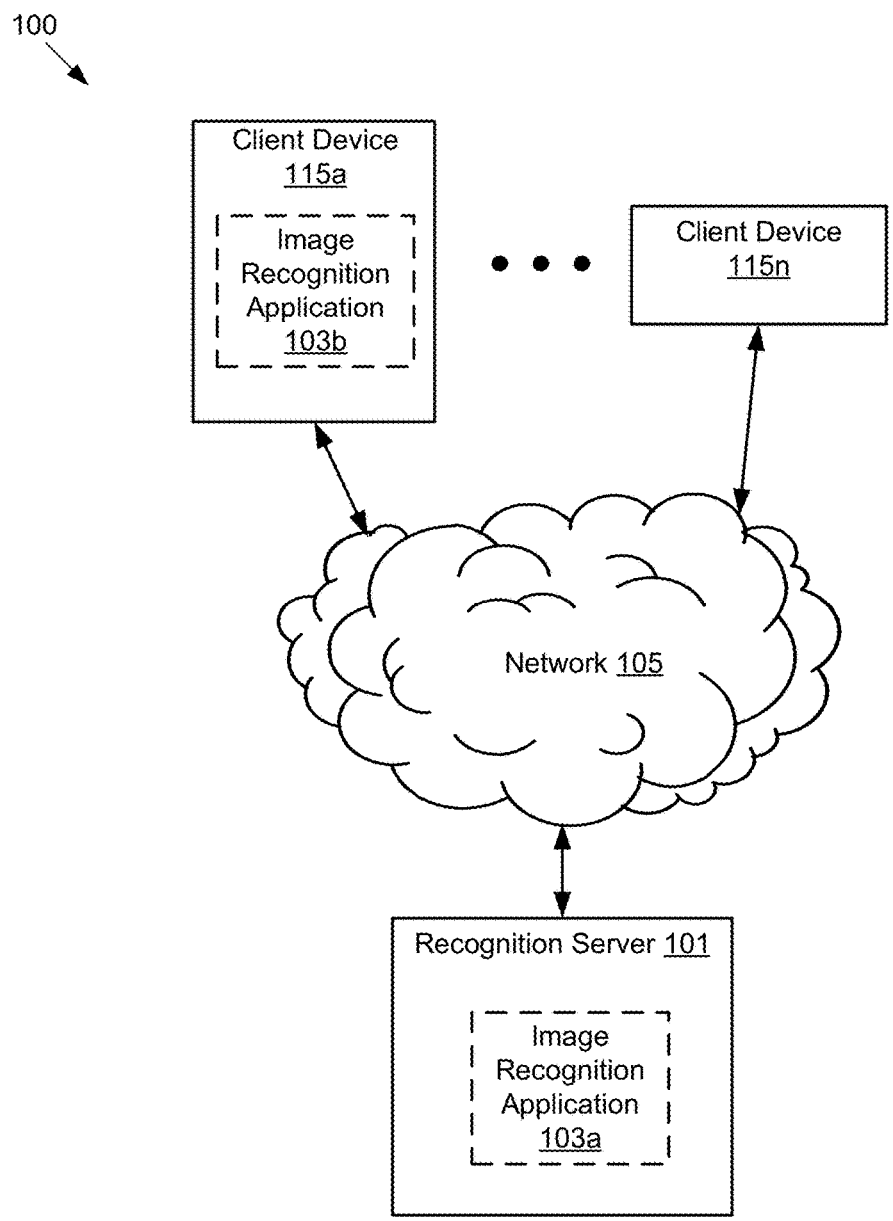
FIG. 1 is a high-level block diagram illustrating one embodiment of a system for comparing data including a recognition result of items in an image with a planogram to generate a corrective action.

FIG. 1 is a high-level block diagram illustrating one embodiment of a system 100 for comparing data including a recognition result of items in an image with a planogram to generate a corrective action. For example, the image may be an image of a shelving unit in a retail store. In some embodiments, an image may be the result of panoramic stitching of multiple images of the shelving unit in the retail store. In some embodiments, an image is understood to be any or all of multiple images from a scene that may include information describing the relationships between the images. The illustrated system 100 may have client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. In some embodiments, the recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. In one embodiment, the recognition server 101 provides services to a consumer packaged goods (CPG) firm for identifying products on shelves, racks, or displays. While the examples herein describe recognition of products in an image of shelves, such as a retail display, it should be understood that the image may include any arrangement of organized objects or items. For example, the image may be of a warehouse, stockroom, storeroom, cabinet, etc. Similarly, the objects, in addition to retail products, may be tools, parts used in manufacturing, construction or maintenance, medicines, first aid supplies, emergency or safety equipment, etc. For the purposes of this application, the terms "item," "object," and "product" are used interchangeably to mean a material thing that can be seen and/or touched.

In some embodiments, the recognition server 101 sends and receives data to and from other entities of the system 100 via the network 105. For example, the recognition server 101 sends and receives data including images of objects to and from the client device 115. The images of objects received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster. In some embodiments, the recognition server 101 may include data storage.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. For example, the client device 115 may include a graphics processor unit (GPU) for handling graphics and multimedia processing. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, in one embodiment, the client device 115 sends a query image to the recognition server 101 and the recognition server 101 provides data in JavaScript Object Notation (JSON) format about one or more objects or products recognized in the query image to the client device 115. The client device 115 may support use of graphical application program interface (API) such as Metal on Apple iOS™ or RenderScript on Android™ for determination of feature location and feature descriptors during image processing.

The image recognition application 103 may include software and/or logic to provide the functionality for generating a data stream including information of a plurality of objects based on processing one or more images with the objects, classifying conditions of the data stream and generating suggestion based on a condition, among other things. In some embodiments, the image recognition application 103 can be implemented using programmable or specialized hardware, such as a field-programmable gate array (FPGA) or an application-specific integrated circuit (ASIC). In some embodiments, the image recognition application 103 can be implemented using a combination of hardware and software. In other embodiments, the image recognition application 103 may be stored and executed on a combination of the client devices 115 and the recognition server 101, or by any one of the client devices 115 or recognition server 101.

In some embodiments, the image recognition application 103b may be a thin-client application with some functionality executed on the client device 115 and additional functionality executed on the recognition server 101 by image recognition application 103a. For example, the image recognition application 103b on the client device 115 could include software and/or logic for capturing the image, transmitting the image to the recognition server 101, and displaying image recognition results. In another example, the image recognition application 103a on the recognition server 101 could include software and/or logic for receiving the image, stitching the image into a larger composite image based on sufficient overlap with a previously received image, and generating image recognition results. In yet another example, the image recognition application 103a on the recognition server 101 could include software and/or logic for determining a corrective action based on matching a recognition result of a received image with an associated planogram. The image recognition application 103a or 103b may include further functionality described herein, such as processing the image and performing feature identification.

In some embodiments, the image recognition application 103 receives an image. For example, the image may be of a shelf stocking breakfast cereal boxes in a retail supermarket. The image recognition application 103 determines a plurality of objects from the image. In some embodiments, the image recognition application 103 may identify an object (e.g., a breakfast box) from the image. In other embodiments, the image recognition application 103 may determine an unindexed object (e.g., a red box with a flower on it) from the image without discovering a matching object in a data storage 243. The image recognition application 103 generates a data stream including information of the plurality of objects collected at one time or over time. For example, the data stream may include prices of a product every week.

The image recognition application 103 determines various conditions such as out of stock condition, recall condition, etc., from the data stream and automatically generates a suggestion based on the condition. The suggestion can be advice for performing a corrective action. For example, for a new product condition where an unindexed product is not yet identified, the image recognition application 103 generates advice for capturing additional information of the unindexed product, updating the data stream with the additional information, and adding the additional information to the data storage 243 for indexing the product. The suggestion can also be a notification. Continuing with the above example, the image recognition application 103 may generate a notification notifying the presence of the new product for purpose of competitive awareness and tracking, or notifying that the portion of data may be used in making a business plan. The operation of the image recognition application 103 and the functions listed above are described in more detail below with reference to FIGS. 3-12.

The approach described herein is advantageous in many ways. The image recognition application 103 collects data in a greater frequency than that of human surveys, field work, etc., and generates a data stream including up-to-date data. The image recognition application 103 can then generate real-time feedback based on the up-to-date data. For example, the image recognition application 103 can instruct a sales representative to get stock of a product at the same day the product stock out occurs. Also the image recognition application 103 generates practical feedback or suggestion for a user to perform an action. For example, the image recognition application 103 tells a user at which location a product is misplaced, which product should be placed at that location, and to which location the misplaced product should be moved. The image recognition application 103 automatically generates a suggestion that provides accurate instructions or solutions to address difficult problems for a human. For example, for the situation such as a "hidden out of stock" in a store where a missing product has been covered up with a different product in the same space, a sales representative may not realize there is a problem, much less solving the problem. However, the image recognition application 103 can automatically discover such problem and provide clear and accurate solution. In addition, the image recognition application 103 presents graphical data to a user to vividly and intuitively understand a problem.

Figure 2:
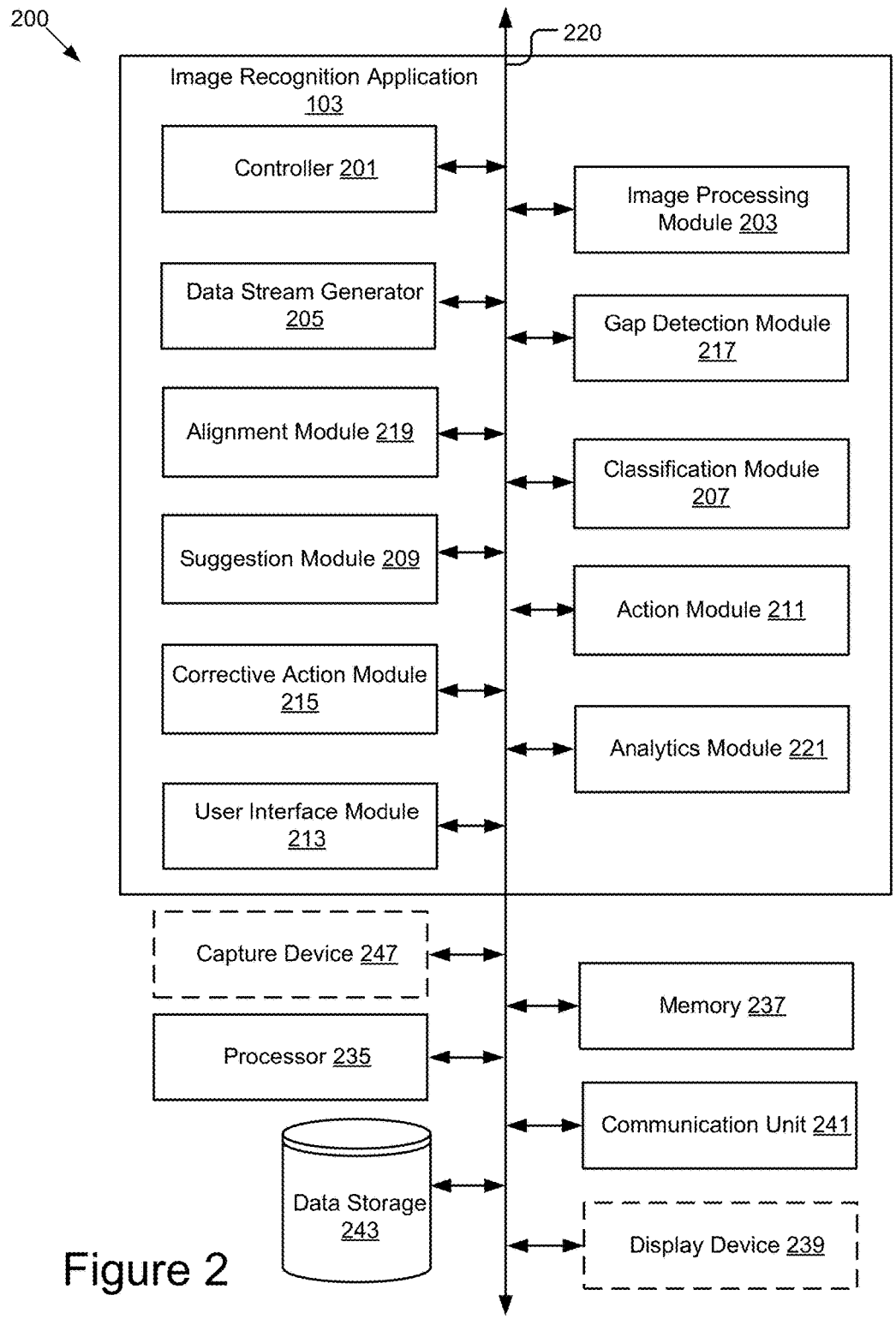
FIG. 2 is a block diagram illustrating one embodiment of a computing device including an image recognition application.

FIG. 2 is a block diagram illustrating one embodiment of a computing device 200 including an image recognition application 103. The computing device 200 may also include a processor 235, a memory 237, a communication unit 241, data storage 243, an optional display device 239, and an optional capture device 247 according to some examples. The components of the computing device 200 are communicatively coupled to a bus or software communication mechanism 220 for communication with each other. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be a client device 115, a recognition server 101, or a combination of a client device 115 and a recognition server 101. In such embodiments where the computing device 200 is the client device 115 or the recognition server 101, it should be understood that the client device 115, and the recognition server 101 may include other components described above but not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the image recognition application 103, and the data storage 243. It will be apparent to one skilled in the art that other processors, operating systems, sensors, displays, and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, EPROM, ROM), a hard disk drive, an optical disk drive (CD, DVD, Blu-Ray™, etc.). It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images, and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2 with dashed lines to indicate it is optional. For example, where the computing device 200 is the recognition server 101, the display device 239 is not part of the system, where the computing device 200 is the client device 115, the display device 239 is included and is used to display images and associated recognition results.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image including a plurality of objects to generate a data stream. The communication unit 241 also transmits information including advice for performing a corrective action to the client device 115 for display, for example, in response to a condition classified from the data stream. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, wireless access point (WAP), e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as transmission control protocol/Internet protocol (TCP/IP), hypertext transfer protocol (HTTP), hypertext transfer protocol secure (HTTPS) and simple mail transfer protocol (SMTP) as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory, or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store images of a plurality of objects received from the client device 115, a data stream including object information of the plurality of objects, conditions classified from the data stream, and advice and notification generated based on one or more conditions. In another example, the data storage 243 may store templates for a plurality of stock keeping units for image recognition purposes. A stock keeping unit (SKU) is a distinct item, such as a product offered for sale. The stock keeping unit includes all attributes that makes the item distinguishable as a distinct product from all other items. For example, the attributes include product identifier (e.g., Universal Product Code (UPC)), product name, dimensions (e.g., width, height, depth, etc.), size (e.g., liters, gallons, ounces, pounds, kilograms, fluid ounces, etc.), description, brand manufacturer, color, packaging, material, model number, price, discount, base image, etc. The term stock keeping unit or SKU may also refer to a unique identifier that refers to the particular product or service in the inventory. In some embodiments, the data storage 243 stores a received image and the set of features determined for the received image. The data storage 243 may similarly store one or more planograms and the set of patterns determined for the one or more planograms. The data stored in the data storage 243 is described below in more detail.

The capture device 247 may be operable to capture an image or data digitally of an object of interest. For example, the capture device 247 may be a high definition (HD) camera, a regular 2D camera, a multi-spectral camera, a structured light 3D camera, a time-of-flight 3D camera, a stereo camera, a standard smartphone camera, or a wearable computing device. The capture device 247 is coupled to the bus to provide the images and other processed metadata to the processor 235, the memory 237, or the data storage 243. It should be noted that the capture device 247 is shown in FIG. 2 with dashed lines to indicate it is optional. For example, where the computing device 200 is the recognition server 101, the capture device 247 is not part of the system, where the computing device 200 is the client device 115, the capture device 247 is included.

In some embodiments, the image recognition application 103 may include a controller 201, an image processing module 203, a data stream generator 205, a classification module 207, a suggestion module 209, an action module 211, a user interface module 213, a corrective action module 215, a gap detection module 217, an alignment module 219, and an analytics module 221. The components of the image recognition application 103 are communicatively coupled via the bus 220. The components of the image recognition application 103 may include software and/or logic to provide their respective functionality. In some embodiments, the components of the image recognition application 103 can each be implemented using programmable or specialized hardware including a field-programmable gate array (FPGA) or an application-specific integrated circuit (ASIC). In some embodiments, the components of the image recognition application 103 can each be implemented using a combination of hardware and software executable by the processor 235. In some embodiments, the components of the image recognition application 103 may each be stored in the memory 237 as instructions and be accessible and executable by the processor 235. In some implementations, the components of the image recognition application 103 may each be adapted for cooperation and communication with the processor 235, the memory 237, and other components of the image recognition application 103 via the bus or software communication mechanism 220.

The controller 201 may include software and/or logic to control the operation of the other components of the image recognition application 103. The controller 201 controls the other components of the image recognition application 103 to perform the methods described below. In some implementations, the processor 235, the memory 237, and other components of the image recognition application 103 can cooperate and communicate without the controller 201. The controller 201 may also include software and/or logic to provide the functionality for handling communications between the image recognition application 103 and other components of the computing device 200 as well as between the components of the image recognition application 103.

In some embodiments, the controller 201 sends and receives data, via the communication unit 241, to and from one or more of a client device 115 and a recognition server 101. For example, the controller 201 receives, via the communication unit 241, an image from a client device 115 operated by a user and sends the image to the image processing module 203. In another example, the controller 201 receives data for providing a graphical user interface to a user from the user interface module 213 and sends the data to a client device 115, causing the client device 115 to present the user interface to the user.

In some embodiments, the controller 201 receives data from other components of the image recognition application 103 and stores the data in the data storage 243. For example, the controller 201 may receive information of a plurality of objects from the image processing module 203 and stores the data in the data storage 243. In other embodiments, the controller 201 retrieves data from the data storage 243 and sends the data to other components of the image recognition application 103. For example, the controller 201 may receive a data stream including information of a plurality of objects from the data storage 243, and transmit the data to the classification module 207.

In some embodiments, the communications between the image recognition application 103 and other components of the computing device 200 as well as between the components of the image recognition application 103 can occur autonomously and independent of the controller 201.

The image processing module 203 may include software and/or logic to provide the functionality for receiving and processing one or more images and outputting information associated with a plurality of objects recognized in the one or more images. For example, the one or more received images may be realogram images of a shelving unit depicting a current layout of shelves in one or more retail stores.

In some embodiments, the image processing module 203 receives one or more images of a shelving unit for recognition from the client device 115. For example, the image may include multiple products on a shelf in a retail store. The image can be an image of packaged products such as, rectangular breakfast cereal boxes, circular soda bottles, square coffee packages, etc. captured on a shelf by the client device 115 at a distance from the shelving unit which reflects the real life situation on the shelf in a retail store. A packaged product of a brand manufacturer may include textual and pictorial information printed on its surface that distinguishes it from packaged products belonging to one or more other brand manufacturers on the shelf. The packaged products may also sit in an orientation on the shelf exposed to the user looking at the shelf at any given time. For example, a box-like packaged product might be oriented with the front of the product exposed to the user looking at the shelf In some embodiments, the image processing module 203 determines whether successful recognition is likely on the received image and instructs the user interface module 213 to generate graphical data including instructions for the user to retake the image if a section of the image captured by the client device 115 has limited information for complete recognition (e.g., a feature rich portion is cut off), the image is too blurry, the image has an illumination artifact (e.g., excessive reflection), etc.

In some embodiments, the image processing module 203 may process the one or more images serially or in parallel. The image processing module 203 determines a set of features for the received image. For example, the image processing module 203 may determine a location (X-Y coordinates), an orientation, and an image descriptor for each feature identified in the received image. In some embodiments, the image processing module 203 uses corner detection algorithms for determining feature location. For example, the corner detection algorithms can include Shi-Tomasi corner detection algorithm, Harris and Stephens corner detection algorithm, etc. In some embodiments, the image processing module 203 uses feature description algorithms for determining efficient image feature descriptors. For example, the feature description algorithms may include Binary Robust Independent Elementary Features (BRIEF), Scale-Invariant Feature Transform (SIFT), Speeded Up Robust Features (SURF), etc. An image descriptor of a feature may be a 256-bit bitmask which describes the image sub-region covered by the feature. In some embodiments, the image processing module 203 may compare each pair of 256 pixel pairs near the feature for intensity and based on each comparison, the image processing module 203 may set or clear one bit in the 256-bit bitmask.

In some embodiments, the image processing module 203 extracts the features from the one or more received images. The image processing module 203 matches the extracted features with the features of templates stored for a plurality of products in the data storage 243 for image recognition. The image processing module 203 identifies a region of interest (ROI) bordering each of the matched items in the received image. A region of interest can be of any shape, for example, a polygon, a circle with a center point and a diameter, a rectangular shape of a width, a height and one or more reference points for the region (e.g., a center point, one or more corner points for the region), etc. For example, the region of interest may border the matched item in its entirety. In another example, the region of interest may border the exposed labeling containing pictorial and textual information associated with the matched item. In some embodiments, the image processing module 203 recognizes an item (i.e. product recognition) associated with the region of interest based on feature matching the image features in the received image with the template features stored for a plurality of items. The recognition result of the product recognition may include a universal product code (UPC), position data (e.g., a slot position on a shelf, a particular shelf off the ground, etc.) and metadata (e.g., brief product description, brand manufacturer, dimensions, size, color, price, base image, model number, etc.).

In some embodiments, the image processing module 203 may receive the one or more images of the shelving unit, stitch the images of the shelving unit into a single linear panoramic image (e.g., a composite image) and store the panoramic image in the data storage 243. In some embodiments, the image processing module 203 determines the features of the panoramic image and matches the determined features with the features of templates stored for a plurality of items in the data storage 243 for performing image recognition of items in the panoramic image. In some embodiments, the image processing module 203 sends the data including recognition results and associated regions of interest of the image of the shelving unit to the alignment module 219. In other embodiments, the image processing module 203 stores the data including recognition results and associated region of interests of the image of the shelving unit in the data storage 243.

In some embodiments, the image processing module 203 organizes the information including recognition data generated as a result of processing the received image of the shelving unit. In some embodiments, the image processing module 203 identifies a plurality of facings in the recognition result of the realogram image. A facing can be a vertical stacking of one or more items on a shelf turned out towards the customer. For example, a set of toothpaste products, each in a box-like package may be stacked on top of one another to form a facing at a single position of the shelf. The one or more items in the facing are designed to represent an identical product (or same SKUs and/or UPCs). However, if the items get misplaced on the shelving unit, the facing may become mixed. For example, a toothpaste brand 'X' may be misplaced on top of the toothpaste brand 'Y' in the facing meant for the toothpaste brand 'Y' and thus the facing can become a mixed facing. In some embodiments, the image processing module 203 maintains a candidate list for each recognized item or product recognition in the facing. The candidate list for each product recognition represents a ranked list of image recognition results that were generated. Each image recognition result in the candidate list has an associated confidence score. In some embodiments, the image processing module 203 determines a representative product recognition to represent a facing with more than two product recognitions in the realogram image. The image processing module 203 evaluates the candidate list of each of the two or more product recognitions in the facing. The image processing module 203 identifies a confidence score of each of the two or more product recognitions in the facing from the respective candidate lists and chooses the product recognition with the highest score as the representative product recognition of the facing.

In some embodiments, the image processing module 203 identifies one or more shelves in the shelving unit in the realogram image that correspond to the facings in the realogram image. For example, the image processing module 203 identifies that a horizontal linear grouping of one or more facings corresponds to a shelf (e.g., a linear group). In some embodiments, the image processing module 203 numbers the shelves in the shelving unit. For example, the image processing module 203 may number the shelves from top to bottom or from bottom to top. The image processing module 203 generates a data structure for representing the product recognitions, the facings and the linear groups in the recognition result of the received image. For example, the image processing module 203 represents the data structure in JSON format and stores the data structure in the data storage 243. For the purpose of this application, the term "realogram" can refer to the data structure for representing the product recognitions, the facings, and the linear groups in the recognition result of the received image.

In some embodiments, the image processing module 203 determines one or more images associated with an identified object. The one or more images can be an object image, an image template in a data storage 243, or an image of a plurality of objects. For example, the image processing module 203 crops an object from a received image and associates the cropped image with the object. In another example, the image processing module 203 retrieves an image template of a matching object stored on the data storage 243 and associates the image template with the object. In yet another example, when the object is a product identified from the one or more images depicting products in a retail environment, the image processing module 203 may also retrieve an image of the planogram that describes where in the retail environment and in what quantity products should be located and associate the planogram with the product.

In some embodiments, the image processing module 203 determines a location of an identified object. For example, the image processing module 203 may identify an absolute position of an object in a received image with x-y coordinates of the object. The location can also be a relative location. For example, the image processing module 203 may determine the location of product A relative to product B from a competitor, or the location of product A relative to a shelf, or the location of product A relative to other points of reference (e.g., a light source, a sign).

In some embodiments, the image processing module 203 also determines metadata related to an identified object. For example, for a product sitting on a shelf of a retailer store, the image processing module 203 may determine metadata of a product including packaging dimension, packaging identifier, price of the product as sold in the retailer store, the number of product facing (e.g., one facing for one box of a brand, two facings for two boxes of the same brand sitting side by side), shelf identifier, width, height, depth, area, diagonal length, color, product attributes such as product name, product weight, product volume, product description, product size, ingredients, nutritional information, manufacturer brand, model number, material, or the like. It will be apparent to one skilled in the art that other metadata of an identified object might be determined.

In other embodiments, the image processing module 203 may determine from the one or more received images information about an object such as an image of the object, a location of the object, metadata related to the object (e.g., color, size, etc.). The image processing module 203 may not be able to match the object information to information stored in templates for a plurality of objects in the data storage 243. As a result, the image processing module 203 labels this object as an unrecognized object.

In some embodiments, the image processing module 203 transmits the received images, identified objects, unrecognized objects, and object information to the data stream generator 205. In some embodiments, the image processing module 203 receives images captured at different time and provides time series data of objects to the data stream generator 205. In other embodiments, the image processing module 203 also stores the received images, identified objects, unrecognized objects and object information on the data storage 243.

The data stream generator 205 may include software and/or logic to provide the functionality for generating a data stream to include object information determined by the image processing module 203.

The data stream generator 205 receives information of an object identified from one or more received images. The data stream generator 205 may also receive information of an unindexed object determined from the one or more received images. The object information associated with an object may include an object identifier, one or more associated images, a location of the object, metadata related to the object, etc. The data stream generator 205 generates a data stream including information of a plurality of objects. The data stream includes observations of objects in real world and ideal data of the objects, which provides useful information for improvement in practice.

In some embodiments, the data stream generator 205 generates a data stream based on object information collected at one time. For example, the image processing module 203 processes the images taken at a single visit to a single store to identify objects and determine object information. The data stream generator 205 generates a single event oriented data stream based on the object information determined by the image processing module 203. In other embodiments, the data stream generator 205 generates a time series based data stream of object information, for example, from images taken during multiple visits to a store. In some other embodiments, the data stream generator 205 aggregates and summarizes object information received from the image processing module 203 to generate a data stream. For example, the data stream generator 205 generates a data stream by aggregating the object information determined from images of multiple stores of the same or different type, or by aggregating the object information determined from images of multiple stores with the same or different local demographics, or by aggregating the object information collected over time. In some embodiments, the data stream generator 205 transmits the data stream to the classification module 207. In other embodiments, the data stream generator 205 stores the data stream on the data storage 243.

The gap detection module 217 may include software and/or logic for locating a gap in a realogram of the shelving unit. For example, the gap detection module 217 detects a gap in a sequence of closely positioned products on a shelf in the realogram. In some embodiments, the gap detection module 217 receives the realogram processed by the image processing module 203. The gap detection module 217 analyzes the realogram to detect the gaps. In some embodiments, the gap detection module 217 searches for areas in the realogram where no recognition has occurred and identifies those areas as gaps. A gap in the shelf may be either an unrecognized product or an empty spot or hole on the shelf where there are no products on display (e.g., an out of stock situation). The gap detection module 217 analyzes the gap and identifies the gap as either a potential unrecognized product or a hole in the shelf. A gap tagged as a potential unrecognized product may include features resembling a product that could not be recognized by the image processing module 203. It is beneficial to identify the gap as a hole or potential product to reduce the number of false positive corrective actions that may be suggested to the sales representative. For example, if an unrecognized product is found to exist in a "gap" area on the shelf, the gap detection module 217 associates a tag "unrecognized product" with the "gap" area such that it is less likely that there will be a suggestion of a corrective action for an "out of stock" situation.

In some embodiments, the gap detection module 217 analyzes each linear group (i.e., shelf) of the realogram to detect gaps. The gap detection module 217 identifies a shelf in the realogram and determines a size of each product on the shelf. For example, the gap detection module 217 determines a width of each product situated on the shelf. The gap detection module 217 determines an average size of the products on the shelf. The gap detection module 217 determines a gap threshold for the shelf. The gap threshold describes a minimum gap size that is tolerable given the average size of the products on the shelf. In some embodiments, the gap detection module 217 determines the gap threshold as a percentage of the average size. For example, the gap threshold may be 25 percent of the average width of the products on the shelf. In some embodiments, the gap detection module 217 identifies a current product facing on the shelf and measures a distance of a space between a previous product facing and the current product facing. For example, the gap detection module 217 determines a distance between a right edge of a previous product facing and a left edge of the current product facing on the shelf. The gap detection module 217 determines whether the measured distance is greater than the gap threshold. The gap detection module 217 determines that there are gaps in the space based on the measured distance being greater than the gap threshold.

In some embodiments, the gap detection module 217 determines whether the distance (e.g., width) of the space is as wide as products in either of the neighboring product facings identified in the realogram. The gap detection module 217 determines whether the width of the space is a multiple of the widths of products in either of the neighboring product facings. The gap detection module 217 identifies the number of gaps potentially hidden within the space based on the width of the space being a multiple of the widths of products in either of the neighboring product facings. For example, if the pixel width of the space is 400 pixels wide, a product in a first neighboring product facing on the left is 300 pixels wide and a product in a second neighboring product facing on the right is 200 pixels wide, the gap detection module 217 determines that the width of the space is a multiple of the width of the product in the second neighboring product facing. The gap detection module 217 determines the width of the product in the second neighboring product facing as the best fit and identifies that there are two potential gaps for products each 200 pixels wide within the space. In some embodiments, the gap detection module 217 creates gap facings for the number of gaps determined in the space. The gap detection module 217 inserts the gap facings determined for the number of gaps into the linear group before the current product facing.

In some embodiments, the gap detection module 217 analyzes an image of the gap facing to classify the gap facing. For example, the gap detection module 217 determines whether the gap facing is an empty hole or an unrecognized product. The gap detection module 217 uses one or more pre-processing image filters on the image of the gap facing. For example, the gap detection module 217 uses an opaque filter to preprocess the image and set the alpha value of pixels in the image to a value of 1. In another example, the gap detection module 217 uses a crop edge filter to preprocess the image by removing a portion of the image on the left and the right (e.g., 30%) and the top and the bottom (e.g., 10%). In some embodiments, after preprocessing, the gap detection module 217 uses a plurality of image processing filters to determine whether the gap facing contains product like features.

In some embodiments, after preprocessing to set the alpha value of all pixels to one, and crop edges, the gap detection module 217 uses three filters: a corner detection filter, an edge detection filter, and a bright color filter. The corner detection filter detects a corner pixel and converts the color of the corner pixel to white. For example, the corner detection filter can be a Shi-Tomasi corner detector, a Nobel corner detector, an Oriented FAST and Rotated BRIEF (ORB) corner detector, etc. In the example use of Shi-Tomasi corner detector, the sensitivity may be set at 1.5 and the threshold at 0.02. The edge detection filter detects an edge pixel and converts the color of the edge pixel to white. For example, the edge detection filter can be a canny edge detector, a Sobel filter, etc. In the example use of canny edge detector, the lower threshold may be set at 0.1, the upper threshold at 0.3, and blur radius at 0.5 pixels. The bright color filter detects a brightly colored pixel. The saturation of a brightly colored pixel must pass a threshold and so, black, white, gray, beige, and brown are not bright. The bright color filter converts one or more pixels in the image of the gap facing to hue ($0<=H<360$), saturation ($0<=S<=1$), and brightness or value ($0<=V<=1$). The bright color filter detects whether a pixel is a warm color. The bright color filter determines whether the hue parameter of the pixel, i.e., 'H' satisfies the first condition, [(H>=345 degrees)||(H<=75 degrees)]. If 'H' satisfies the first condition, then the bright color filter identifies the pixel as a warm color. The bright color filter sets the saturation threshold $S_h$ for warm color pixels at 0.62 and 0.12 for others. The bright color filter determines whether the value parameter of the pixel, i.e. 'V' and the saturation parameter, i.e., 'S' satisfy the second condition, [(V>0.2) AND (S>$S_h$)]. If 'V' and 'S' satisfy the second condition, then the bright color filter converts the color of the pixel to white.

The gap detection module 217 determines a white pixel count after each one of the corner detection filter, the edge detection filter, and the bright color filter is applied to the image of the gap facing. The gap detection module 217 determines whether the white pixel count '$C_w$' in the gap facing image of width 'w' and height 'h' after corner detection satisfies the equation, [$\{(C_w*1000)/(w*h)\}>3.5$] for presence of product like features in the gap facing. Similarly, the gap detection module 217 determines whether the white pixel count '$C_w$' in the gap facing image after edge detection satisfies the equation, [$\{C_w/\sqrt{(w*h)}\}>4.5$] and whether the white pixel count '$C_w$' in the gap facing image after bright color filter satisfies the equation, [$\{C_w/(w*h)\}>0.08$]. The gap detection module 217 counts a vote for each image processing filter generating a positive result indicating the presence of a product like features within the gap facing. The gap detection module 217 determines whether the vote count is greater than or equal to a threshold majority. The gap detection module 217 identifies the gap facing as containing a product when it is determined that the vote count is greater than or equal to the threshold majority. For example, in the case of three filters: the corner detection filter, the edge detection filter, and the bright color filter, the threshold majority is two. The gap detection module 217 determines whether the vote count is at least greater than or equal to two. The gap detection module 217 identifies the gap facing as containing a product when it is determined that the vote count is at least greater than or equal to two. When the vote count is not at least greater than or equal to two, the gap detection module 217 identifies the gap facing as containing an empty spot or hole.

The alignment module 219 may include software and/or logic for performing an alignment of a portion of a realogram with a corresponding portion of a planogram. The term "alignment" here refers to a process of matching the planogram with the realogram such that each product facing in the planogram is connected to a corresponding slot in the realogram. A slot refers to an ordinal position on the shelf of the realogram. The slot can be classified as an "object," which indicates a recognized product (i.e., recognition associated with an item in that location), or a "gap," which indicates an area where no recognition has occurred in the shelf.

In some embodiments, the alignment module 219 receives information including the realogram and the gap facings detected in the realogram from the gap detection module 217. In some embodiments, the alignment module 219 retrieves a planogram corresponding to the realogram from the data storage 243. The alignment module 219 retrieves a data structure representing the planogram including a set of linear groups. Each linear group in the data structure represents a shelf in the planogram. Each linear group includes a list of product facings. Each product facing represents one or more attributes, for example, brand information, UPC, and position information. In some embodiments, the alignment module 219 uses brand information of the product facings in the planogram and the realogram to cluster the product facings into smaller and more contextually relevant bundles called "brand chunks" which are used in the alignment of the planogram and the realogram.

In some embodiments, the alignment module 219 processes each linear group of the planogram to identify one or more brand chunks. The alignment module 219 identifies a linear group and processes each product facing on the linear group. The alignment module 219 determines a brand name of a product facing. The alignment module 219 creates a brand chunk associated with the brand name and adds the product facing to the brand chunk. For example, the alignment module 219 determines a group of product facings on the shelf of the planogram that have a common brand name "X Cereal" for breakfast products offered by a manufacturer "Y Mills" and identifies the group of product facings as a brand chunk. Each time a product facing is added to a brand chunk, the alignment module 219 increases the dimension (e.g., width) of the brand chunk to accommodate the newly added product facing. In some embodiments, the alignment module 219 adds the brand chunk to the linear group of the planogram represented in the data structure.

In some embodiments, the alignment module 219 creates one or more brand chunks in the realogram based on the one or more brand chunks of the planogram. In some embodiments, the alignment module 219 makes a copy of a brand chunk from each linear group of the planogram. The alignment module 219 identifies each corresponding linear group in the realogram and stores the copy of the brand chunk into each corresponding linear group. One of ordinary skill in the art can understand that there may be a possibility of an error on a shelf of the realogram where product brands do not match the planogram as a template. However, the alignment module 219 ignores the possibility of error during the initial stage of copying the brand chunks from the planogram into the realogram. The alignment module 219 sets the copied brand chunk as an initial brand chunk for the realogram. In some embodiments, the alignment module 219 creates a connection between a planogram brand chunk and a realogram brand chunk. The connection is such that the planogram brand chunk corresponds to the realogram brand chunk and the linear group in which the planogram brand chunk is situated corresponds to the linear group in which the realogram brand chunk is situated. It may be beneficial to create brand chunks because it constrains the alignment of product facings between the planogram and the realogram to use a same brand and avoid comparing product facings across brands. The presence of brand chunks regionalizes the product facing alignment to be from a planogram brand chunk to a corresponding realogram brand chunk such that the probability of comparing product facings from a same area of the shelf in the planogram and the realogram is improved.

In some embodiments, the alignment module 219 refines the assignment of product facings to one or more brand chunks in each linear group of the realogram. The alignment module 219 processes each linear group of the realogram to determine whether each of the product facings are placed into a respective brand chunk. In this refinement technique, the alignment module 219 identifies one or more errors in the placement of products in the shelf of the realogram. The alignment module 219 accounts for the one or more errors. For example, the error can be an out of order product on the shelf which can lead to the alignment module 219 creating an extra brand chunk in the realogram image that was not previously defined in the shelf of the corresponding planogram.

In some embodiments, the alignment module 219 identifies a product facing in a linear group and evaluates the product facing to determine in which of the previously created brand chunks in the realogram to place the product facing. In some embodiments, the alignment module 219 determines that the product facing is a gap facing. The alignment module 219 identifies a current brand chunk in the linear group and determines the number of product facings added so far to the current brand chunk. The alignment module 219 determines whether the number of product facings in the current brand chunk is less than a maximum number of allocated facings. If it is determined to be less than the maximum number of facings, the alignment module 219 places the gap facing in the current brand chunk. If it is determined to be greater than the maximum number of facings, in some embodiments, the alignment module 219 selects a next brand chunk and adds the gap facing to the next brand chunk. In some embodiments, the alignment module 219 determines that the gap facing is at the end of a shelf because there is no next brand chunk and ignores the gap facing.

In some embodiments, the alignment module 219 identifies a brand name of the product facing, determines whether the brand name is matching the current brand chunk, and adds the product facing to the current brand chunk based on the brand name matching the current brand chunk. If the brand name is not matching the current brand chunk, in some embodiments, the alignment module 219 selects the next brand chunk, determines whether the brand name is matching the next brand chunk, and adds the product facing to the next brand chunk based on the brand name matching the next brand chunk. If the brand name is not matching the next brand chunk, in other embodiments, the alignment module 219 creates and inserts a new brand chunk for the product facing present in an unexpected location in the realogram as compared to the planogram template. For example, the product facing may not fit any of the nearby and already existing brand chunks. The alignment module 219 uses the brand name of the product facing for naming the newly created brand chunk and adds the product facing to the newly created brand chunk in the realogram. In one situation, the creation of a new brand chunk may indicate a deviation from the planogram template. In some embodiments, the alignment module 219 flags a placement issue in the realogram based on the presence of the new brand chunk and sends information about the placement issue to the corrective action module 215. In some embodiments, the alignment module 219 increments the number of facings for the brand chunk when a product facing is added to the brand chunk. In some embodiments, the alignment module 219 increases the dimension (e.g., width) of the brand chunk to accommodate the newly added product facing. For example, the alignment module 219 incorporates the width of the product facing into the brand chunk's total width. In some embodiments, the alignment module 219 adds the brand chunk to the linear group of the realogram represented in a data structure. In some embodiments, the alignment module 219 stores the real and revised set of brand chunks for the realogram in the data storage 243.

In some embodiments, the alignment module 219 reassesses the connection previously created between a planogram brand chunk and a corresponding realogram brand chunk. For example, when the alignment module 219 generates a revised set of brand chunks for the realogram, there may be a better connection to be made. The alignment module 219 determines whether there is now a stronger brand chunk in the revised set of brand chunks of the realogram that is currently not connected to a brand chunk in the planogram. In some embodiments, the alignment module 219 determines a number of facings within the brand chunk under consideration and identifies the position of the brand chunk in the linear group of the realogram. The alignment module 219 determines that the brand chunk is a stronger brand chunk based on the number of facings within the brand chunk and the position of brand chunk in the linear group. The alignment disconnects a weaker connection and connects the corresponding brand chunk in the planogram to the stronger brand chunk in the realogram.

In some embodiments, the alignment module 219 processes each linear group of the planogram to connect a planogram product facing from a planogram brand chunk to a realogram product facing in a realogram brand chunk. The alignment module 219 compares the planogram product facing with the realogram product facing to determine a connection between them.

In some embodiments, the alignment module 219 compares the index position of the planogram product facing in the planogram brand chunk with the index position of the realogram product facing in the realogram brand chunk. The index or index position refers to an ordinal position of the product facing in a brand chunk. For example, index position '0' is the first position in the brand chunk. The alignment module 219 identifies an index weight for weighing a result of the comparison of the index position. For example, the index weight may be 0.3. The result is weighted strongly when the index positions match and less so if the index position is far from being equal. If the index position of the planogram product facing matches the index position of the realogram product facing, the alignment module 219 computes an index score by multiplying the index weight by 100. If the index position of the planogram product facing instead matches an index position of another realogram product facing that is one position to the left or the right of the index position of the realogram product facing under consideration, the alignment module 219 computes an index score by multiplying the index weight by 60. If the index position of the planogram product facing instead matches the index position of yet another realogram product facing that is two positions to the left or the right of the index position of the realogram product facing under consideration, the alignment module 219 computes an index score by multiplying the index weight by 20. Otherwise, in some embodiments, the alignment module 219 determines the index score as zero.

In some embodiments, the alignment module 219 compares an aspect ratio of the planogram product facing and the realogram product facing. The alignment module 219 measures an aspect ratio error based on a width and a height of the planogram product facing and the realogram product facing. The equation for aspect ratio error calculation can be stated as:

$$\text{Aspect Ratio Error} = \left| \frac{R_h}{R_w} - \frac{P_h}{P_w} \right|$$

where $R_h$ is the height of the realogram product facing, $R_w$ is the width of the realogram product facing, $P_h$ is the height of the planogram product facing, and $P_w$ is the width of the planogram product. The smaller the aspect ratio error, the more similar the planogram product facing and the realogram product facing are to each other. The alignment module 219 identifies an aspect ratio weight for weighing a result of the comparison of the aspect ratio. For example, the aspect ratio weight may be 0.4. If the aspect ratio error is less than or equal to 0.1, the alignment module 219 computes an aspect ratio score by multiplying the aspect ratio weight by 100. If the aspect ratio error is less than or equal to 0.5, the alignment module 219 computes an aspect ratio score by multiplying the aspect ratio weight by 80. If the aspect ratio error is less than or equal to 0.9, the alignment module 219 computes an aspect ratio score by multiplying the aspect ratio weight by 50. Otherwise, in some embodiments, the alignment module 219 determines the aspect ratio score as zero.

In some embodiments, the alignment module 219 compares a neighboring product facing of the planogram product facing with a neighboring product facing of the realogram product facing. If the neighboring product facings are similar, then the likelihood that the planogram product facing and the realogram product facing are similar is increased. For example, the alignment module 219 compares the UPCs of the neighboring product facings. In some embodiments, the alignment module 219 checks a similarity of neighboring product facings in a spot to the left and to the right of the planogram product facing and the realogram product facing. In other embodiments, the alignment module 219 checks a similarity of neighboring product facings that are two spots to the left and to the right of the planogram product facing and the realogram product facing.

The alignment module 219 identifies a neighbor weight for weighing a result of the comparison of the neighboring product facings. For example, the neighbor weight may be 0.2. The alignment module 219 identifies a previous neighbor product facing and a next neighbor product facing of the planogram product facing. The alignment module 219 identifies a previous neighbor product facing and a next neighbor product facing of the realogram product facing. The alignment module 219 compares the previous neighbor product facing of the planogram product facing with the previous neighbor product facing of the realogram product facing. If they match, the alignment module 219 generates a previous neighbor value by multiplying the neighbor weight by 100. The alignment module 219 compares the next neighbor product facing of the planogram product facing with the next neighbor product facing of the realogram product facing. If they match, the alignment module 219 generates a next neighbor value by multiplying the neighbor weight by 100. If one of the neighboring product facings of the planogram product facing and the realogram product facing do not match, in some embodiments, the alignment module 219 retrieves the candidate list for the neighboring product facing and performs a comparison against the product recognitions in the candidate list. If there is a match in the candidate list, the alignment module 219 generates a neighbor value (previous neighbor value and/or next neighbor value) by multiplying the neighbor weight by 80. Otherwise, in some embodiments, the alignment module 219 determines the neighbor value as zero. In some embodiments, the alignment module 219 generates a neighbor score by determining an average of the previous neighbor value and the next neighbor value.

In some embodiments, the alignment module 219 compares an identifier of the planogram product facing and the realogram product facing. For example, the identifier can be a UPC. The alignment module 219 identifies an identifier weight. For example, the identifier weight can be 0.1. If there is an identifier match between the planogram product facing and the realogram product facing, the alignment module 219 generates an identifier score by multiplying the identifier weight by 100. If there is no identifier match between the planogram product facing and the realogram product facing, in some embodiments, the alignment module 219 retrieves the candidate list for the realogram product facing and performs a comparison against the identifiers of the product recognitions in the candidate list. If an identifier of one of the product recognitions matches the planogram product facing, the alignment module 219 generates an identifier score by multiplying the identifier weight by 90. Otherwise, in some embodiments, the alignment module 219 determines the identifier score as zero.

In some embodiments, the alignment module 219 aggregates a plurality of weighted scores from comparing the planogram product facing with the realogram product facing and determines a weighted average score of the plurality of scores. For example, the alignment module 219 determines an average score of the index score, the aspect ratio score, the neighbor score, and the identifier score. For example, the average score can be 25. The alignment module 219 determines whether the average score is greater than or equal to a threshold. If the average score is greater than or equal to a threshold, the alignment module 219 stores the realogram product facing as a candidate in a list of connections for the planogram product facing. If the average score is not greater than or equal to the threshold, the alignment module 219 determines that the comparison did not surpass the threshold and ignores the realogram product facing.

The alignment module 219 analyzes the connection between the planogram product facings and realogram product facings to remove any duplicate connection. For example, the alignment module 219 may identify a scenario where multiple planogram product facings point toward a same realogram product facing as a connection. In some embodiments, the alignment module 219 processes each linear group of the planogram. The alignment module 219 identifies a planogram product facing in a planogram brand chunk. The alignment module 219 retrieves a candidate list of realogram product facing as connections stored for the planogram product facing. The alignment module 219 determines whether the candidate list is empty. In some embodiments, the alignment module 219 flags a missing item issue in the realogram based on the empty candidate list and sends information about the missing item issue to the corrective action module 215. The alignment module 219 determines whether the candidate list includes more than one realogram product facing as candidates. The alignment module 219 identifies a best scoring realogram product facing from the candidate list if the candidate list includes more than one realogram product facing as candidates. The alignment module 219 determines whether the best scoring realogram product facing is in a connection with a previous planogram product facing. For example, the alignment module 219 determines whether two planogram product facings are competing for the same realogram product facing. If there is a conflicting connection, the alignment module 219 identifies a next best scoring realogram product facing in the candidate list and sets the next best scoring realogram product facing as a new connection for the planogram product facing. The alignment module 219 disconnects the conflicting connection from the planogram product facing to the best scoring realogram product facing.

In some embodiments, the alignment module 219 stores information including the planogram matched with the realogram in the data storage 243. In other embodiments, the alignment module 219 sends the information including the planogram matched with the realogram to the corrective action module 215.

The classification module 207 may include software and/or logic to provide the functionality for classifying conditions of a data stream.

The classification module 207 receives a data stream of a plurality of objects and classifies conditions of the data stream. In some embodiments, the classification module 207 determines a condition from the data stream and extracts a portion of data from the data stream based on the condition. For simplicity of description, the classification module 207 will be described below based on a data stream that includes product information of a retail environment. The data stream generator 205 generates the data stream based on images taken from a single visit to a single store, multiple visits to a single store, and multiple visits to multiple stores. It should be understood that the classification module 207 can function similarly in other environments such as warehouse, stockroom, store room, cabinet, etc. It should also be understood that the classification module 207 may determine more conditions and extract more data from the data stream than example conditions and example extracted data described below.

In some embodiments, the classification module 207 determines an out of stock or stock out condition from the data stream and extracts a portion of data from the data stream based on the stock out condition. In some embodiments, the classification module 207 identifies missing products on a shelf (e.g., based on the voids of the shelf) of an image taken from a single visit to a store and determines a regular stock out condition. The classification module 207 extracts location data of the missing products (e.g., x-y coordinates of the missing products in the image) from the data stream, and associates the extracted data to the regular stock out condition. In other embodiments, the classification module 207 compares the image taken from a retailer store with an image of the planogram that describes where in the retailer store and in what quantity products should be located, and determines a hidden out of stock condition by identifying products other than a particular product appearing at the positions where the particular product is expected to be located. By this way, the classification module 207 automatically detects a hidden out of stock condition, which is hard to be manually discovered in practice. In some embodiments, the classification module 207 also identifies the unexpected products sitting at the locations of the particular product is expected to be. For example, the classification module 207 determines that a second product and a third product show in the locations of a first product. The classification module 207 extracts a portion of data including the received image, the planogram image, information of the particular product (i.e., the missing product), information of the unexpected products, the current locations of the unexpected products, the expected locations of the unexpected products, etc., and associates the extracted data to the hidden out of stock condition.

When the classification module 207 receives the time series based data stream including product information collected over time, the classification module 207 can track and store repetition of stock outs. In some embodiments, the classification module 207 tracks and records stock outs of a particular product in a particular store based on the data stream that is generated from multiple visits to a store at different time. In other embodiments, the classification module 207 tracks and records frequency of stock outs across multiple stores over a time period based on the data stream that is generated from multiple visits to multiple stores. It is advantageous that the classification module 207 can automatically detect recurring stock outs because it is difficult for a person to do so based on his or her memory.

In some embodiments, the classification module 207 determines a recall condition from the data stream and extracts a portion of data from the data stream based on the recall condition. The classification module 207 matches product information in the data stream to a list of recall products in a data storage 243. For example, the classification module 207 determines whether a received image of the data stream includes the recall products. The classification module 207 identifies a recall condition responsive to a match (e.g., determining that the received image includes the recall products). In some embodiments, the classification module 207 flags each recall product on the received image. The classification module 207 extracts, from the data stream, a portion of data including the received image, locations of the recall products (e.g., flagged products) in the received image, the list of recall products, etc., and associates the extracted data with the recall condition.

In some embodiments, the classification module 207 determines a position map condition from the data stream and extracts a portion of data from the data stream based on the position map condition. The classification module 207 receives a product location indicating an actual position of the product shown in a received image. The product location may indicate an absolute position or a relative position of the product. The classification module 207 compares the actual position of the product to the expected position of the product shown in an image of the planogram (i.e., the image showing ideal/expected product positions) and determines a position map condition based on the comparison. In some embodiments, the classification module 207 overlays the position information onto the image of the planogram or the image of the realogram (i.e., the received image showing actual product positions) to determine a position map condition.

The position map condition indicates whether a product is located at the right place at a time. The position map condition also indicates a frequency of a product sitting in wrong locations over time. For example, the classification module 207 determines that a product is actually positioned at places A, A and B in three weeks based on three weekly-taken images of a retailer store. The classification module 207 overlays the actual positions A, A and B on images of the planogram that show the expected positions A, B and B. From the overlaps and non-overlap on the images, the classification module 207 determines the position map condition. The condition indicates that the product is misplaced in the second week while the product is in its right location in the first and third weeks. By tracking product positions with the position map condition, the classification module 207 clearly identifies and visually presents where the wrong location is and where the correct location should be. The current approaches may notify a user of a UPC code in a wrong position; however, it has limited use in a store where a large amount of products sit on shelves.

In some embodiments, the classification module 207 determines a position map condition based on product locations in a single store. In other embodiment, the classification module 207 determines a position map condition based on product locations in two or more stores by aggregating location information of the two or more stores if the two or more stores have the same planogram. The classification module 207 extracts, from the data stream, a portion of data including the received image, the planogram image, actual locations of a product in the received image, expected locations of the product in the planogram image, etc., and associates the extracted data and the overlays with the position map condition.

In some embodiments, the classification module 207 determines a new product condition from the data stream and extracts a portion of data from the data stream based on the new product condition. In some embodiments, the classification module 207 identifies an unindexed product from the data stream and determines a new product condition. The information of an unindexed product is absent in a data storage 243, i.e., the features of unindexed product (e.g., luminance, color, package dimension) do not match the features stored in the data storage 243. The classification module 207 extracts a portion of data including an image of the unindexed image, a location of the unindexed product and features of the unindexed product from the data stream. The extracted data will be used to combine with additional information (e.g., obtained from other resources) to identify the product and index the product in the data storage 243. In other embodiments, the classification module 207 determines a new product condition based on identifying a new product from competitors' product information in the data stream. For example, the data stream includes competitors' on-shelf inventory that was collected during one or more visits to the competitors' store. The classification module 207 extracts the competitor's product information from the data stream and associates the extracted data with the new product condition.

In some embodiments, the classification module 207 determines a price match condition from the data stream and extracts a portion of data from the data stream based on the price match condition. In some embodiments, the classification module 207 determines a price match condition based on a price adherence score. The price adherence score is a measure of an expected price of a product to an actual price of the product. For example, the price adherence score is the quotient of dividing the expected price by the actual price. If the price adherence score for a product is often higher or lower than one, the product may be overpriced or underpriced. The classification module 207 extracts, from the data stream, a portion of data including an actual price of a product, an expected price of the product, an image of the product, etc., and associates the extracted data and the price adherence score with the price match condition.

In some embodiments, the classification module 207 determines a representative performance condition from the data stream and extracts a portion of data from the data stream based on the representative performance condition. The classification module 207 determines a representative performance condition based on a representative score that measures the performance of a retail execution representative (herein referred as "representative"). In some embodiments, the classification module 207 aggregates information such as planogram compliance, the number of stock outs, the frequency of recurring stock outs for a product, etc., to compute a representative score for a representative. The planogram compliance indicates a match level between the realogram and the planogram. For example, the classification module 207 computes a higher score for a first representative than for a second representative since there are no stock outs in the working area of the first representative and a number of stock outs in the working area of the second representative during a time period. The classification module 207 may also compute a higher representative score for the first representative in September than in August. The higher the representative score of a representative, the better the performance of the representative. The classification module 207 extracts, from the data stream, a portion of data including a received image of realogram, an image of the planogram, the planogram compliance, the number of stock outs, the frequency of recurring stock outs, etc., and associates the extracted data and the representative score with the representative performance condition.

In some embodiments, the classification module 207 determines a planogram adherence condition from the data stream and extracts a portion of data from the data stream based on the planogram adherence condition. The classification module 207 determines a planogram adherence condition based on a planogram adherence score. In some embodiments, the classification module 207 rates adherence of a product to the expected x-y coordinates of the product to compute a planogram adherence score. For example, the classification module 207 determines, from a received image, that the product sits on the expected location, and determines the planogram adherence score to be 100. If the product sits on the farthest possible distance from the expected x-y coordinates, for example, the expected location is the top-left corner of a shelf and the product is actually placed at the bottom-right corner of the shelf, the classification module 207 determines the planogram adherence score to be one. If the product is missing in the received image, the classification module 207 determines the planogram adherence score to be zero. The classification module 207 may determine the planogram adherence score for a single product, some products, or all products in a received image. The classification module 207 may determine an overall planogram adherence score based on the respective score for each product in the received image to provide a quick insight into overall planogram compliance. The classification module 207 extracts, from the data stream, a portion of data including a received image, an image of the planogram, the actual locations of a product, the expected locations of the product, etc., and associates the extracted data and the planogram adherence score(s) with the planogram adherence condition.

In some embodiments, the classification module 207 determines a profit adherence condition from the data stream and extracts a portion of data from the data stream based on the profit adherence condition. The classification module 207 determines a profit adherence condition based on a profit credit score. The profit credit score is used to provide feedback on profit potential of positions on shelves of product in realogram. In some embodiments, the classification module 207 receives locations of products in a received image and computes a profit credit score for a product based on the position of a product relative to a shelf and the position of the product relative to other products on the same shelf. The classification module 207 may assign a profit credit score of 100 to a highest profit position (e.g., the middle position of the second top shelf) and assign a profit credit score of one to a lowest profit position (e.g., the left corner of the bottom shelf). In some embodiments, the classification module 207 also aggregates the profit credit scores to determine an overall score of the product across multiple stores, which may then be compared to store demographics for further analysis. The classification module 207 extracts, from the data stream, a portion of data including a received image of realogram, an image of the planogram, the locations of products, the number of stock outs, the frequency of recurring stock outs, etc., and associates the extracted data and the profit credit score(s) with the profit adherence condition.

The suggestion module 209 may include software and/or logic to provide the functionality for generating a suggestion based on the condition determined from the data stream.

The suggestion module 209 receives a condition and a portion of data associated with the condition from the classification module 207 and generates one or more suggestions based on the condition. In some embodiments, a suggestion is advice for performing a corrective action. In other embodiments, a suggestion is a notification about the portion of data and describing potential usage of the portion of data.

In some embodiments, the suggestion module 209 receives an out of stock condition and generates advice for performing a corrective action based on the out of stock condition. For example, the suggestion module 209 generates advice for finding the missing products from the inventory and replacing voids of a shelf with the missing products. For a hidden out of stock condition, the suggestion module 209 may also generate advice for relocating the misplaced products. Responsive to out of stock conditions determined over time (e.g., repetition of stock outs), the suggestion module 209 may suggest a discussion about whether to change the product order or the order frequency.

In some embodiments, the suggestion module 209 receives a recall condition and generates advice for performing a corrective action based on the recall condition. For example, the suggestion module 209 generates advice for pulling recalled products from the shelves and from store inventory.

In some embodiments, the suggestion module 209 receives a position map condition and generates advice for performing a corrective action based on the position map condition. For example, the suggestion module 209 generates advice for repositioning a product. In other embodiments, responsive to receiving the position map condition and a portion of data associated with the position map condition, the suggestion module 209 may also generate a notification describing potential usage of the portion of data. For example, the suggestion module 209 generates a notification notifying that the portion of data should be merged with sales volume and profit data such that repositioning of products is based on overall shelf profit and is automatic. The suggestion module 209 may also generate a notification notifying that the portion of data can be used for feedback to in-store stockers or the portion of data should be compared against sales data to determine how the portion of data impacts the sales data.

In some embodiments, the suggestion module 209 receives a new product condition and generates advice for performing a corrective action based on the position map condition. For example, the suggestion module 209 generates advice for capturing additional information of the unindexed product, updating the data stream with the additional information, and adding the additional information to the data storage 243 for indexing the product. In other embodiments, responsive to receiving the new product condition and a portion of data associated with the new product condition, the suggestion module 209 may also generate a notification. For example, the suggestion module 209 generates a notification notifying the presence of the new product for purpose of competitive awareness and tracking, or notifying that the portion of data may be used in making a business plan.

In some embodiments, the suggestion module 209 receives a price match condition and generates a notification. For example, the suggestion module 209 generates a notification notifying the price adherence score and how this score can be used in adjusting business plan (e.g., adjusting the over-priced product).

In some embodiments, the suggestion module 209 receives a representative performance condition and generates advice for performing a corrective action based on the representative performance condition. For example, the suggestion module 209 generates advice of changing personal behavior or suggesting where in depth assessments may be required. In other embodiments, the suggestion module 209 may also generate a notification of the representative score for a representative and how this score may change job focus of the representative.

In some embodiments, the suggestion module 209 receives a planogram adherence condition and generates a notification. For example, the suggestion module 209 generates a notification notifying the planogram adherence score, the relationship between this score and overall planogram compliance, and an instruction to adjust the planogram compliance based on the score.

In some embodiments, the suggestion module 209 receives a profit adherence condition and generates a notification. For example, the suggestion module 209 generates a notification notifying the profit credit score and an instruction to maximize the profit of each given shelf arrangement based on the score.

The action module 211 may includes software and/or logic to provide the functionality for performing an action based on the received advice and notification.

In some embodiments, the action module 211 receives advice and notification generated based on one or more conditions and determines one or more recipients for the advice and notification. A recipient can be a representative, a store manager, a category manager, a product manager, a space planner, a manufacture staff, etc. In some embodiments, the action module 211 determines the recipient for the advice and notification based on the condition. For example, the action module 211 determines the advice and notification generated based on the price match condition should be sent to a category manager. In other embodiments, the action module 211 determines the recipient for the advice and notification based on the content of the advice and notification. For example, the action module 211 determines that the recipients of the notification including a representative score for a representative are the representative and a store manager.

The action module 211 transmits the advice and notification to the recipient. The action module 211 also transmits to the recipient a portion of data associated with the condition based on which the advice and notification was generated. The data (e.g., images or other graphical data) presented to a recipient may help the recipient easily understand the problem. For example, the recipient intuitively sees where the product is missing or misplaced from a received image. The recipient may perform a corrective action based on the advice and the portion of data. Based on receiving a notification, the recipient may also use the portion of data for further analysis and make a future plan or decision based on the analysis. For example, a user can determine his or her own corrective action to be performed based on the notification.

For example, responsive to receiving advice, notification, a portion of data determined based on the out of stock condition, a representative may get stock and replace voids, or relocate misplaced products and fix hidden stock out problem, or discuss with the store manager as to whether to change the product order. Responsive to receiving advice, notification, a portion of data determined based on the recall condition, a representative may pull the recall product from the shelves. Responsive to receiving advice, notification, a portion of data determined based on the position map condition, a representative may reposition the product. A category manager and a space planner may compare the portion of data against sales data, and factor into next season planning, profit expectations, sales expectations, etc. Responsive to receiving advice, notification, a portion of data determined based on the new product condition, a representative may capture additional information of an unindexed product and update the data stream and a data storage 243 with the additional information. A category manager and a product manager may change business plans, products, etc. based on what competitors are doing with the new product. Responsive to receiving advice, notification, a portion of data determined based on the price match condition, a category manager may adjust business plans, store agreements, etc. Responsive to receiving advice, notification, a portion of data determined based on the representative performance condition, a representative may change his or her own behavior, and a store manager may change how to focus on representative performance and which representative to spend more time with. Responsive to receiving advice, notification, a portion of data determined based on the planogram adherence condition, a representative receives high level scores that give a quick insight into overall planogram and as a result adjusts time spent on planogram compliance. Responsive to receiving advice, notification, a portion of data determined based on the profit adherence condition, a manufacturer staff can plan shelf space to maximize the profit of each given shelf arrangement. A category manager and a space planner may adjust future planograms based on the relationship between the overall profit credit scores, the overall profit credit score per product, the sales volume, and net profit of each product.

In some embodiments, the action module 211 receives acknowledgement that a recipient has performed a first action based on the advice and notification, and performs a second action based on the acknowledgement. For example, the action module 211 receives an image from a representative showing the recall products having been removed from the shelves, and generates and sends a notification to the manufacture staff about the completion of the recall. In another example, the action module 211 receives acknowledgement of price adjustment and triggers the update of the data stream (e.g., the image processing module 203 receives an image of the new price tags and the data stream generator 205 adds the image to the data stream).

The corrective action module 215 may include software and/or logic for assessing issues within the realogram in context of the associated planogram and generating corrective actions. In some embodiments, the corrective action module 215 analyzes the state of the realogram in the context of the associated planogram to generate a ranked list of corrective actions for a user. In some embodiments, the corrective action module 215 receives data including the matched planogram and realogram brand chunks and product facings from the alignment module 219. The corrective action module 215 retrieves a set of rules from the data storage 243. The corrective action module 215 applies the set of rules on the aligned planogram and realogram brand chunks and product facings to detect and categorize the one or more issues that are present in the realogram. In other embodiments, the corrective action module 215 sends the corrective action data to an application (e.g., a browser) in the client device 115 via the communication unit 241 causing the application to present the corrective action.

The corrective action module 215 identifies a planogram product facing, retrieves a UPC of the planogram product facing, and counts a number of other planogram product facings having the same UPC within a linear group of the planogram. The corrective action module 215 identifies a realogram matched to the planogram and applies a set of rules to identify a corrective action.

An out of stock situation arises when product facings of a particular brand are missing from a shelf of the realogram. There can be two types of out of stock situations. One is a visible out of stock and the other is a hidden out of stock. A visible out of stock situation arises when there is a hole (gap classification) in the realogram where there should be a realogram product facing corresponding to the planogram product facing. A hidden out of stock arises when there is no hole (gap classification) in the realogram. Rather, other realogram product facings have filled the space where there should be a realogram product facing corresponding to the planogram product facing.

The corrective action module 215 retrieves a rule for identifying a hidden out of stock corrective action in the realogram. The rule for identifying the hidden out of stock corrective action states that a) if the number of facings for the planogram product facing is one in the planogram and b) the planogram product facing is not connected to a corresponding realogram product facing in the realogram, then there is a hidden out of stock corrective action in the realogram. The corrective action module 215 determines whether the planogram product facing satisfies the rule. The corrective action module 215 sends instructions to the user interface module 213 for displaying the hidden out of stock corrective action on the realogram based on the planogram product facing satisfying the rule for hidden out of stock corrective action.

The corrective action module 215 retrieves a rule for identifying a visible out of stock corrective action in the realogram. The rule for identifying the visible out of stock corrective action states that a) if the number of facings for the planogram product facing is one in the planogram and b) the planogram product facing is connected to a hole in the realogram, then there is a visible out of stock corrective action in the realogram. The corrective action module 215 determines whether the planogram product facing satisfies the rule. The corrective action module 215 sends instructions to the user interface module 213 for displaying the visible out of stock corrective action on the realogram based on the planogram product facing satisfying the rule for visible out of stock corrective action.

A missing facing situation arises when there is more than one product facing allocated to a product of a particular UPC in a planogram and one or more of corresponding product facings in the realogram contain no product. Again, there can be two types of missing facing situations. One is a visible missing facing and the other is a hidden missing facing.

The corrective action module 215 retrieves a rule for identifying a hidden missing facing corrective action in the realogram. The rule for identifying the hidden missing facing corrective action states that a) if the number of product facings for the planogram product facing is greater than one, b) if at least one other product facing is connected to a corresponding realogram product facing, and c) if the planogram product facing is not connected to a corresponding realogram product facing in the realogram, then there is a hidden missing facing corrective action in the realogram. The corrective action module 215 determines whether the planogram product facing satisfies the rule. The corrective action module 215 sends instructions to the user interface module 213 for displaying the hidden missing facing corrective action on the realogram based on the planogram product facing satisfying the rule for hidden missing facing corrective action.

The corrective action module 215 retrieves a rule for identifying a visible missing facing corrective action in the realogram. The rule for identifying the visible missing facing corrective action states that a) if the number of product facings for the planogram product facing is greater than one, b) if at least one other product facing is connected to a corresponding realogram product facing, and c) if the planogram product facing is connected to a hole in the realogram, then there is a visible missing facing corrective action in the realogram. The corrective action module 215 determines whether the planogram product facing satisfies the rule. The corrective action module 215 sends instructions to the user interface module 213 for displaying the visible missing facing corrective action on the realogram based on the planogram product facing satisfying the rule for visible missing facing corrective action.

An extra facing situation arises when an extra product facing is found on a shelf of the realogram. The extra product facing is not defined in the planogram corresponding to the realogram.

The corrective action module 215 retrieves a rule for identifying a visible extra facing corrective action in the realogram. The rule for identifying the visible extra facing corrective action states that a) if a realogram product facing is not a hole and b) the realogram product facing is not connected to a corresponding planogram product facing, then there is a visible extra facing in the realogram. The corrective action module 215 determines whether a realogram product facing satisfies this rule. The corrective action module 215 sends instructions to the user interface module 213 for displaying the visible extra facing corrective action on the realogram based on the realogram product facing satisfying the rule for visible extra facing corrective action.

In some embodiments, the corrective action module 215 retrieves a rule for identifying a placement corrective action in the realogram. The rule for identifying the placement corrective action states that a) if the index position of a planogram product facing is not matching the index position of a realogram product facing that corresponds to the planogram product facing, then there is a placement corrective action in the realogram. The corrective action module 215 determines whether the planogram product facing satisfies the rule and identifies that there is corrective action for placement in the realogram based on the planogram product facing satisfying the rule. In other embodiments, the corrective action module 215 receives the placement corrective action flagged by the alignment module 219.

The analytics module 221 may include software and/or logic for processing the aligned planogram and realogram and generating key performance indicators. For example, the analytics module 221 generates a share of shelf report as a key performance indicator. The share of shelf report is generated by accounting for the actual space taken up by the products on the shelf. In some embodiment, the analytics module 221 generates analytics information and provides it to the user via user interface or a report or warning.

In some embodiments, the analytics module 221 receives data including the aligned or connected planogram and realogram brand chunks and product facings from the alignment module 219. In some embodiments, the analytics module 221 processes each linear group to consolidate brand chunks of a same brand into a single container. The analytics module 221 identifies a brand chunk, creates a brand container, and adds the brand chunk to the brand container. In some embodiments, the analytics module 221 determines whether the brand container for the brand chunk exists and adds the brand chunk to the brand container based on the brand chunk determined as existing.

In some embodiments, the analytics module 221 determines a size of each brand container belonging to a brand in each linear group. The analytics module 221 determines a size of the brand container by adding together the individual brand chunk sizes of the same brand included within the brand container. The analytics module 221 combines the sizes of one or more brand containers belonging to each brand across all of the linear groups and generates a share of shelf. In some embodiments, the analytics module 221 generates a share of shelf report for the realogram and a share of shelf report for the planogram that corresponds to the realogram. The analytics module 221 compares the share of shelf report for the planogram and the realogram.

The user interface module 213 may include software and/or logic for providing user interfaces to a user. In some embodiments, the user interface module 213 receives instructions from the image processing module 203 to generate a graphical user interface that instructs the user to capture an image of a retail shelf stocking products on the display of the client device 115. In some embodiments, the user interface module 213 receives instructions from the image processing module 203 to generate a graphical user interface of the realogram on the display of the client device 115. In some embodiments, the image processing module 203 receives instructions from the corrective action module 215 to generate a graphical user interface for displaying the advice and notification relating to the realogram on the display of the client device 115. In other embodiments, the user interface module 213 sends the graphical user interface data to an application (e.g., a browser) in the client device 115 via the communication unit 241 causing the application to display the data in a graphical user interface.

Figure 3:
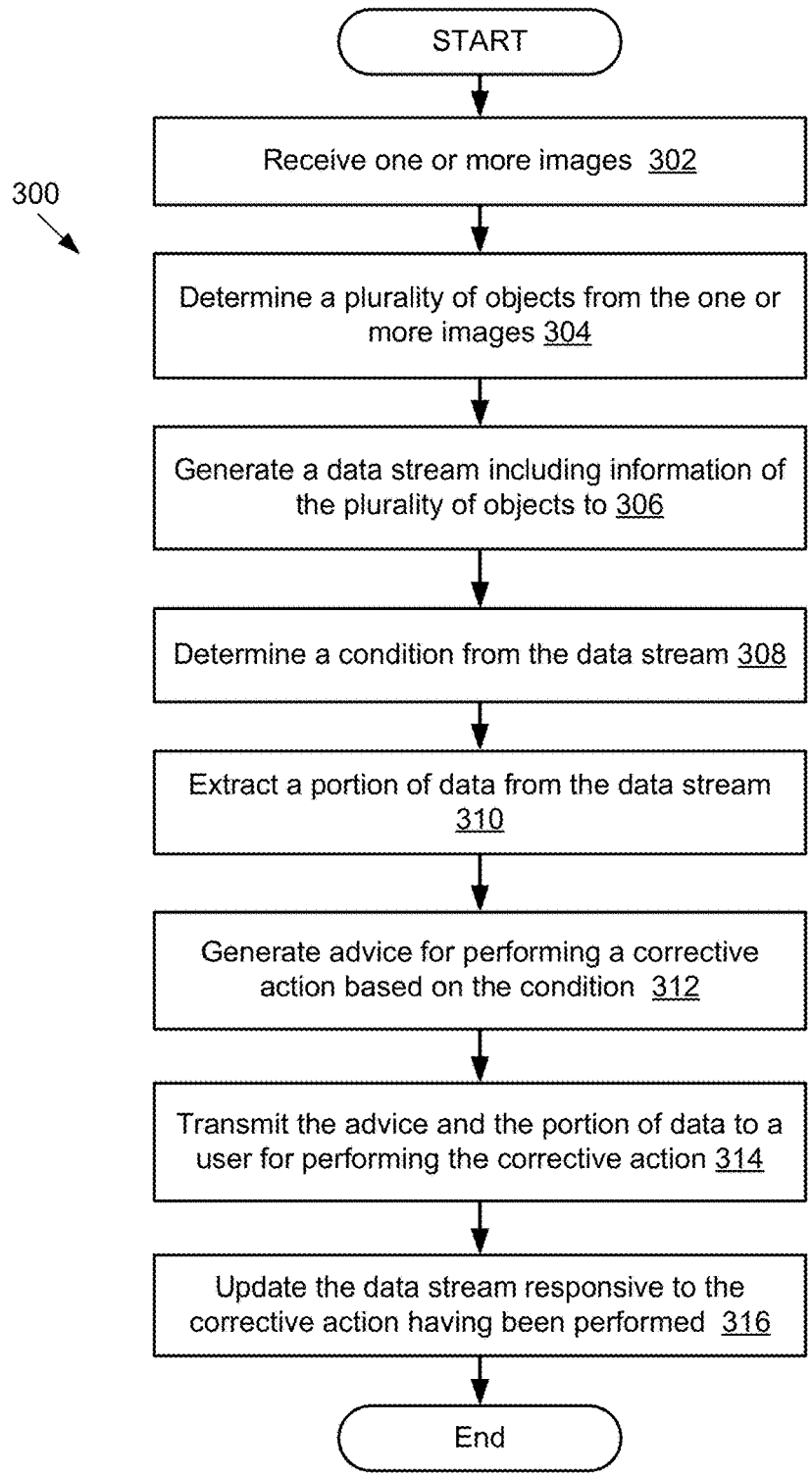
FIG. 3 is a flow diagram illustrating one embodiment of a method for generating an advice for performing a corrective action based on a condition.

FIG. 3 is a flow diagram 300 illustrating one embodiment of a method for generating an advice for performing a corrective action based on a condition. As described above, the image recognition application 103 may include an image processing module 203, a data stream generator 205, a classification module 207, a suggestion module 209, and an action module 211. At 302, the image processing module 203 receives one or more images. At 304, the image processing module 203 determines a plurality of objects from the one or more images. In some embodiments, the image processing module 203 identifies objects in the one or more images based on extracting features from the one or more images and matching the extracted features to those features stored in the data storage 243 for recognition. In other embodiments, the image processing module 203 determines one or more unindexed objects from the one or more images, where information of the unindexed objects does not match information stored in the data storage 243. At 306, the data stream generator 205 generates a data stream including information of the plurality of objects. The object information may include an object identifier, one or more associated images, a location of an object, metadata related to the object, etc.

At 308, the classification module 207 determines a condition from the data stream. In some embodiments, the condition can be one of the group of a regular out of stock condition, a hidden out of stock condition, a recall condition, a position map condition, a new product condition, a price match condition, a representative performance condition, a planogram adherence condition, and a profit adherence condition. At 310, the classification module 207 extracts a portion of data from the data stream. At 312, the suggestion module 209 generates advice for performing a corrective action based on the condition. For example, for the out of stock condition, the suggestion module 209 generates advice for finding the missing products from the inventory and replacing voids of a shelf with the missing products. At 314, the action module 211 transmits the advice and the portion of data to a user for performing the corrective action. In some embodiments, the action module 211 receives the advice and determines one or more recipients for the advice. At 316, the data stream generator 205 updates the data stream responsive to the corrective action having been performed. For example, the action module 211 receives acknowledgement of price adjustment and triggers the update of the data stream (e.g., the image processing module 203 receives an image of the new price tags and the data stream generator 205 adds the image to the data stream).

Figure 4:
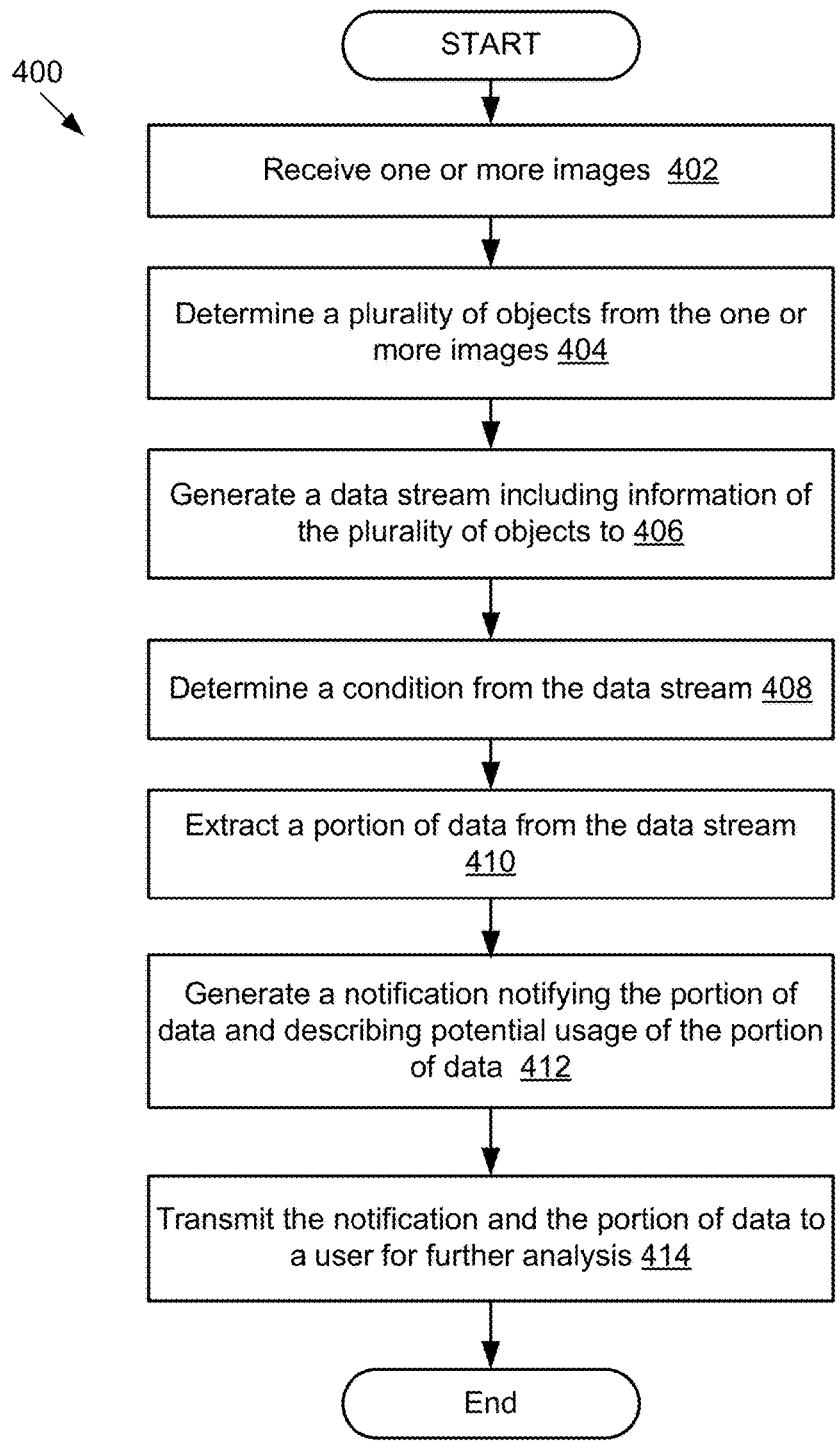
FIG. 4 is a flow diagram illustrating one embodiment of a method for generating a notification describing potential usage of a portion of data associated with a condition.

FIG. 4 is a flow diagram 400 illustrating one embodiment of a method for generating a notification describing potential usage of a portion of data associated with a condition. As described above, the image recognition application 103 may include an image processing module 203, a data stream generator 205, a classification module 207, a suggestion module 209, and an action module 211. At 402, the image processing module 203 receives one or more images. At 404, the image processing module 203 determines a plurality of objects from the one or more images. At 406, the data stream generator 205 generates a data stream including information of the plurality of objects. At 408, the classification module 207 determines a condition from the data stream. At 410, the classification module 207 extracts a portion of data from the data stream. At 412, the suggestion module 209 generates a notification notifying the portion of data and describing potential usage of the portion of data. At 414, the action module 211 transmits the notification and the portion of data to a user for further analysis. For example, the suggestion module 209 generates a notification notifying the presence of a new product for purpose of competitive awareness and tracking, or notifying that the portion of data may be used in making a business plan.

FIG. 5 is a graphical representation 500 of one embodiment of an example out of stock condition. Images 502 and 504 depict shelves of a store before and after adjustment. The classification module 207 determines an out of stock condition, for example, based on identifying voids on the bottom shelf 506 of image 502. The suggestion module 209 generates advice for a representative to get stock of the product and replace voids of the bottom shelf 506 with the missing product. As a result, a number of products are placed on the bottom shelf 508 as shown in image 504.

Figure 6:
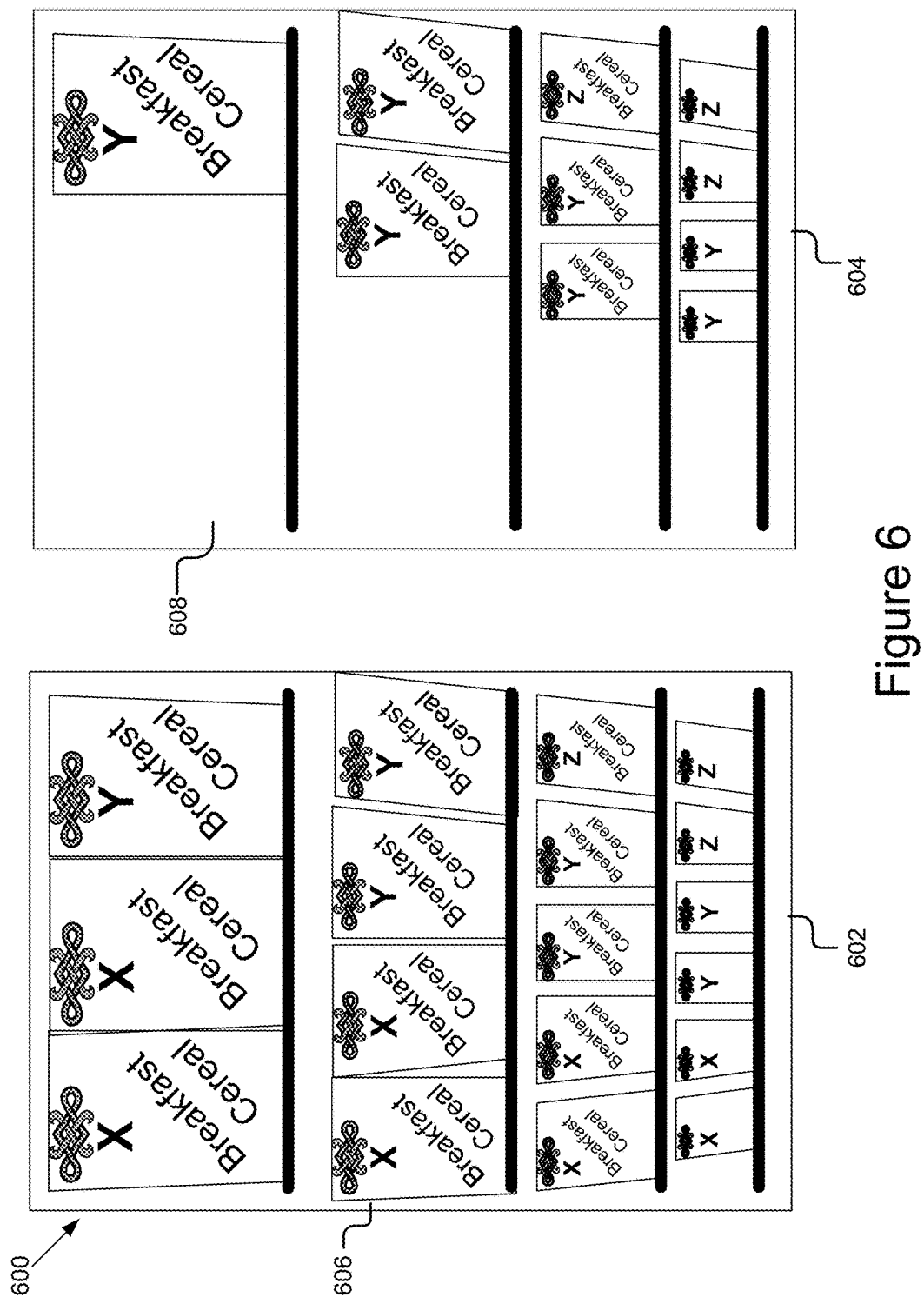
FIG. 6 is a graphical representation of one embodiment of an example recall condition.

FIG. 6 is a graphical representation 600 of one embodiment of an example recall condition. Images 602 and 604 depict shelves of a store before and after adjustment. The classification module 207 compares image 602 with a list of recall products stored in a data storage 243, and determines a recall condition. In the example of FIG. 6, all the breakfast cereal boxes 606 with "X" label or cereal X should be recalled. The suggestion module 209 generates advice for a representative to pull cereal X boxes from the shelves. As a result, the left side of the shelves 608, where the cereal X boxes were placed, is empty as shown in image 604.

Figure 7:
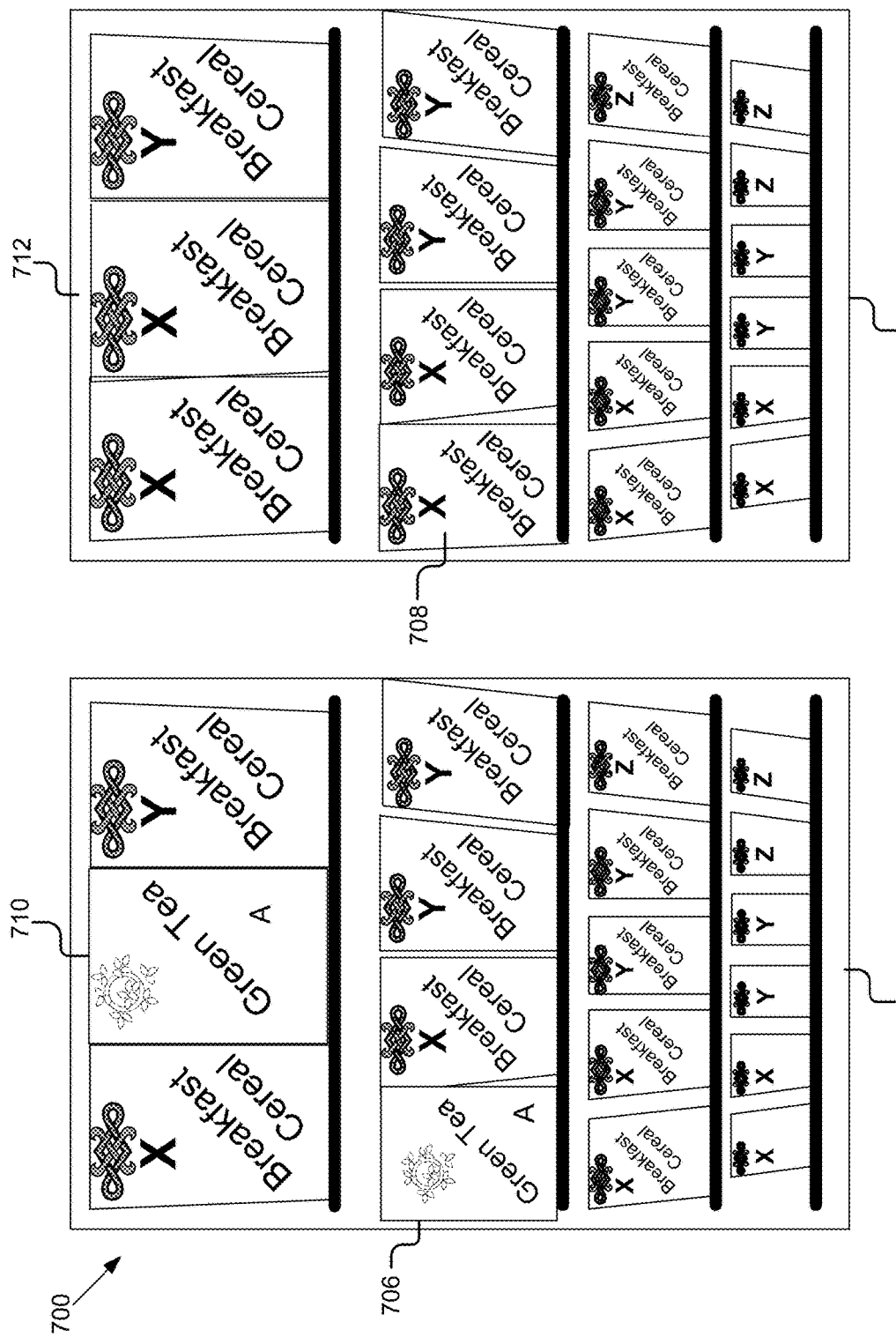
FIG. 7 is a graphical representation of one embodiment of an example position map condition.

FIG. 7 is a graphical representation 700 of one embodiment of an example position map condition. Images 702 and 704 depict shelves of a store before and after adjustment. The classification module 207 compares image 702 with an image of a planogram by overlaying the image 702 on the image of the planogram. From the overlay, the classification module 207 determines two non-overlaps. At locations 706 and 710, two green tea boxes are identified from image 702 while two breakfast cereal boxes are identified from the image of the planogram. As a result, the suggestion module 209 generates advice for a representative to reposition the green tea boxes at locations 706 and 710 of image 702. The representative performed the corrective action and captured an image 704 after correction. As shown in image 704, two breakfast cereal boxes are placed at locations 708 and 712 corresponding to locations 706 and 710 of image 702.

Figure 8:
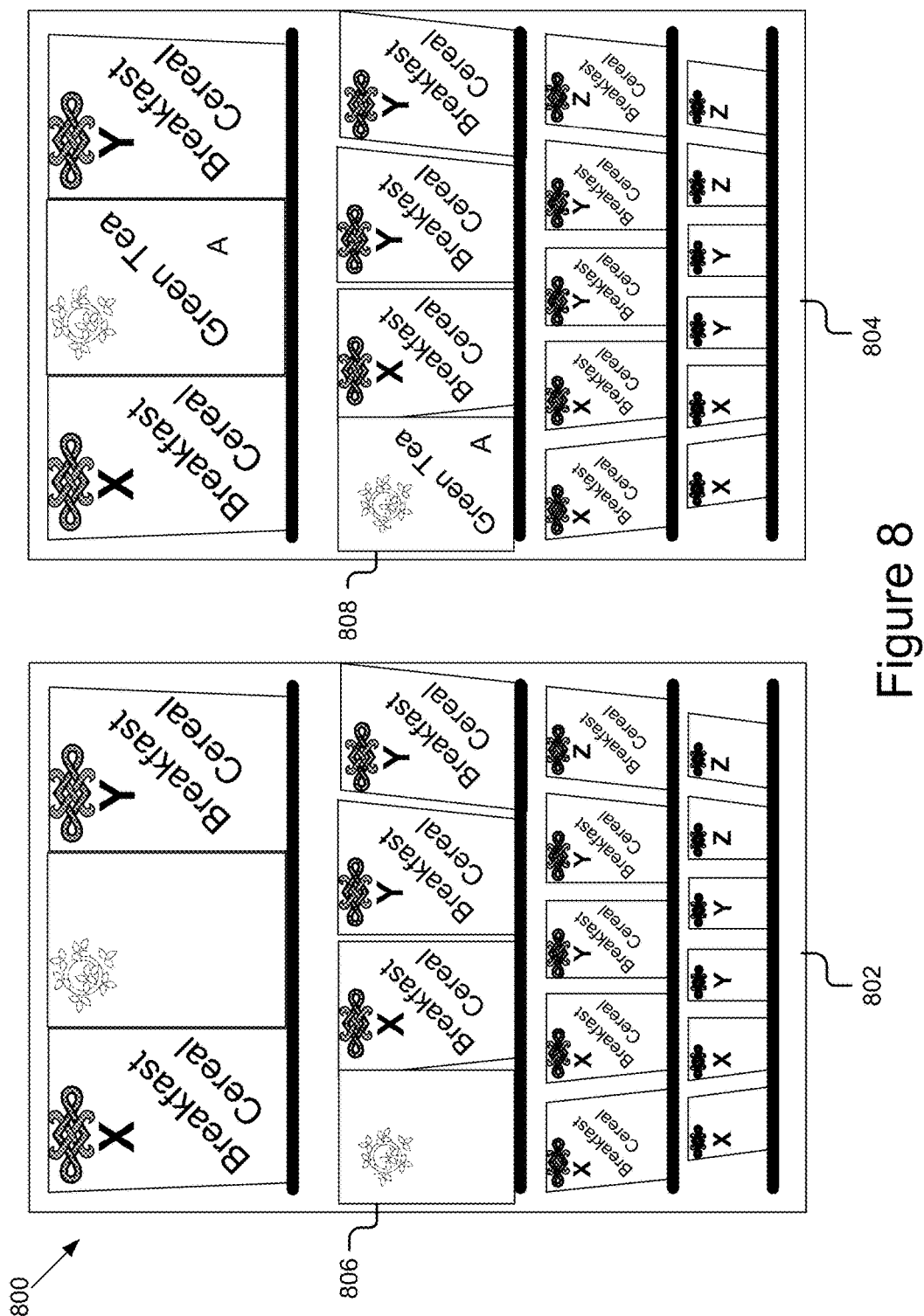
FIG. 8 is a graphical representation of one embodiment of an example new product condition.

FIG. 8 is a graphical representation 800 of one embodiment of an example new product condition. Images 802 and 804 depict shelves of a store before and after adjustment. The classification module 207 determines a new product condition based on information about an unindexed product at location 806 of image 802. The product information includes an image of the package, a package size, a product description (e.g., the flower logo), which cannot be matched to information stored in a data storage 243. The suggestion module 209 generates advice for a representative to capture additional information of the unindexed product. The additional information is used to recognize the product as green tea. As a result, the product at location 808 of image 804 is shown as green tea. The additional information is also added to the data storage 243 for indexing and used to update the data stream.

Figure 9:
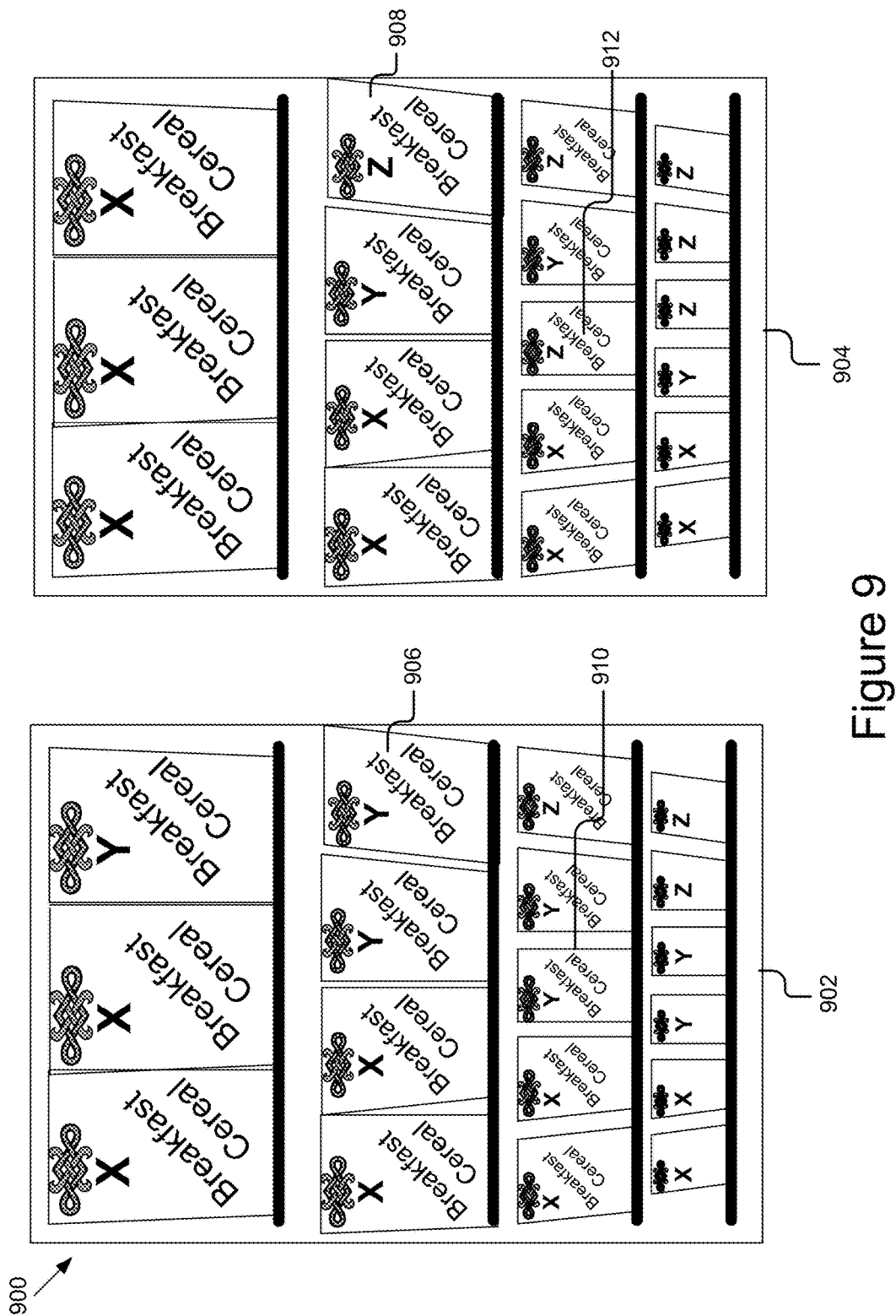
FIG. 9 is a graphical representation of one embodiment of an example price match condition.

FIG. 9 is a graphical representation 900 of one embodiment of an example price match condition. Images 902 and 904 depict shelves of a store before and after adjustment. The classification module 207 receives an actual price of a product from image 902 and an expected price of the product from an image of a planogram, and computes a price adherence score for the product based on the expected price and the actual price of the product. The classification module 207 may compute multiple price adherence scores for the product based on images 902 taken from the store at different time. The classification module 207 determines a price match condition based on the price adherence scores. The suggestion module 209 provides the time series price adherence scores to a category manager. The category manager may determine to reduce the order of cereal Y since the sales data of cereal Y is lower than expected even if its price adherence scores over time show that the cereal Y is already underpriced. Image 902 shows an amount of cereal Y located at positions of shelves such as locations 906 and 910. After the category manager changed the product order, image 904 shows cereal Y is replaced by cereal Z at locations 908 and 912 corresponding to locations 906 and 910 in image 902. Compared with image 902, the total amount of cereal Y is reduced in image 904.

Figure 10:
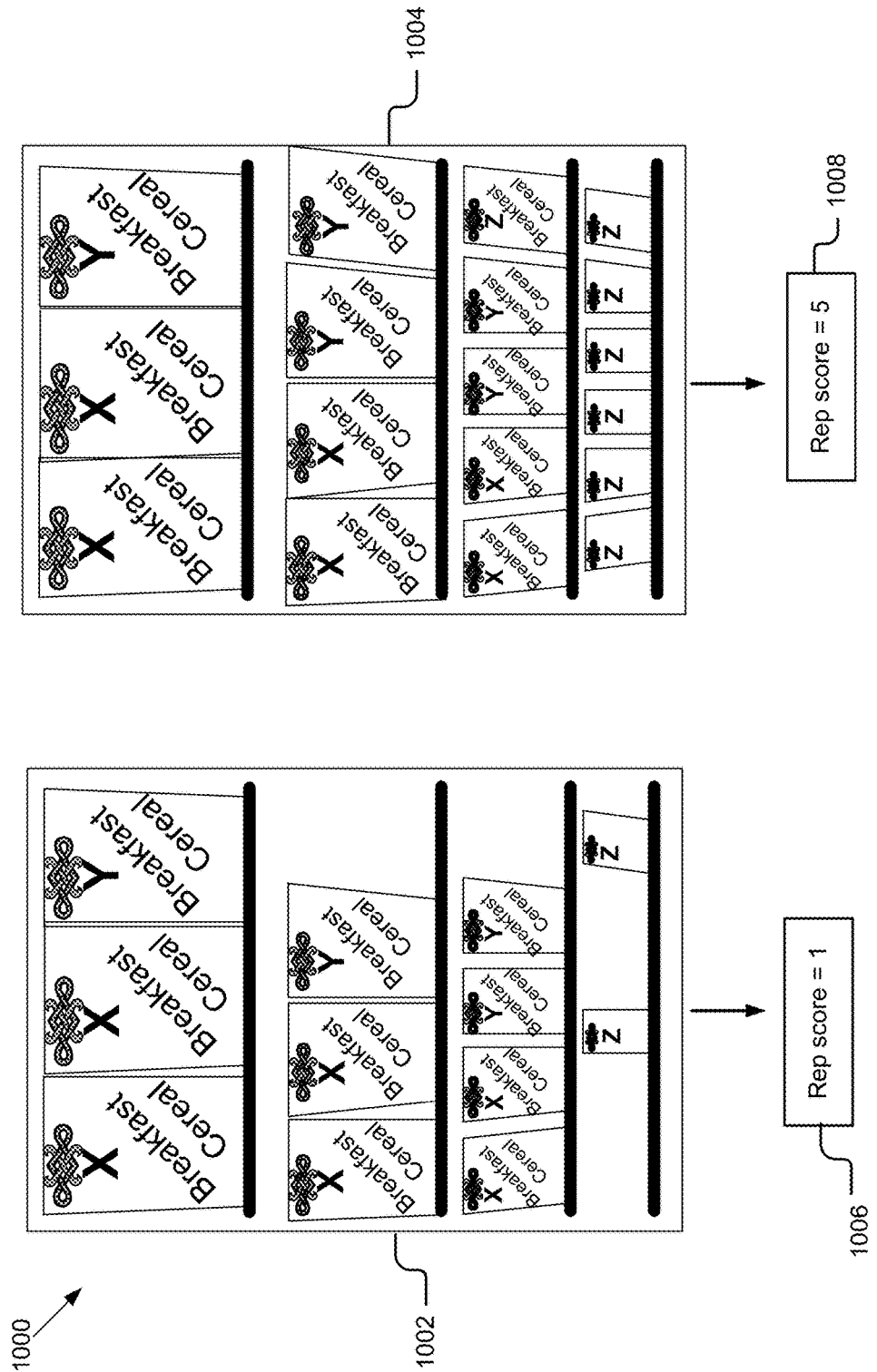
FIG. 10 is a graphical representation of one embodiment of an example representative performance condition.

FIG. 10 is a graphical representation 1000 of one embodiment of an example representative performance condition. Image 1002 shows working area of a first representative. Image 1004 shows working area of a second representative. The two representatives may work in two different stores with the same planogram. The classification module 207 determines representative performance condition based on representative scores for the first and second representatives. The classification module 207 computes a representative score 1006 of one for the first representative based on the out of stock products shown in image 1002. The classification module 207 also computes a representative score 1008 of five for the second representative based on lack of stock out product shown in image 1004. Responsive to receiving scores from the suggestion module 209, the first and second representatives may understand their scores and improve their performance accordingly.

Figure 11:
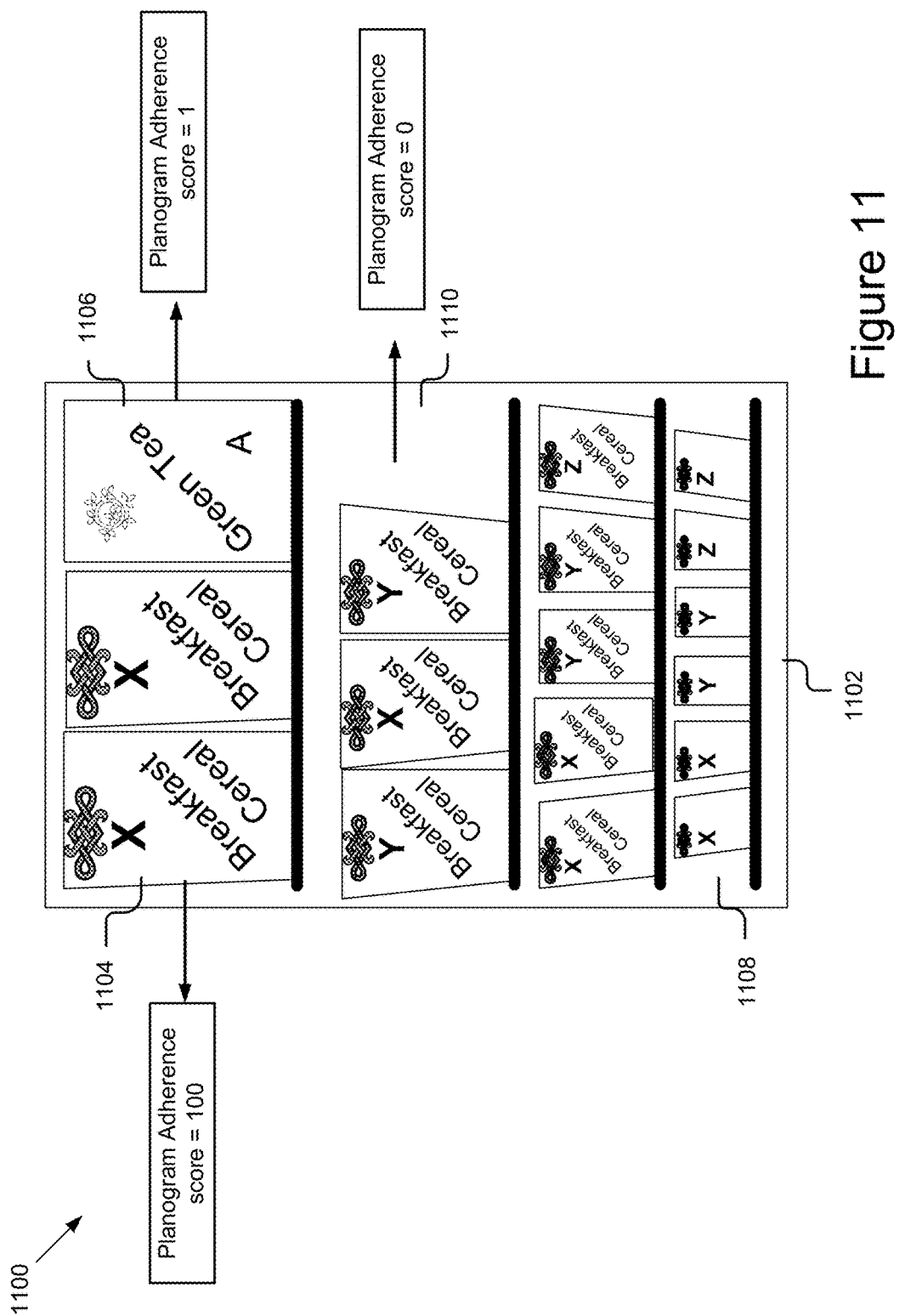
FIG. 11 is a graphical representation of one embodiment of an example planogram adherence condition.

FIG. 11 is a graphical representation 1100 of one embodiment of an example planogram adherence condition. Image 1102 depicts products sitting on shelves of a store. The classification module 207 determines a planogram adherence condition based on a planogram adherence score. The planogram adherence score gives users overall insight of planogram compliance. As shown in image 1102, the classification module 207 determines that the product sits on the expected location 1104 and determines the planogram adherence score to be 100. The classification module 207 determines that the product at location 1106 actually sits on the farthest possible distance from its expected x-y coordinates (e.g., its expected location is 1108), and determines the planogram adherence score to be one. The classification module 207 determines the planogram adherence score to be zero at location 1110 since the product is missing at this location.

Figure 12:
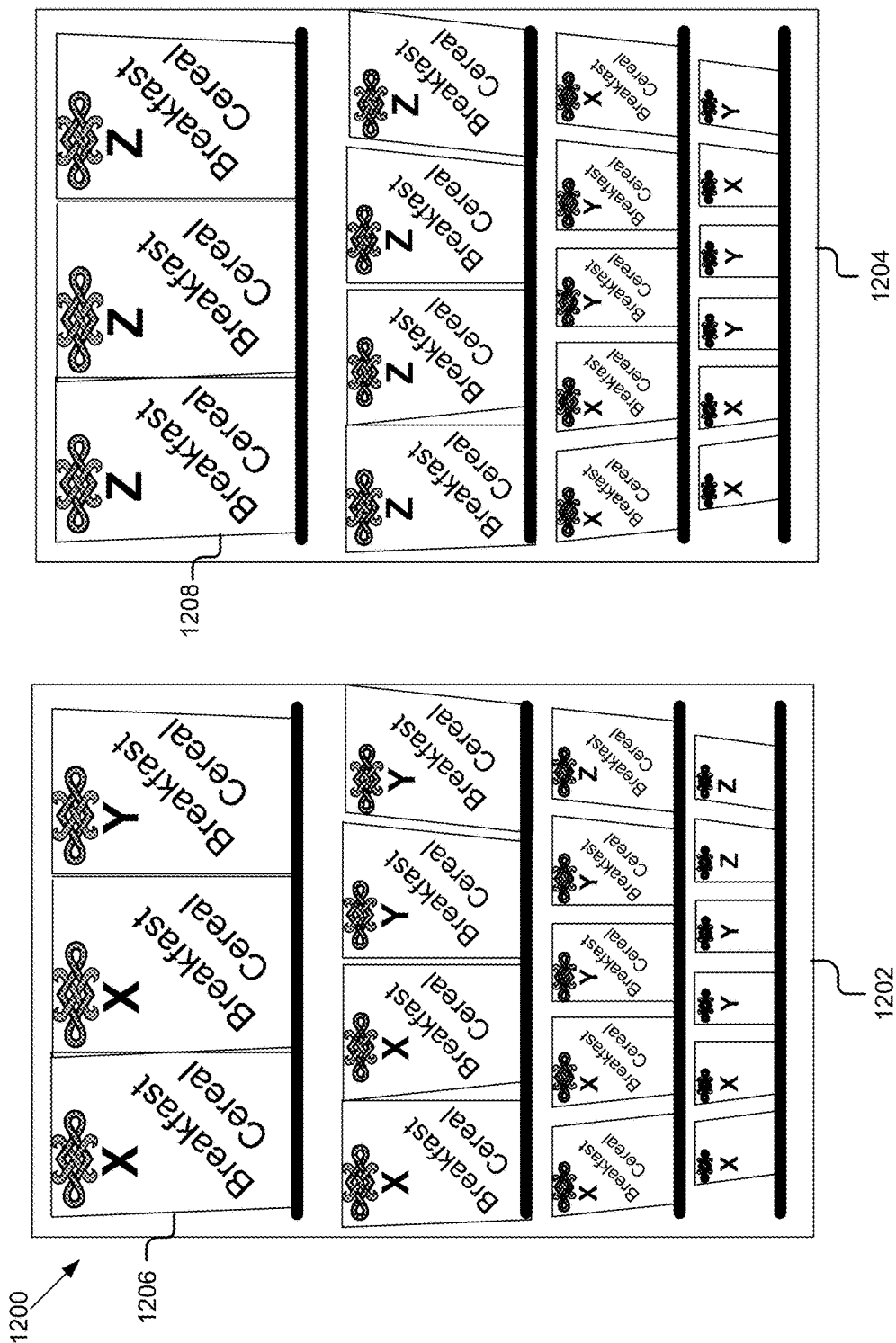
FIG. 12 is a graphical representation of one embodiment of an example profit adherence condition.

FIG. 12 is a graphical representation 1200 of one embodiment of an example profit adherence condition. Images 1202 and 1204 depict shelves of a store before and after adjustment. The classification module 207 determines a profit adherence condition based on a profit credit score. The profit credit score is used to provide feedback on profit potential of positions on shelves of product in image 1202. The suggestion module 209 transmits the score to a category manager. The category manager determines that the popular cereal Z should be positioned at the high score positions (i.e., the top two shelves) to increase the profit. As a result, cereals X and Y on shelf 1206 of image 1202 are relocated to bottom shelves in image 1204. Also cereal Z is moved from low shelves to the top shelf 1208 in image 1204.

Figure 13:
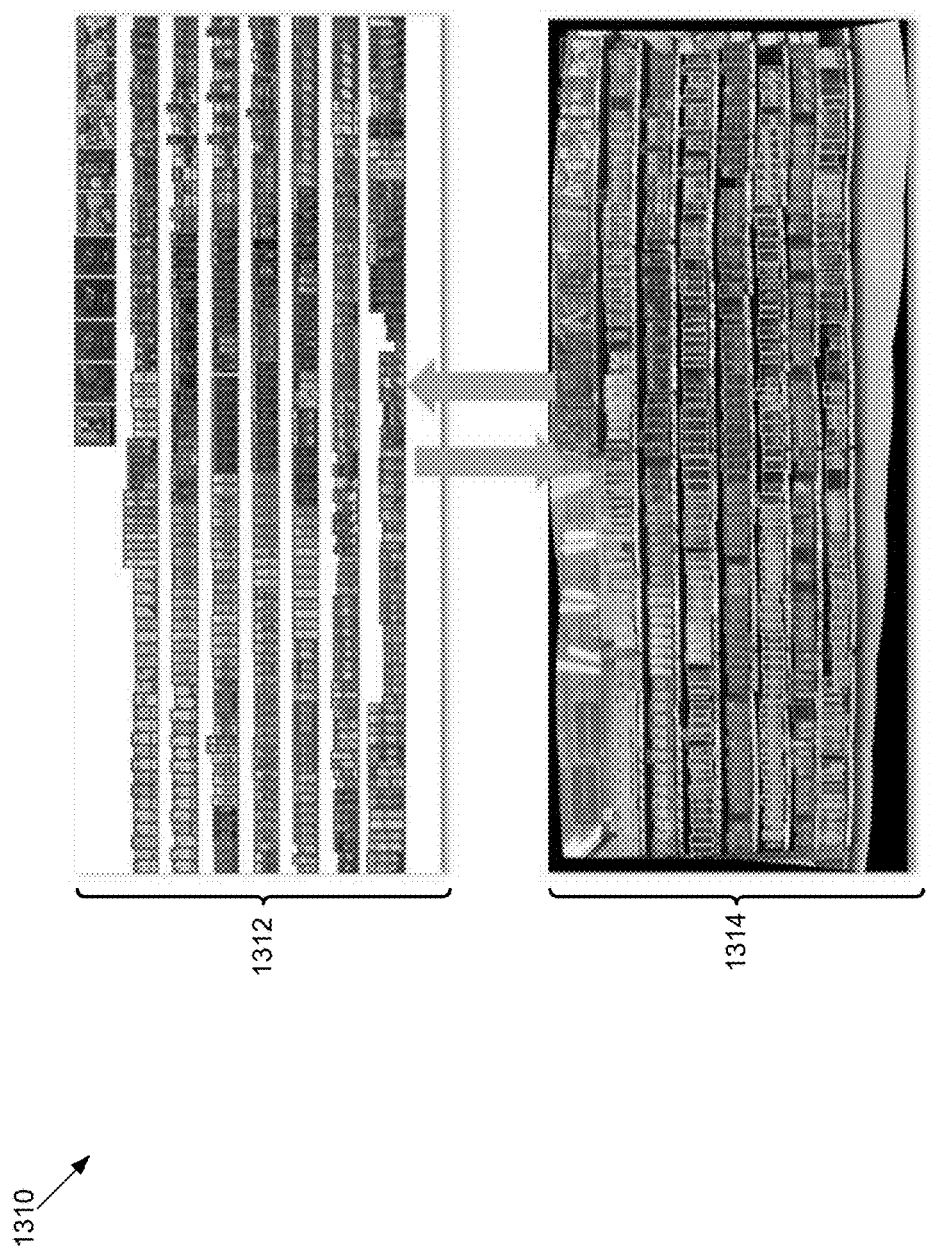
FIG. 13 is a graphical representation of one embodiment of an example comparison between a planogram and a realogram.

FIG. 13 is a graphical representation 1310 of one embodiment of an example comparison between a planogram 1312 to a realogram 1314. The realogram image 1314 may include an image of a full shelf space of products. The planogram 1312 includes a mapping of sample products, as they should appear on a full shelf space. In some embodiments, the products in the planogram may be highlighted or bracketed to differentiate individual products. The highlighting may include different indicators to denote characteristics of the products such as brand, type, costs, facings, etc. The realogram image 1314 may display indicators of recognized products based on image processing performed by the image processing module 203. The comparison between the planogram 1312 and the realogram image 1314 may include changing a highlighting of a product recognized on the realogram image 1314 based on if the products were recognized and identified in a data storage 243 of products. After the comparison, the realogram image 1314 may have highlighting or callouts added to indicate areas where the products and gaps included in the realogram image 1314 differ from the mapping of products in the planogram 1312.

Figure 14:
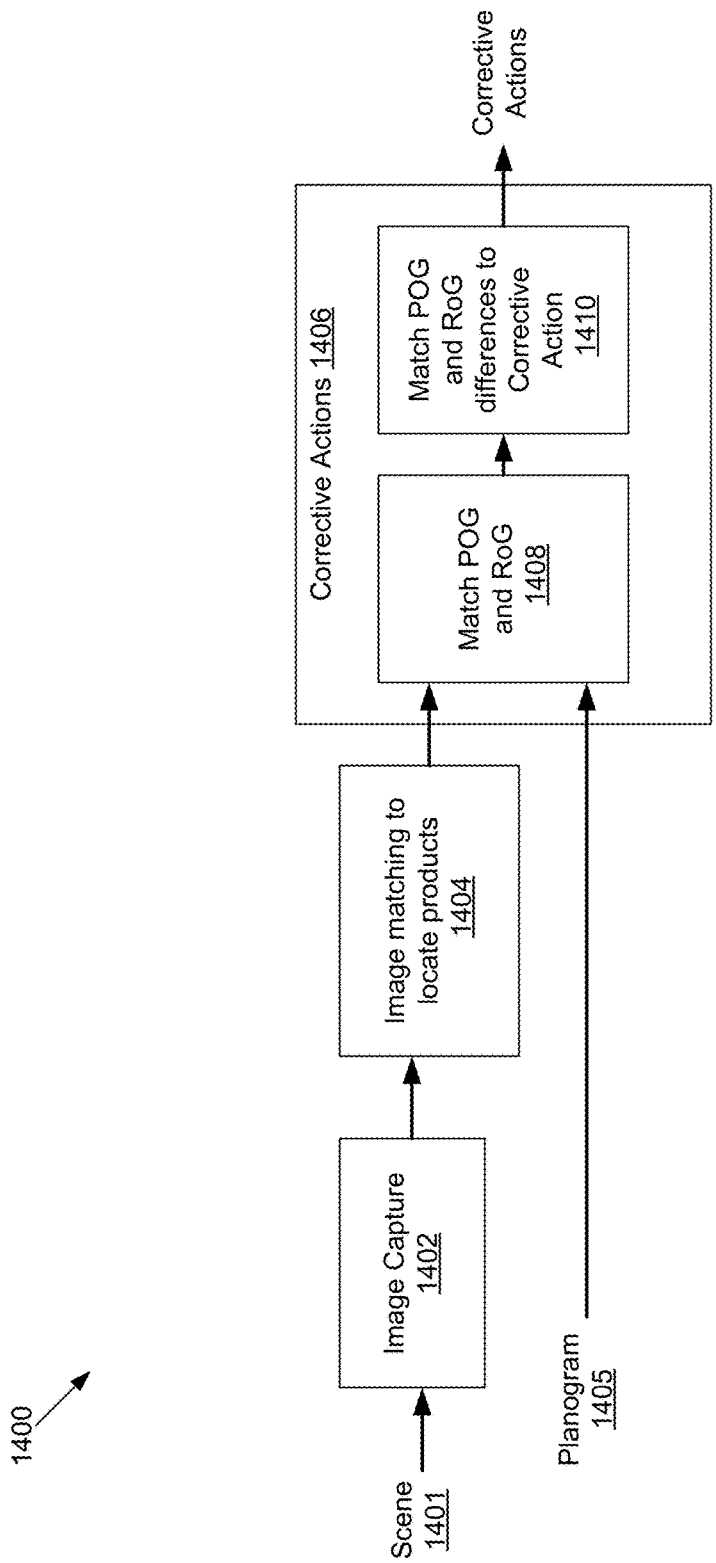
FIG. 14 is a block diagram of an example data flow for comparing an image to a planogram to generate a suggestion or corrective action, according to one embodiment.

FIG. 14 is a block diagram of an example data flow 1400 for comparing an image 1401 (e.g. a store shelf) to a planogram 1405 to generate a suggestion or corrective actions, according to one embodiment. At block 1402, an image 1401 is captured. The image 1401 may be captured by a camera and sent to the image recognition application 103. In some embodiments, multiple images are captured, combined, and then used for further processing. In some embodiments, the image 1401 of the scene may be referred to as a "realogram" representing a real image of a shelf that may be further processed for comparison with a planogram 1405. The image 1401 of the scene may include multiple images of the scene that may be stitched together into a linear panoramic image. At block 1404, the image processing module 203 processes the image 1401 to locate products in the scene by matching potential products to a data storage 243 of product images. At block 1406, the corrective action module 215 determines a corrective action for presentation to a user. Block 1406 may include match planogram and realogram block 1408 that receives the planogram 1405 and the products identified from the image from block 1404. In the match planogram and realogram block 1408, the inputs are compared by the alignment module 219 to identify matches between the image and the planogram 1405. Once the matches are identified in the match planogram and realogram block 1408 that information is provided to block 1410 (also included in block 1406) where the corrective action module 215 determines differences between the image and planogram 1405, identifies corrective action corresponding to those differences, and presents one or more differences as one or more corrective actions. In some embodiments, corrective action module 215 determines corrective actions based on processing by classification module 207, suggestion module 209, action module 211, and gap detection module 217.

Figure 15A:
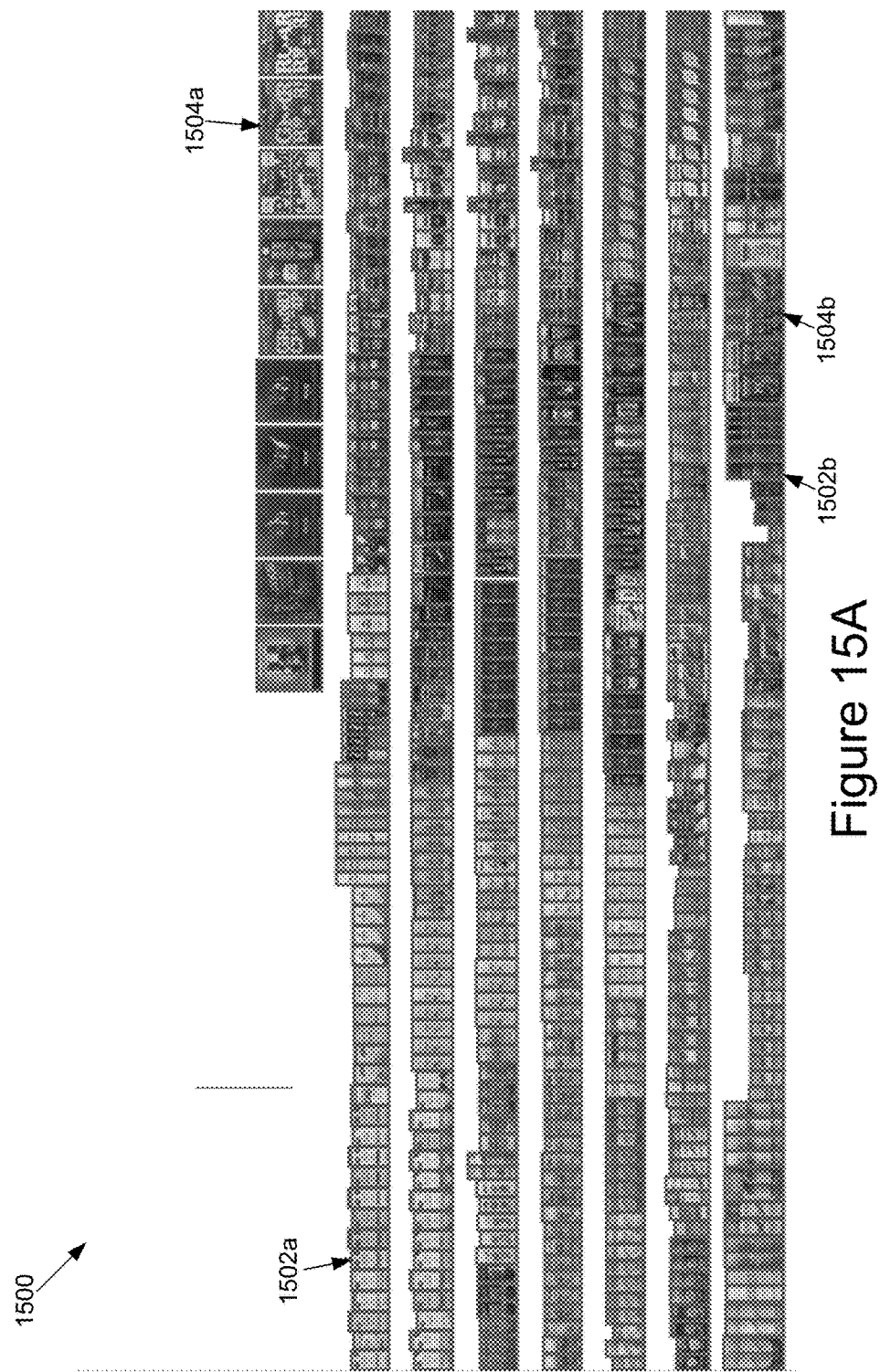
FIGS. 15A-15B and 16A-16D are graphical representations of one embodiment of example visualizations of recognized products.
Figure 15B:
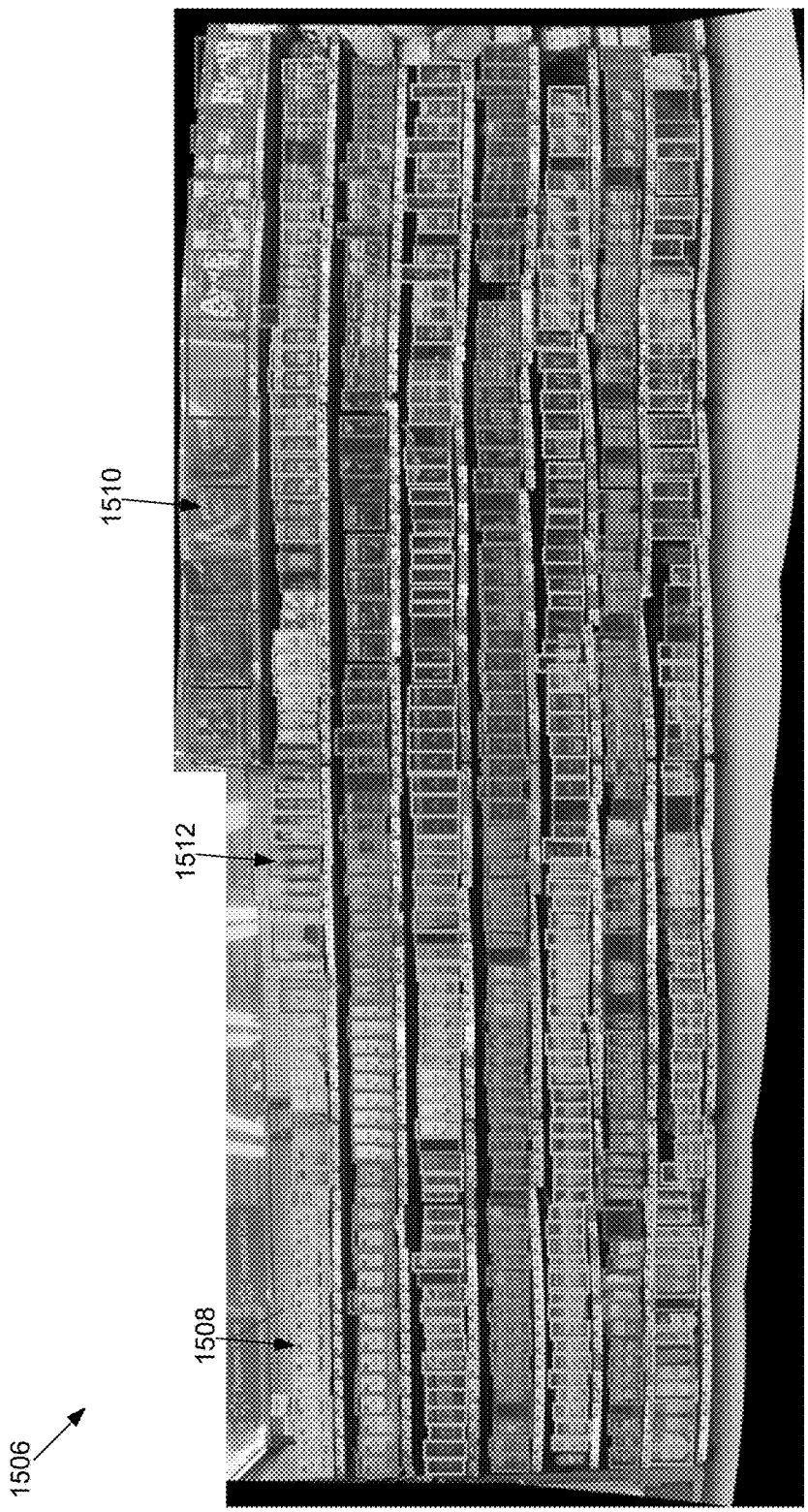

FIG. 15A is a graphical representation 1500 of recognized products. The alignment module 219 may perform a matching between the image and a planogram. The alignment module 219 may create indicators for each product identified in the image; the indicators may include an indicator of a match or an indicator of no match. For example, in the graphical representation 1500, green indicators 1502 indicate example products that matched to a corresponding product in the planogram and red indicators 1504 shows that there was no match for the product on the planogram. In further embodiments, the indicators may be boxes that surround the products on the planogram. The boxes may be different colors or other means of indicating which products in the planogram were matched to a corresponding product in the realogram. The alignment module 219 may also calculate how many of the products in the image were matched to the planogram and display a percentage of the total matched products. In FIG. 15B, a graphical representation 1506 displays linear groupings of recognized products in a realogram. For each linear grouping in the realogram, the matching of the alignment module 219 may include the steps of determining if a top candidate is present anywhere in a planogram linear grouping, then associating the linear grouping with the product position to indicate a normal match. If a normal match is not found, then the image linear groupings are iteratively compared to a candidate list and if a match is found, associate that match as a candidate match. The alignment module 219 may display indicators for each recognized product included in a linear grouping to differentiate linear grouping results. In the graphical representation 1506, the indicators 1508 are an orange color bracketing each product included within a first linear grouping. The indicators 1508 and 1510 are example indicators to show different linear groupings to the user. In the image, the linear groupings alternate colors so that a user can easily differentiate which linear groupings of shelf products are grouped together. The indicators 1510 are a blue color bracketing each product included within a second linear grouping. The image may include various colors groups bracketing individual products in different linear groupings. The indicator 1512 is a red color bracketing a product and/or area of the image that was not recognized in the comparison with the planogram.

Figure 16A:
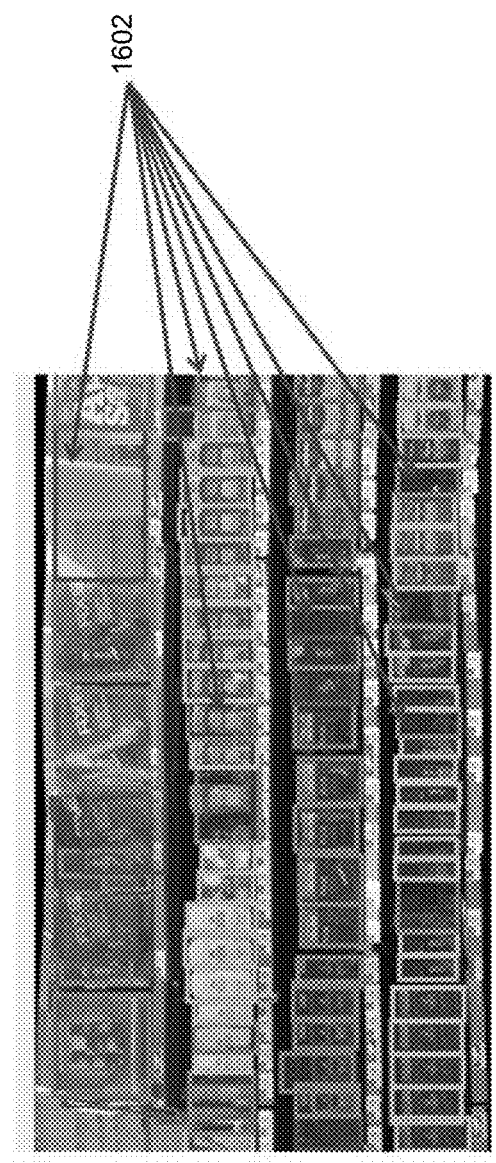
Figure 16B:
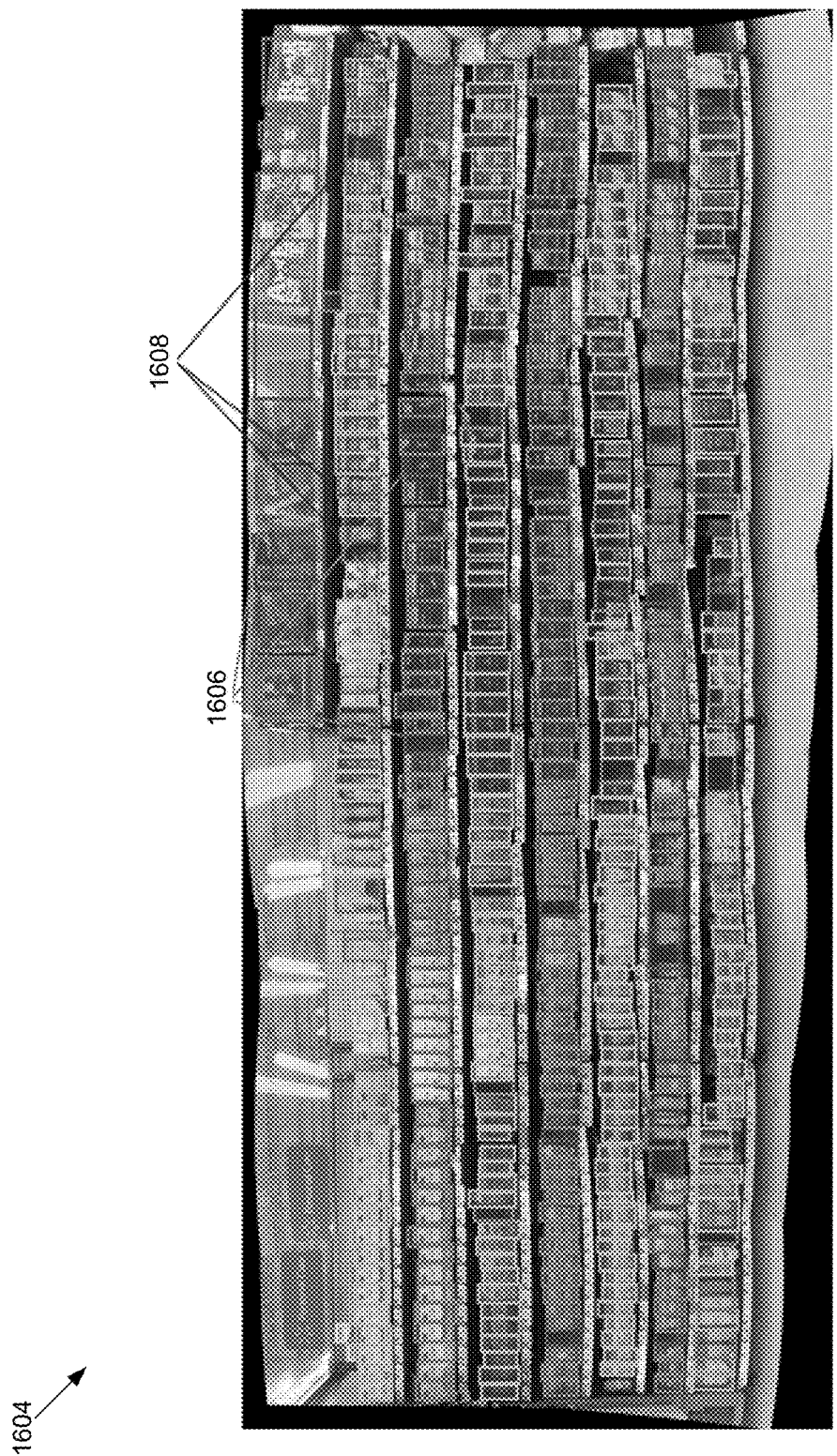
Figure 16C:
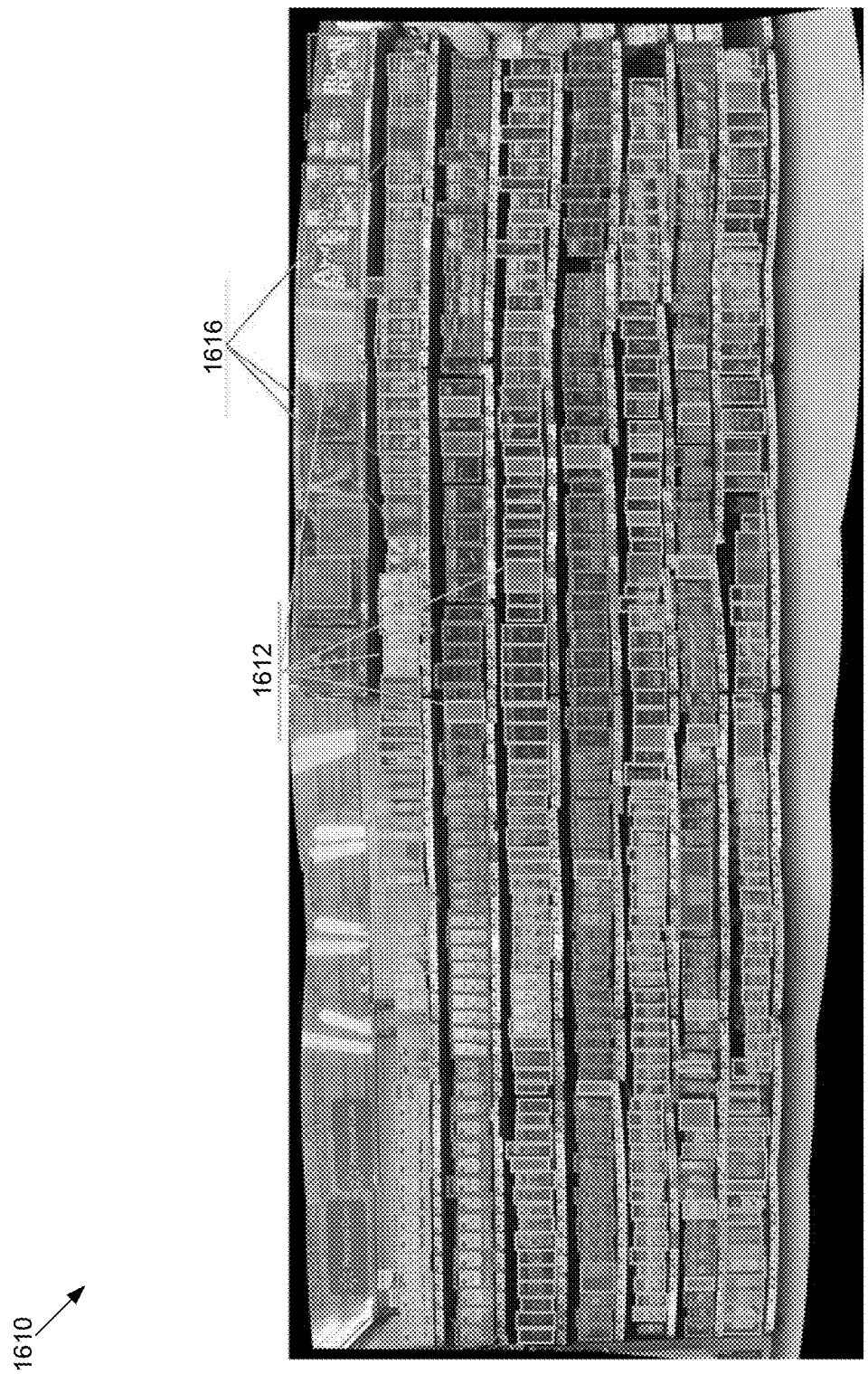
Figure 16D:
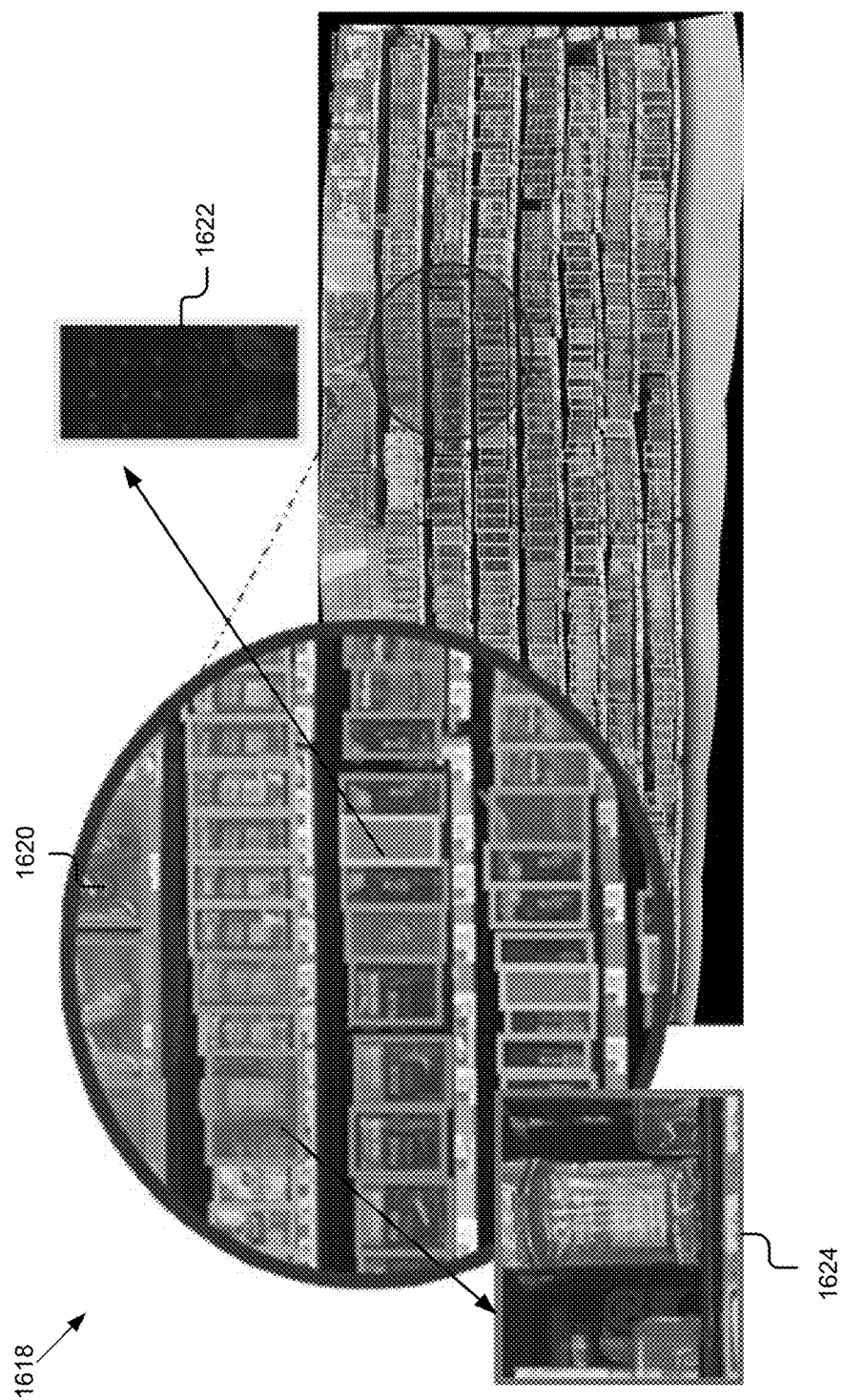

FIG. 16A is a graphical representation 1600 of one embodiment of a processed image that displays identified products and potential gaps in the processed image. A gap is an area in which during processing no recognition occurred. The processing may be performed by the image processing module 203 or another module in the image recognition application 103. Gaps 1602 may be empty spots on the shelf (holes) where no products are on display (e.g. an out of stock situation), or spots on the shelf containing unrecognized products. Identifying gaps 1602 may allow further processing by the gap detection module 217 to determine which gaps 1602 represent actual out of stock situations by analyzing the gaps and tagging each as either a hole or a potential product. FIG. 16B is a graphical representation 1604 displaying examples of detected gap areas 1606 and 1608 on a processed image. The gap areas 1606 and 1608 may include holes (e.g., in gap areas 1606) or potential products (e.g., in gap areas 1608). FIG. 16C is a graphical representation 1610 of an image where gaps have been determined to be either holes or potential products. The processing, performed by the gap detection module 217, may include three different processing filters, a color evaluation, an edge/line detector, or an image feature corner detector. In some embodiments, if two of the three processing filters product results indicate a potential product is present in the gap, then the gap detection module 217 may highlight that product as containing a potential product. Potential products 1616 are gaps that the gap detection module 217 determined included a potential product. In some embodiments, the potential product 1616 may be highlighted in a pink color bracketed around the product to indicate the potential products 1616. The non-products 1612 were determined not to include products by the gap detection module 217 and were highlighted as holes. The nonproducts 1612 may be highlighted in yellow bracketed around the product to indicate holes. The holes may indicate places on the shelf where an item is out of stock or a corrective action may be necessary. FIG. 19D is another graphical representation 1618 of determining gaps. A portion 1620 of a shelf is shown that include products and gaps. The gap detection module 217 may process the portion 1620 to determine which gaps include a potential product 1624 and which gaps are holes 1622.

Figure 17A:
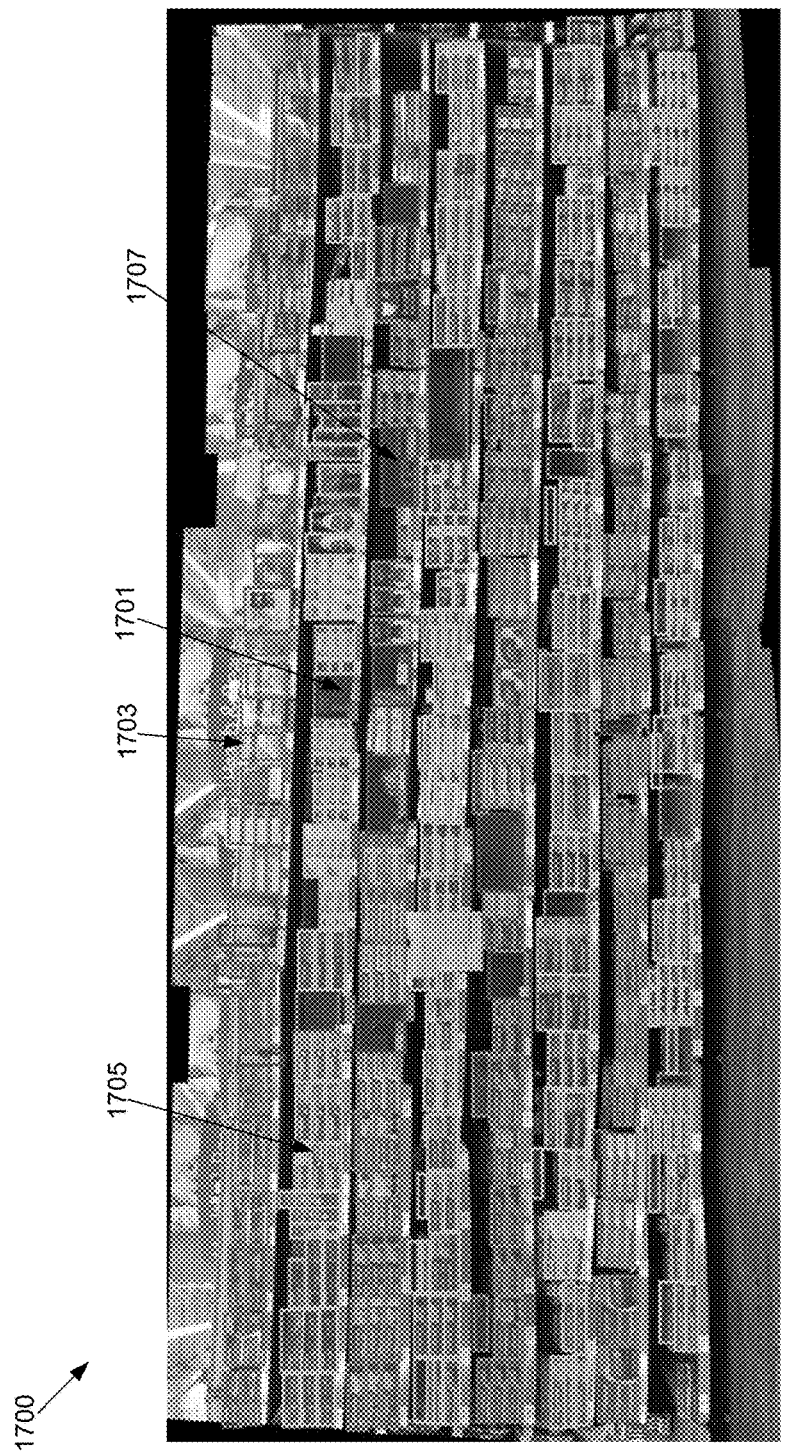
FIGS. 17A-17B are graphical representations of one embodiment of example visualizations showing recognized products and gaps.
Figure 17B:
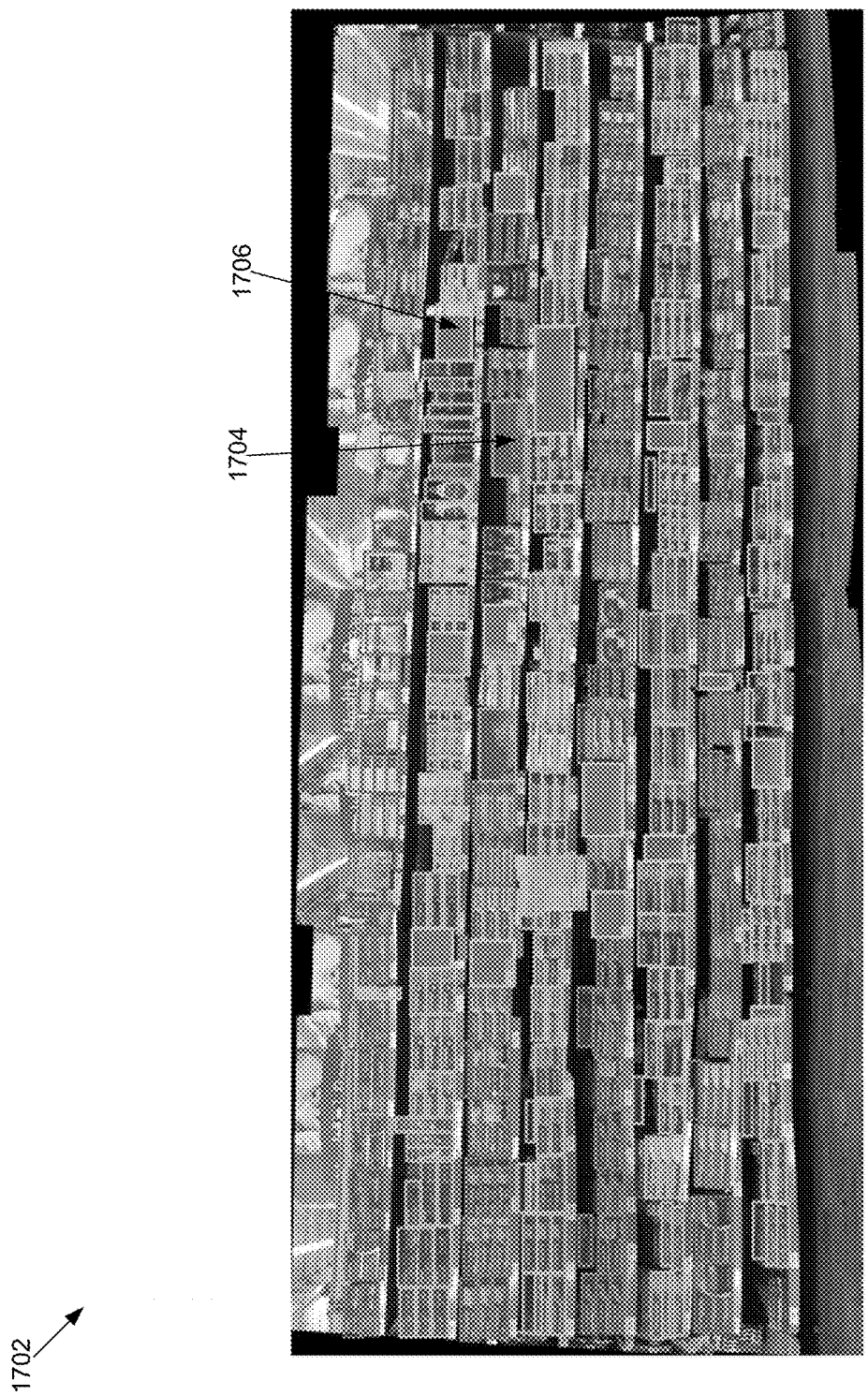

FIG. 17A is a graphical representation 1700 of one embodiment of a visualization showing gaps in an image. The graphical representation 1700 in FIG. 17A includes a product shelf with indicators 1703 and 1705 around linear groupings of recognized products and indicators 1701 and 1707 around potential gaps. Indicator 1703 is a blue indicator bracketing a product included as part of a linear grouping, the linear grouping all including blue brackets around the products. Indicator 1705 is an orange indicator bracketing around a product included as part of a different linear grouping from the indicator 1703. The different linear grouping may be alternating colors as shown by indicators 1703 and 1705. Indicator 1701 is a red bracket around a portion of the image that was not recognized as a product. Indicator 1707 is a blue bracket around a portion of the image that was not recognized as a product. FIG. 17B is a graphical representation 1702 of the shelf from FIG. 17A after the gap detection module 217 has performed further processing. In FIG. 17B, the gaps have been processed to determine which gaps include a potential product (highlighted in pink with an indicator 1704) and which gaps are holes (highlighted in yellow with an indicator 1706).

Figure 18:
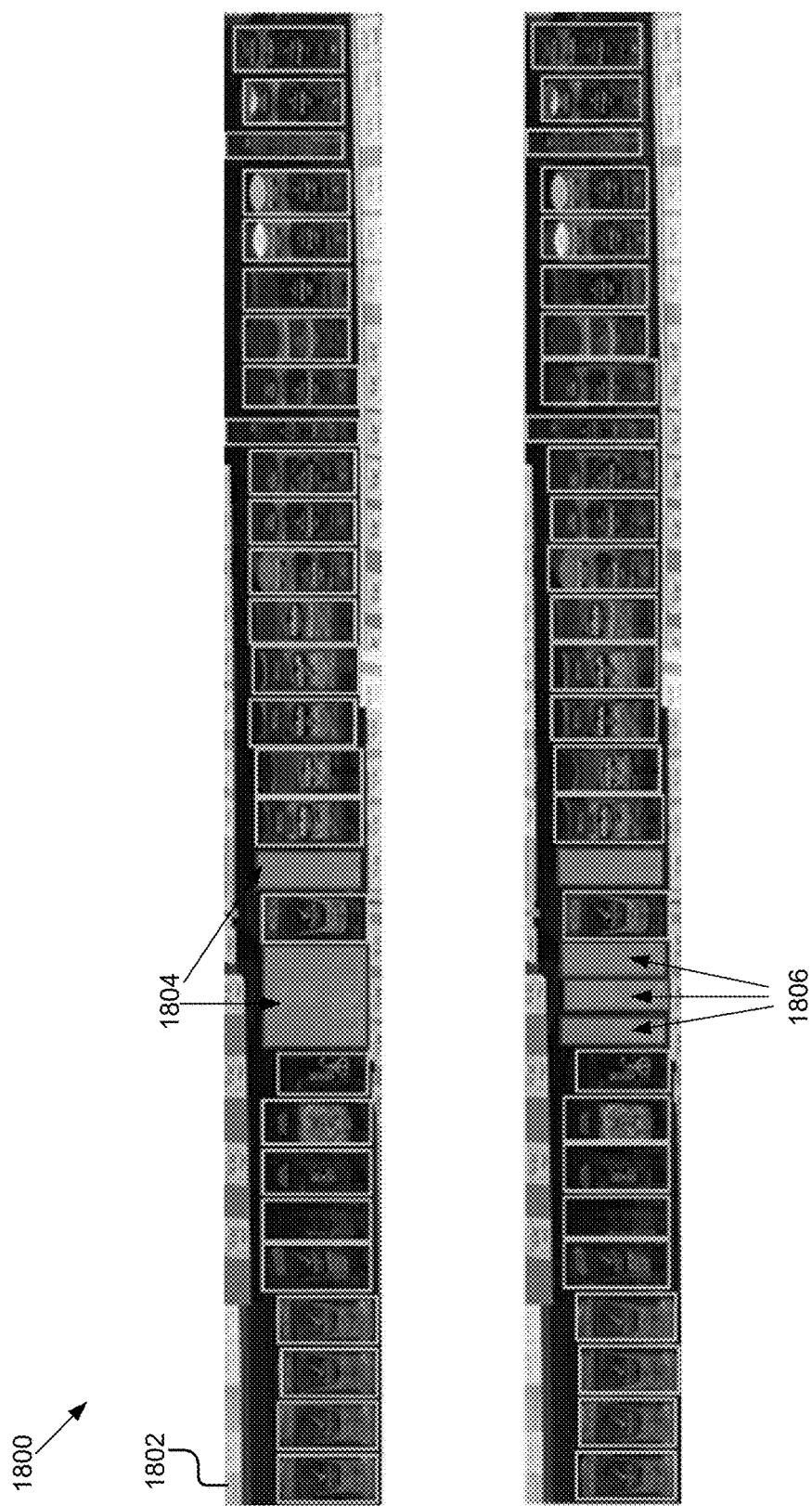
FIG. 18 is a graphical representation of one embodiment of a number of example gap facings identified with a gap.

FIG. 18 is a graphical representation 1800 of one embodiment of a number of gap facings identified within a gap. The graphical representation 1800 includes a product shelf 1802 in a realogram with a detected gap 1804. The gap detection module 217 determines a number of gap facings within the detected gap 1804 by sampling the neighbor product facings. For example, the gap detection module 217 samples two product facings in each direction, right and left. The graphical representation 1800 illustrates a number of gap facings 1806 identified by the gap detection module 217 within the detected gap 1804.

Figure 19:
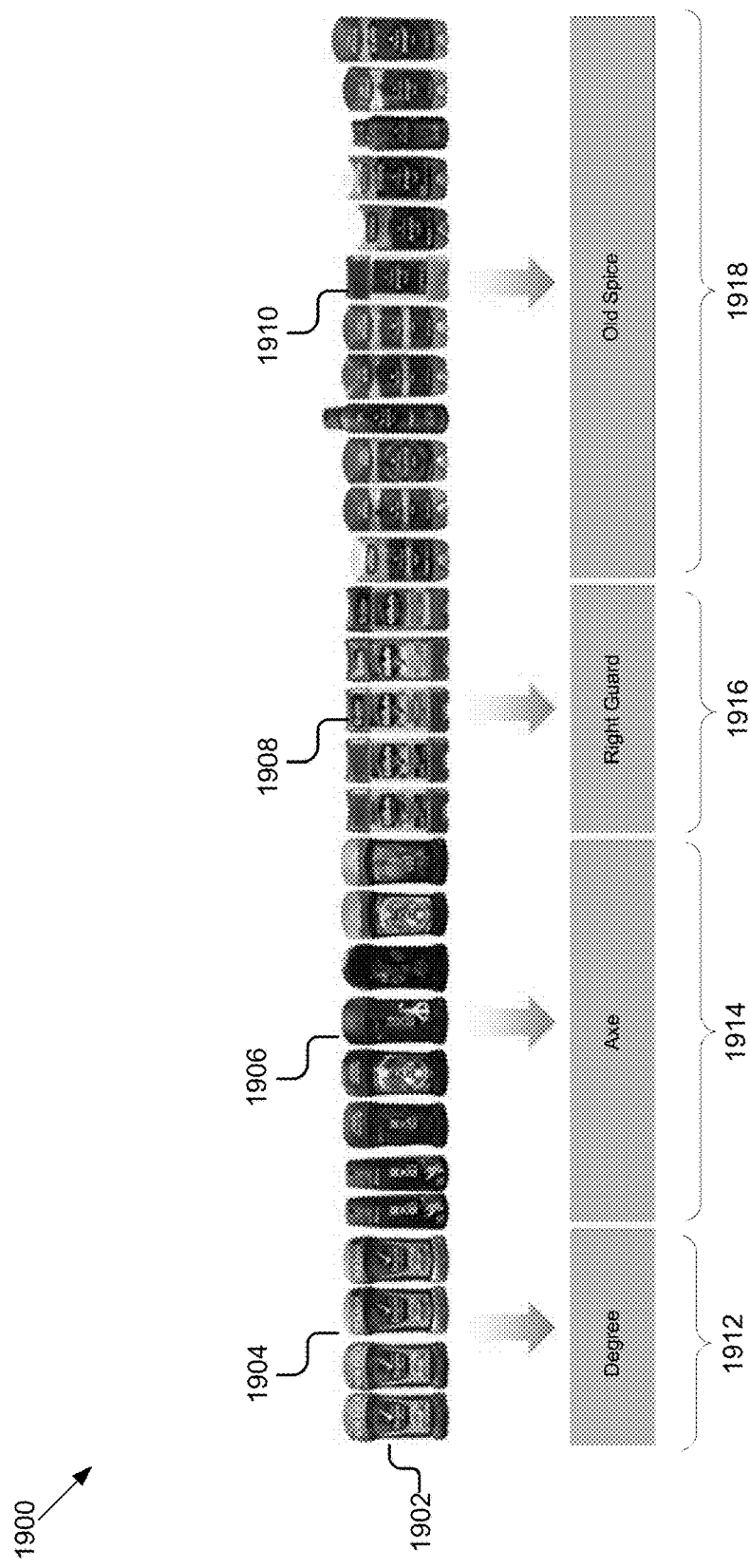
FIG. 19 is a graphical representation of one embodiment of an example of brand chunking in a planogram.

FIG. 19 is a graphical representation 1900 of one embodiment of an example of brand chunking in a planogram. The graphical representation 1900 represents a linear group 1902 of a planogram that includes a number of product facings. The alignment module 219 creates a corresponding brand chunk structure based on the brands associated with each product facing. For example, the planogram brand chunk 1912 represents a first brand chunk for product facings of brand "Degree" 1904, the planogram brand chunk 1914 represents a second brand chunk for product facings of brand "Axe" 1906, the planogram brand chunk 1916 represents a third brand chunk for product facings of brand "Right Guard" 1908, and the planogram brand chunk 1918 represents a fourth brand chunk for product facings of brand "Old Spice" 1910.

Figure 20:
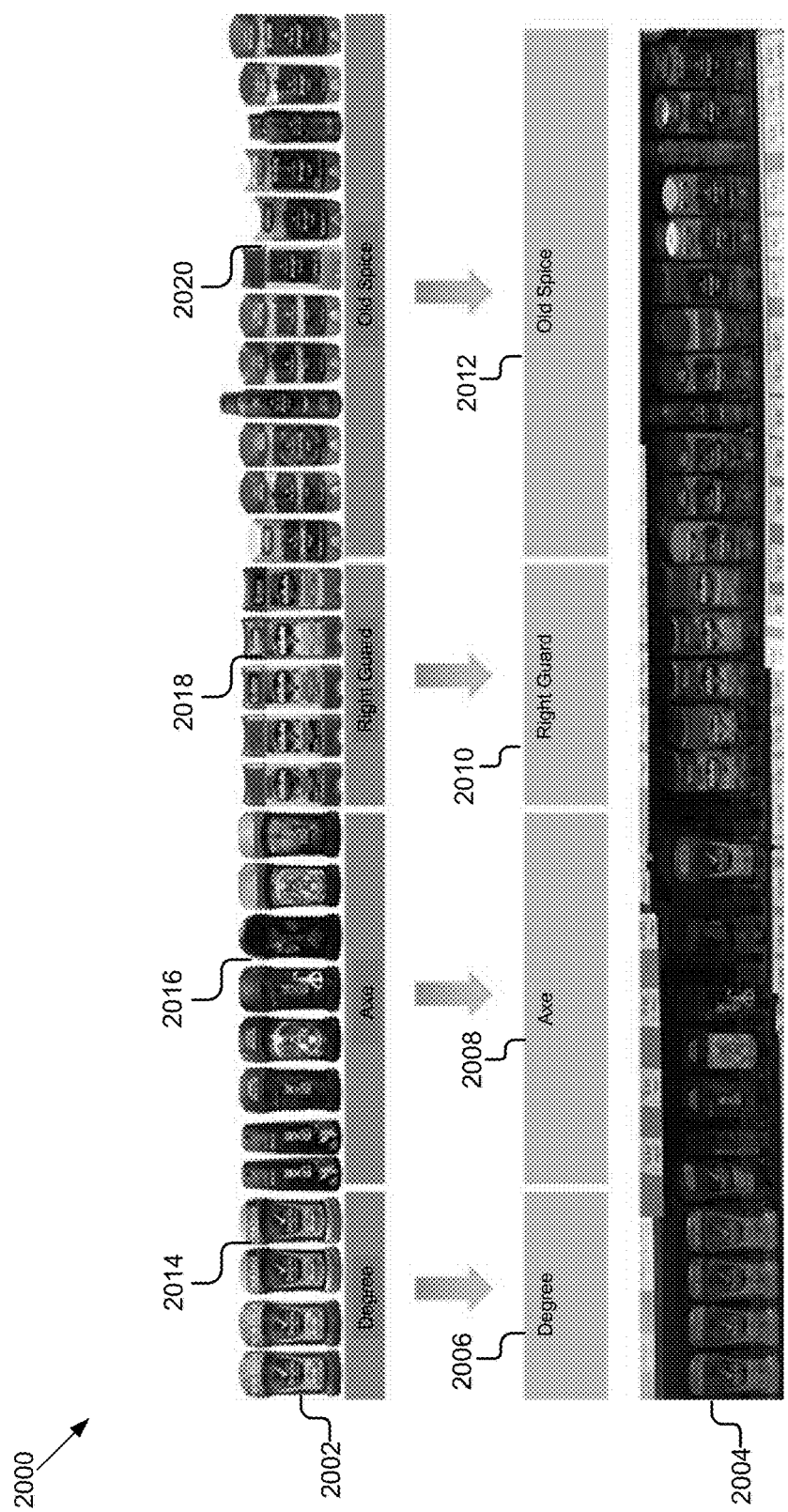
FIG. 20 is a graphical representation of one embodiment of an example of brand chunking in a realogram.

FIG. 20 is a graphical representation 2000 of one embodiment of an example of brand chunking in a realogram. The graphical representation 2000 represents a linear group 2002 of a planogram that includes a number of planogram product facings and a corresponding linear group 2004 of a realogram that includes a number of realogram product facings. The graphical representation 2000 illustrates a first step in realogram brand chunking. In the first step, the alignment module 219 clones the planogram brand chunk and stores the cloned brand chunk as a realogram brand chunk. For example, the realogram brand chunk 2006 represents a first brand chunk copied from a corresponding planogram brand chunk for product facing "Degree" 2014, the realogram brand chunk 2008 represents a second brand chunk copied from a corresponding brand chunk for product facing "Axe" 2016, the realogram brand chunk 2010 represents a third brand chunk copied from a corresponding brand chunk for product facing "Right Guard" 2018, and the realogram brand chunk 2012 represents a fourth brand chunk copied from a corresponding brand chunk for product facing "Old Spice" 2020. The goal of the first step may be to create an initial connection between the planogram brand chunks and the copied realogram brand chunks.

Figure 21A:
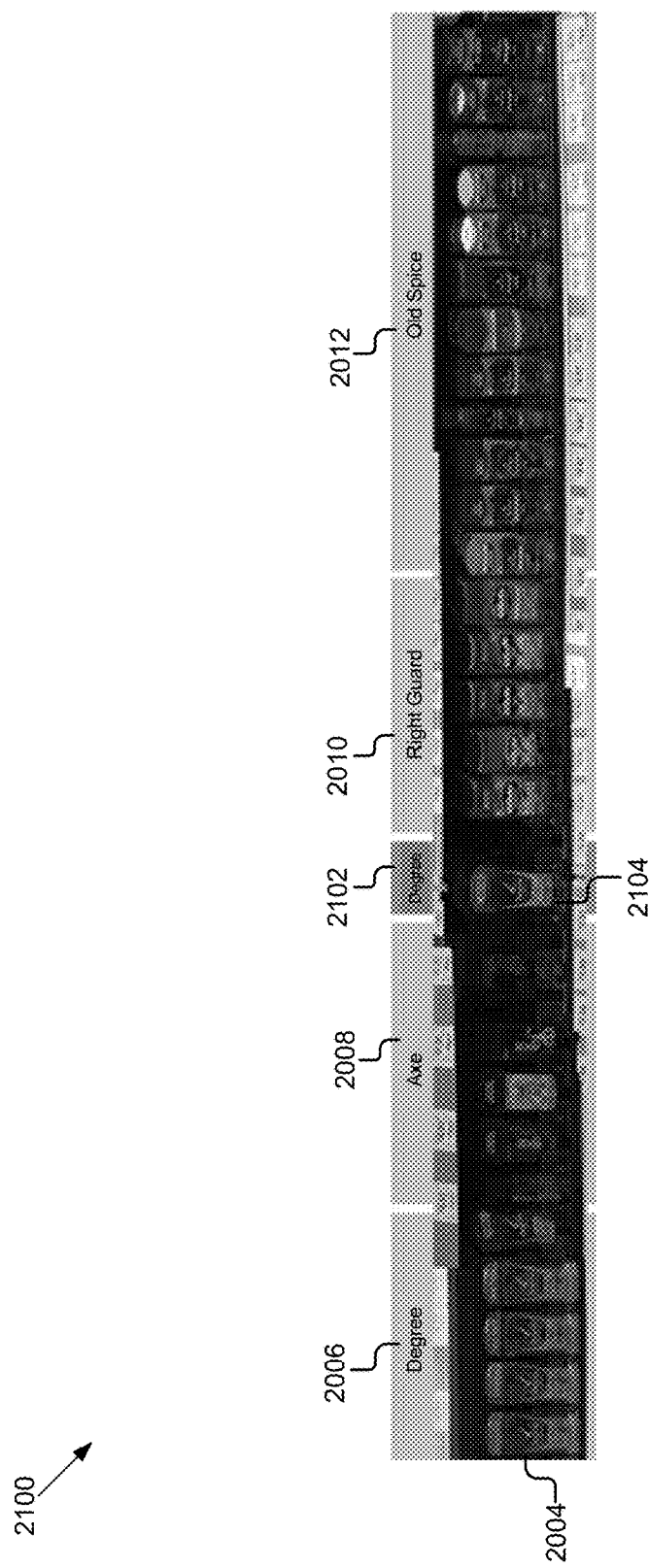
FIGS. 21A-21D are graphical representations of embodiments of an example of refining the realogram brand chunks.
Figure 21B:
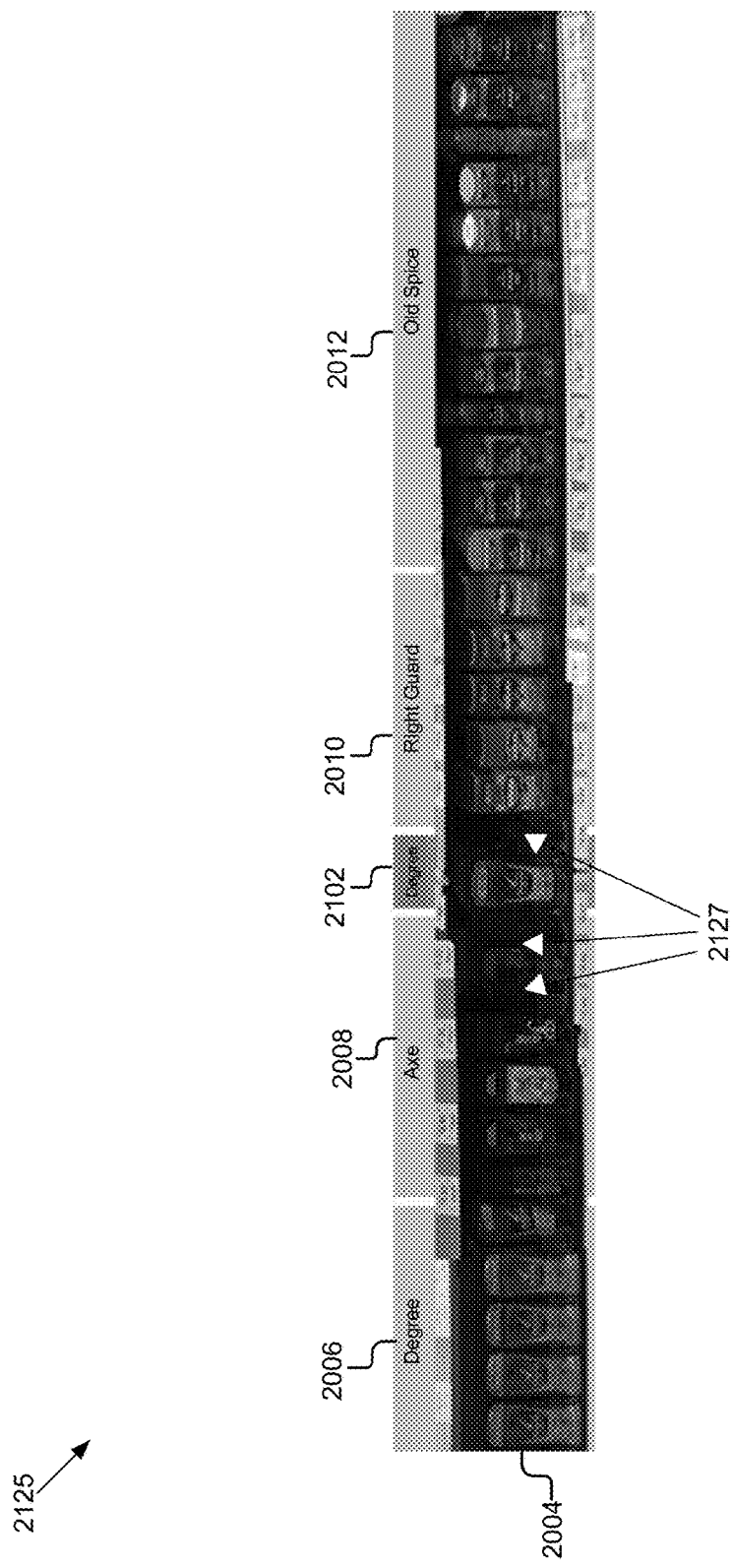
Figure 21C:
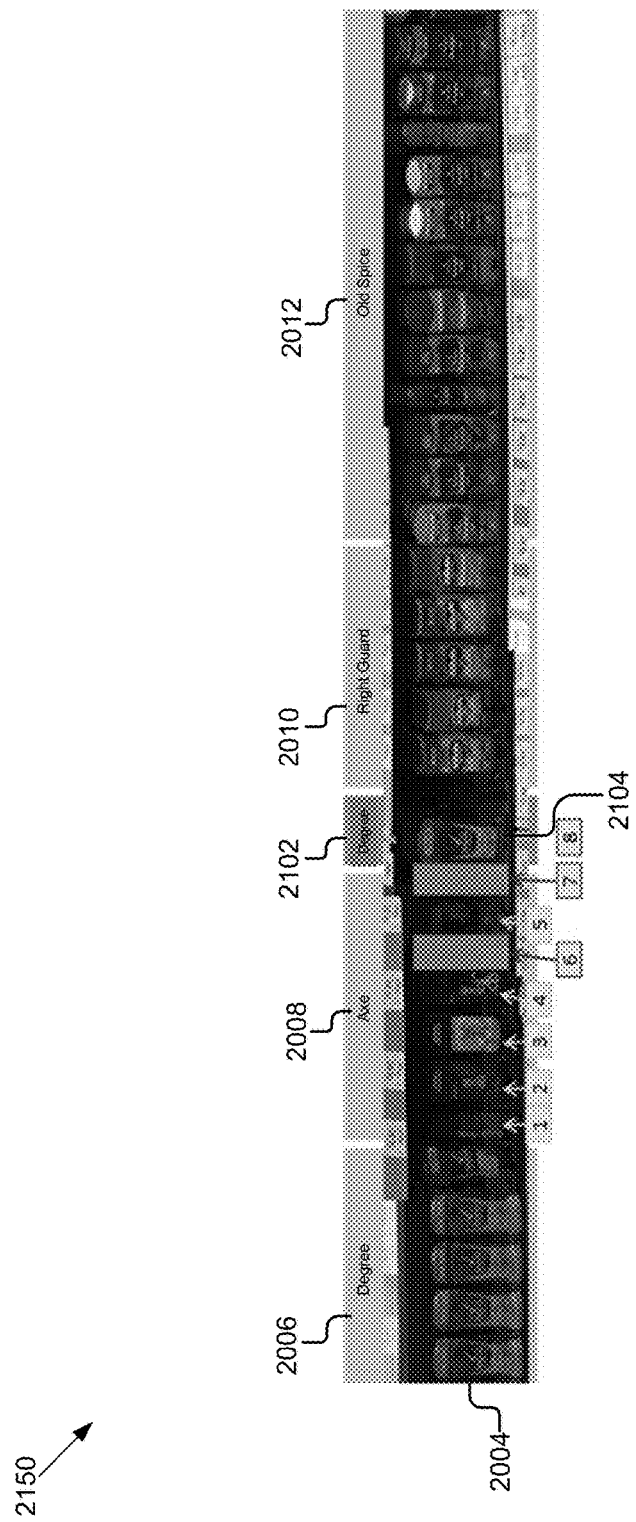
Figure 21D:
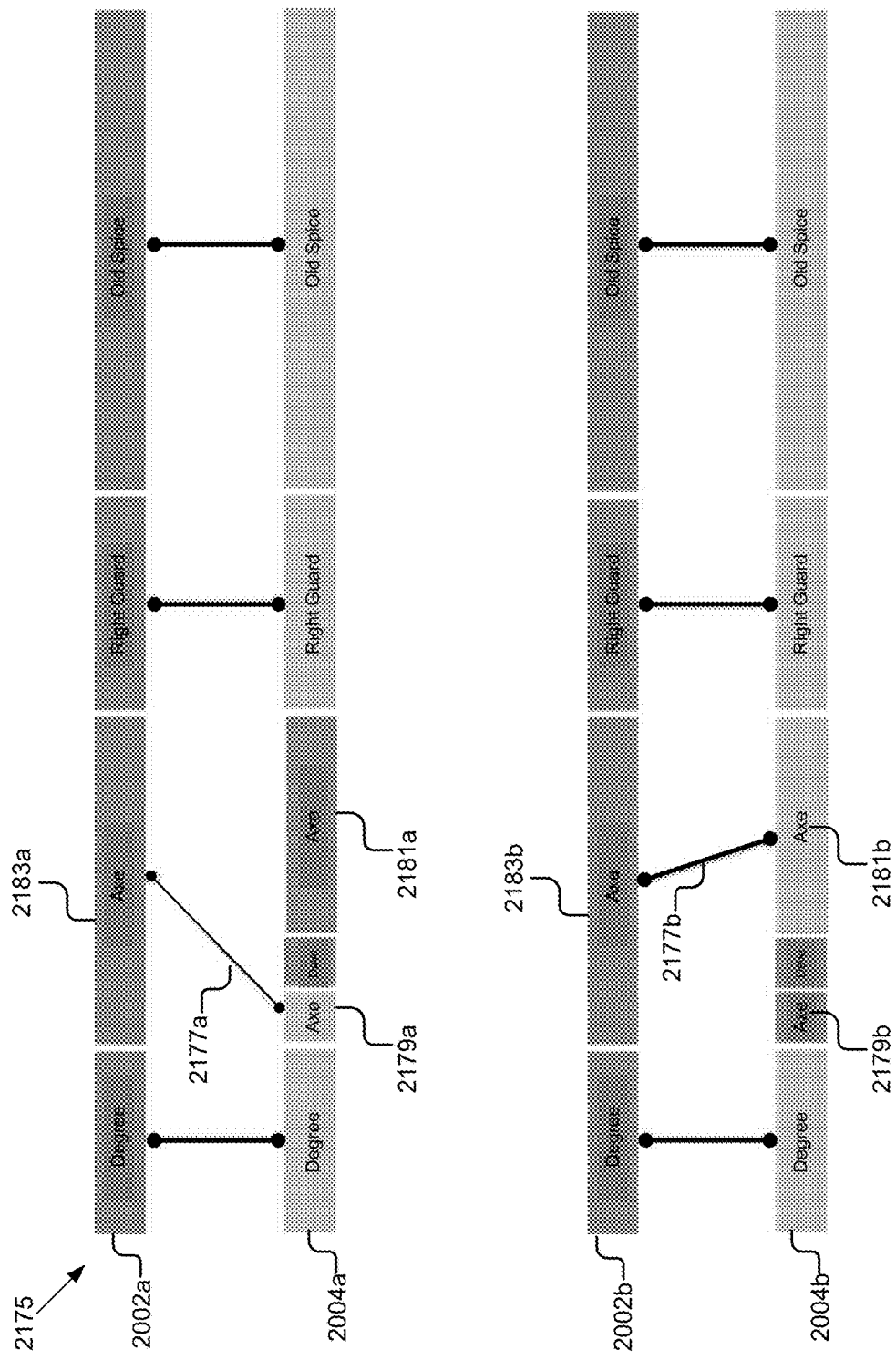

FIGS. 21A-21D are graphical representations of embodiments of an example of refining the realogram brand chunks. In FIG. 21A, the graphical representation 2100 illustrates a refined set of realogram brand chunks created for a linear group 2004 in the realogram. The graphical representation 2100 includes a new brand chunk 2102 inserted into the linear group 2004 for the product facing 2104 of brand "Degree" found in the unexpected location in the linear group 2004. The alignment module 219 creates and inserts the brand chunk 2102 since the product facing 2104 does not fit into any of the nearby preexisting brand chunks. This insertion of a brand chunk in the refinement of realogram brand chunks reveals an error in placement of the product facing 2104 and a high probability that the product facing 2104 is out of place in the realogram. In FIG. 21B, the graphical representation 2125 illustrates identifying gaps in a realogram linear group. The alignment module 219 tracks the number of product facings accumulated so far in each brand chunk in the linear group 2004 and uses the information to determine into which brand chunk to place a gap. For example, the alignment module 219 identifies the gaps 2127 in the linear group 2004. In FIG. 21C, the graphical representation 2150 illustrates the refined set of realogram brand chunks accounting for the gaps. The alignment module 219 tracks eight product facings that belong to the brand "Axe." The alignment module 219 accounts for five out of the eight product facings and for three missing product facings in the brand chunk 2008. Of the three missing product facings, two are gaps (e.g., 6 and 7) that the alignment module 219 inserts into the brand chunk 2008. In FIG. 21D, the graphical representation 2175 illustrates reassessing the connection between the planogram brand chunks and the realogram brand chunks. The graphical representation 2175 illustrates a weak connection 2177a between a planogram brand chunk 2183a in the planogram linear group 2002a and a realogram brand chunk 2179a in the realogram linear group 2004a. The alignment module 219 identifies a stronger candidate realogram brand chunk 2181b in the realogram linear group 2004b, disconnects the weaker connection 2177a and connects the stronger candidate realogram brand chunk 2181b to planogram brand chunk 2183b.

Figure 22A:
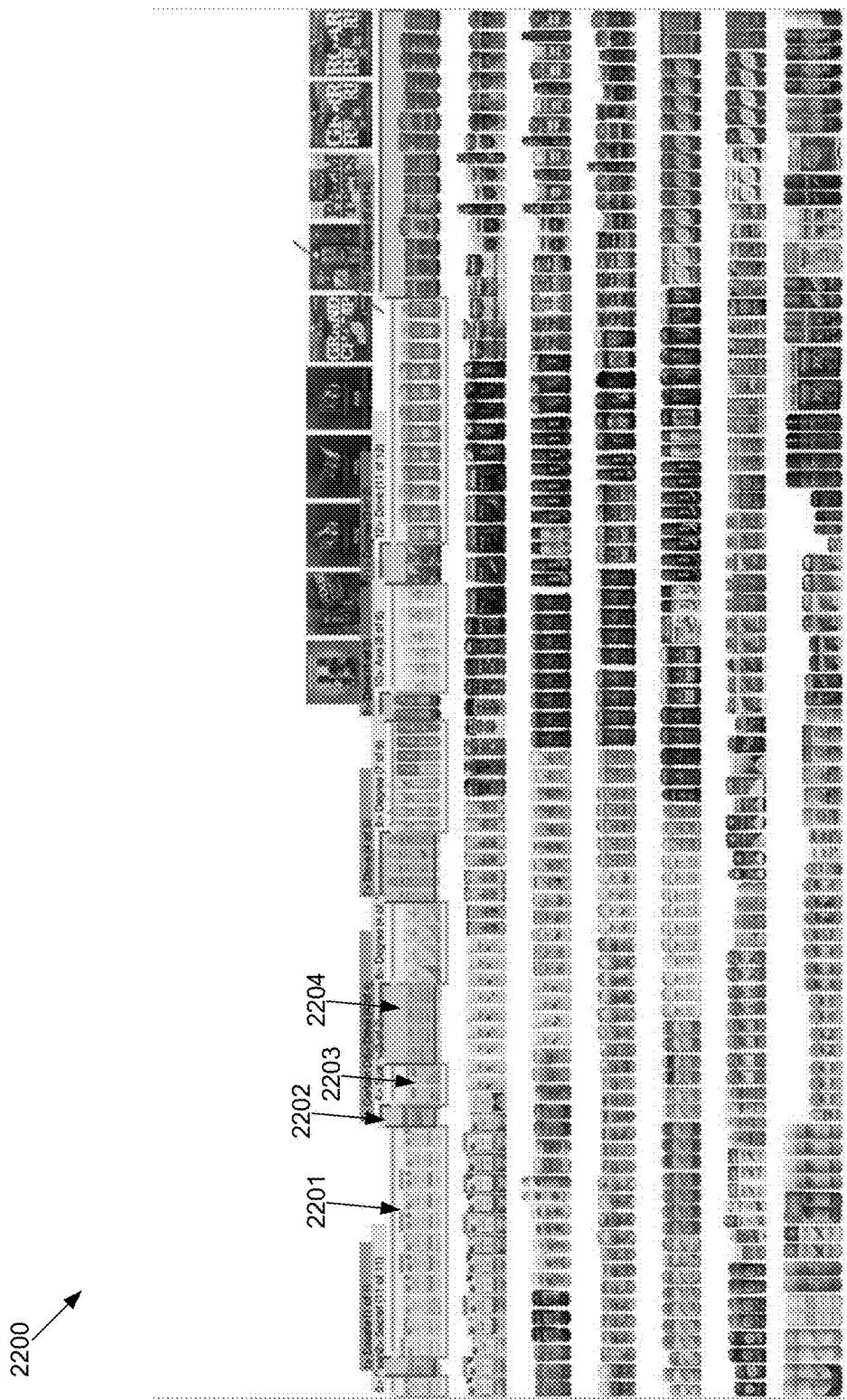
FIGS. 22A-22B are graphical representations of embodiments of brand chunking.
Figure 22B:
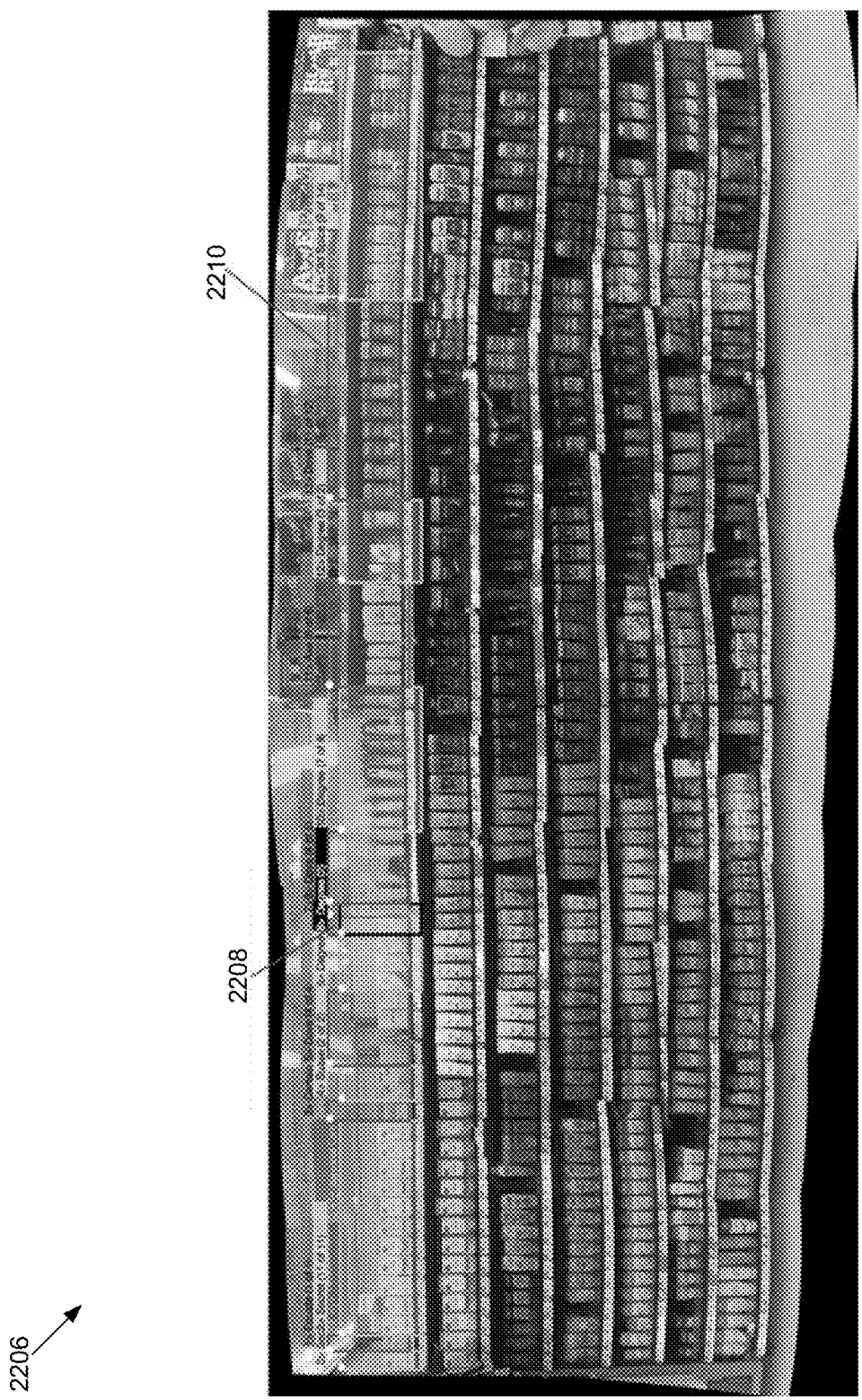

FIG. 22A is a graphical representation 2200 of one embodiment of a planogram with brand chunking. The planogram includes brand chunk(s) 2201, 2202, 2203, and 2204 of a linear grouping. Brand chunks 2201 and 2203 are green brand chunks; however, 2201 represents a different brand than 2203 even though both brand chunks are the same color. Brand chunks 2202 and 2204 are red brand chunks; however, 2202 represents a different brand than 2204 even though both brand chunks are the same color. In some embodiments, the brand chunks may also indicate the amount of products in the brand chunk that matched to product in the image brand chunk. The brand chunks may be displayed using different indicators, such as alternating color to differentiate brand chunks. FIG. 22B is a graphical representation 2206 of one embodiment of a corresponding realogram image to which the planogram in FIG. 22A relates. The alignment module 219 may compare brand chunks in the image to the planogram and display indicators on the image where the brand chunks do not match. Indicator 2208 is an indicator where the image does not align with the planogram brand chunk. Indicator 2210 indicates that the realogram brand chunk has a valid planogram chunk partner. In some embodiments, the indicator 2210 may be a color indicating that the image brand chunk matches to a planogram brand chunk.

Figure 23:
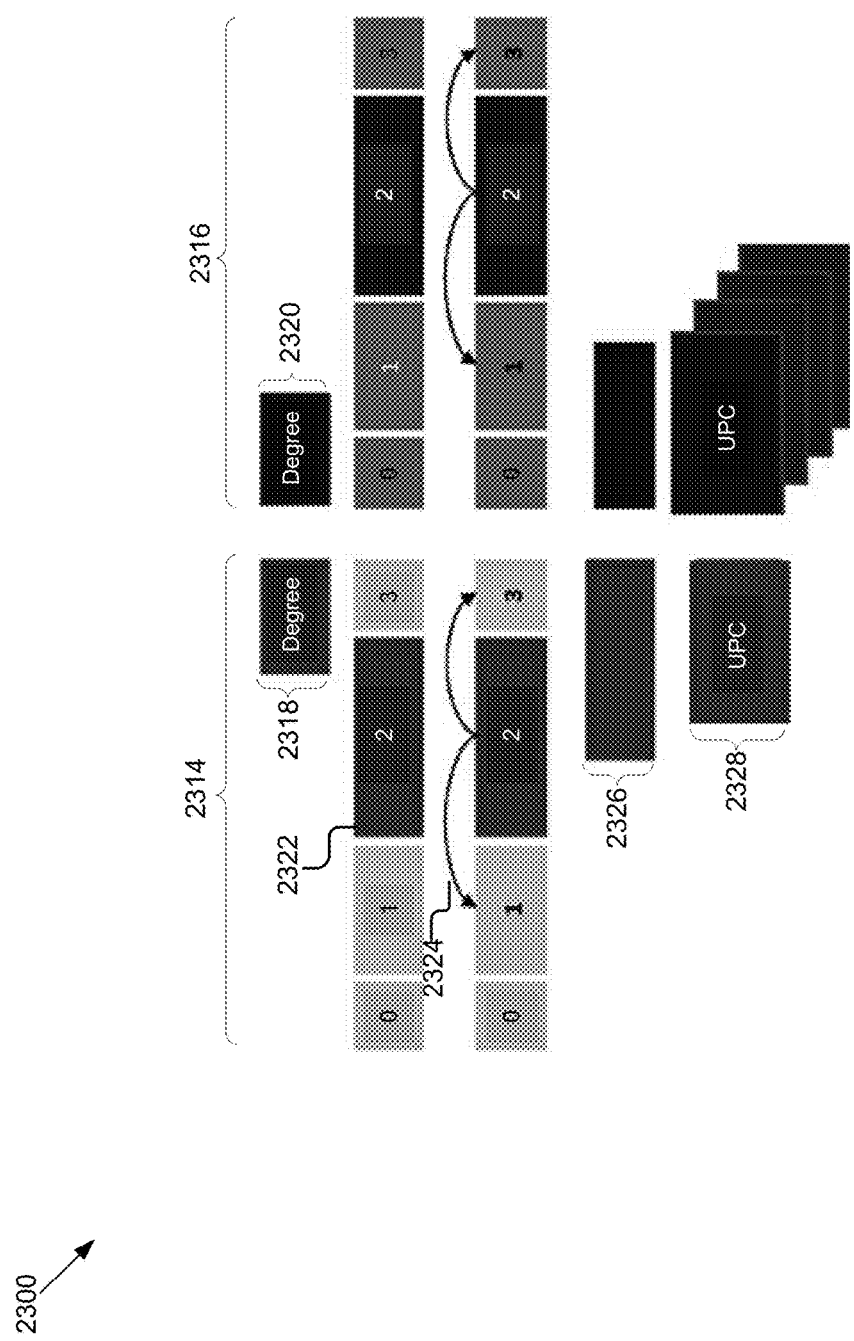
FIG. 23 is a block diagram of a side-by-side comparison of a planogram product facing in a planogram brand chunk with a realogram product facing in a realogram brand chunk 2316, according to one embodiment.

FIG. 23 is a block diagram 2300 of a side-by-side comparison of a planogram product facing 2318 in a planogram brand chunk 2314 with a realogram product facing 2320 in a realogram brand chunk 2316, according to one embodiment. The alignment module 219 connects the planogram product facing 2318 in a planogram brand chunk 2314 with the realogram product facing 2320 in a realogram brand chunk 2316. The alignment module 219 compares the planogram product facing 2318 and the realogram product facing 2320 and forms a connection based on the comparison. For example, the alignment module 219 may compare an index position 2322 of the planogram product facing 2318 on the planogram brand chunk 2314 and realogram product facing 2320 on the realogram brand chunk 2316. In another example, the alignment module 219 may determine neighboring product facings 2324 on the left and the right using the index position 2322 and compare the neighboring product facings 2324 of the planogram product facing and the realogram product facing. In another example, the alignment module 219 may also determine an aspect ratio 2326 of the planogram product facing and realogram product facing and compare the aspect ratios. In yet another example, the alignment module 219 may also determine a UPC 2328 of the planogram product facing and a top candidate in a list of product recognitions for the realogram product facing and compare the UPCs. The comparison of the planogram product facing and the realogram product facing may produce a list of candidate realogram product facings as connections for each planogram product facing and the alignment module 219 connect the top candidate to the planogram product facing.

Figure 24:
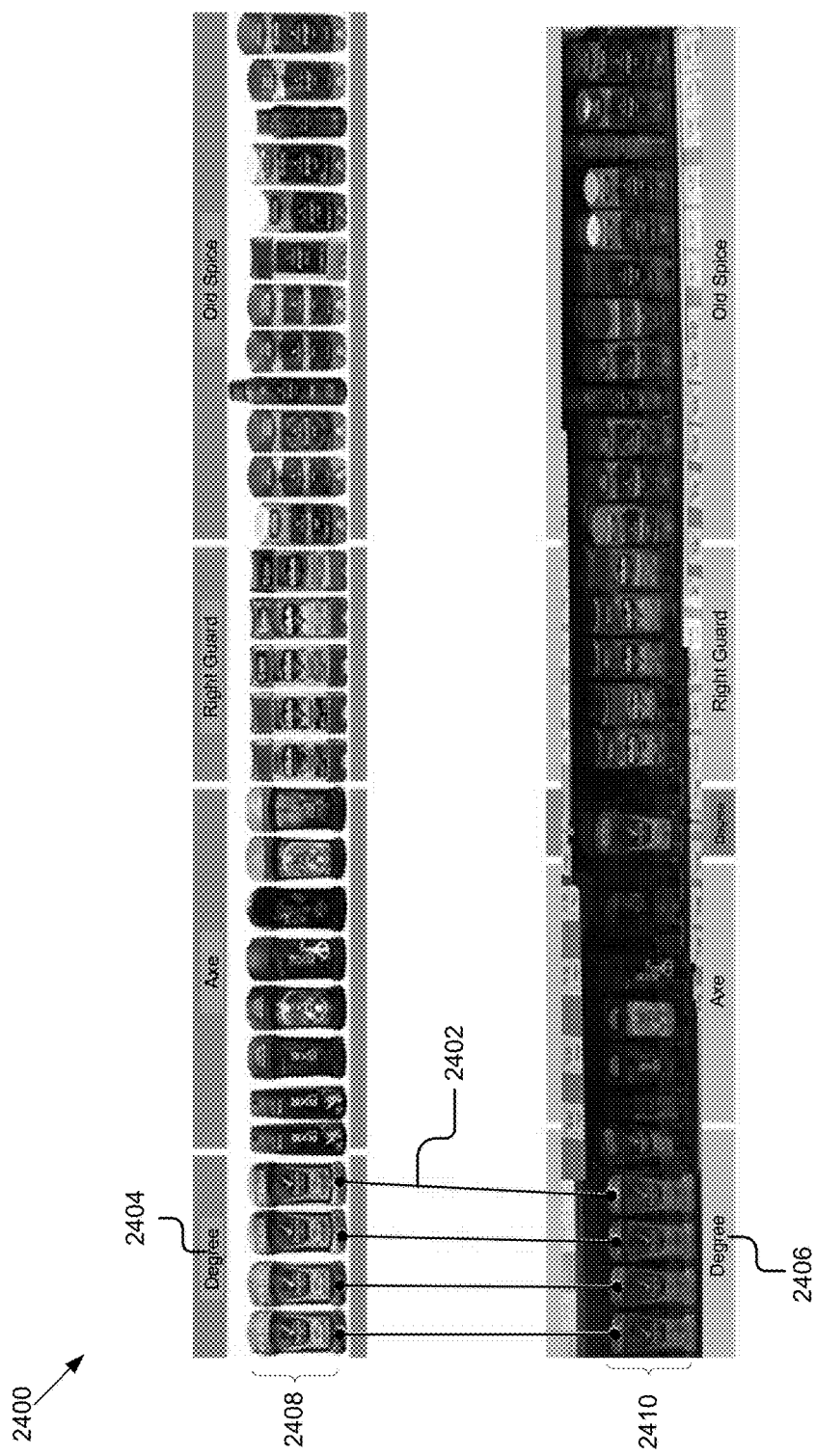
FIG. 24 is a graphical representation of one embodiment of aligning the realogram product facings with the planogram product facings.

FIG. 24 is a graphical representation 2400 of one embodiment of aligning the realogram product facings with the planogram product facings. The brand chunks subdivide linear groupings into smaller parts, making it easier for the alignment module 219 to perform alignment of the realogram product facings with the planogram product facings. The graphical representation 2400 illustrates a connection 2402 between the planogram product facings in a planogram brand chunk 2404 and the realogram product facings in a realogram brand chunk 2406. The planogram brand chunk 2404 and the realogram brand chunk 2406 correspond to each other. The planogram linear group 2408 corresponds to the realogram linear group 2410. The alignment module 219 aligns the planogram and realogram facings in each corresponding brand chunk. In some embodiments, the corrective action module 215 uses the result of the alignment to generate corrective actions for each linear grouping.

Figure 25:
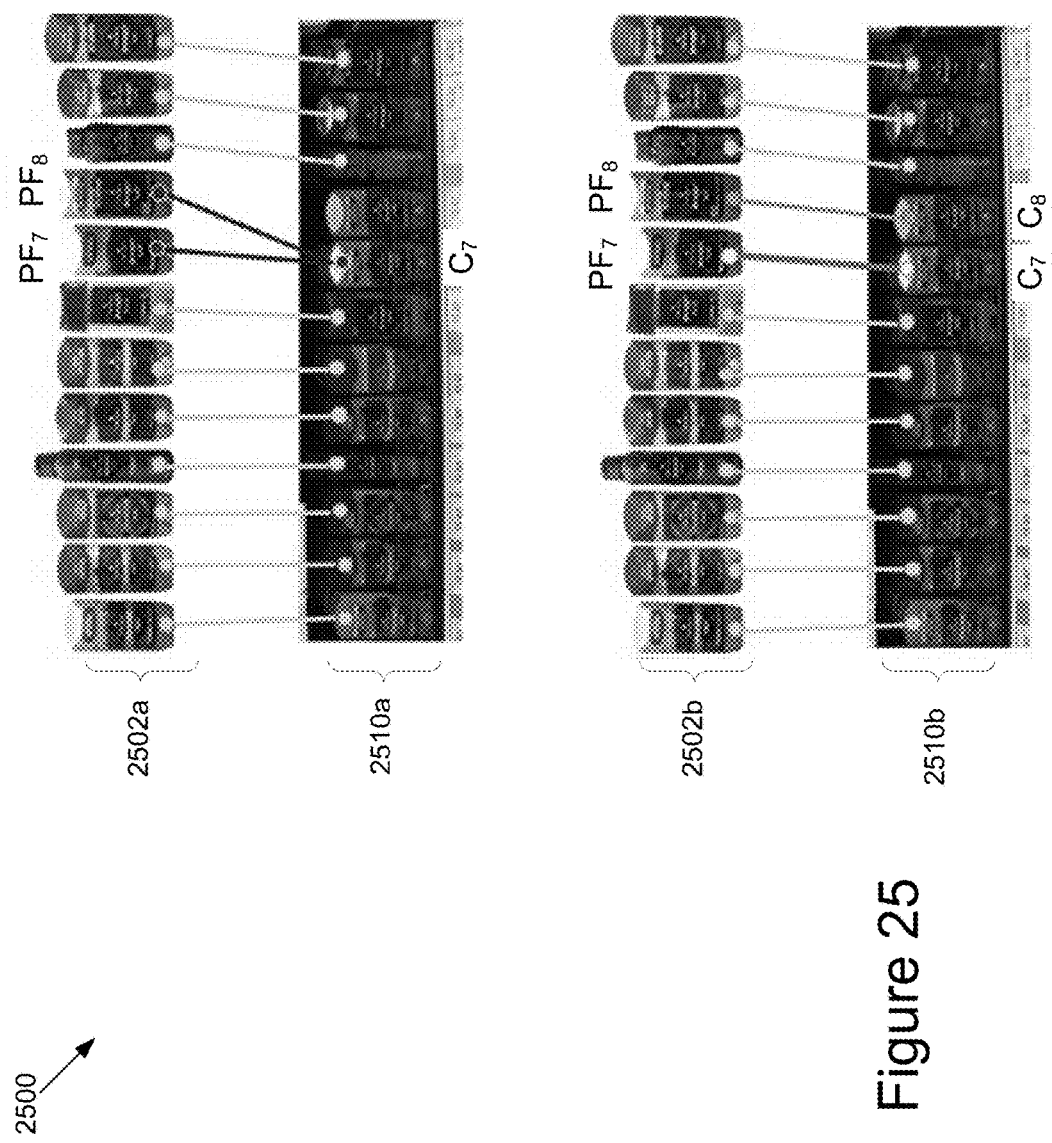
FIG. 25 is a graphical representation of one embodiment of an example process resolving collision or conflicts in connections.

FIG. 25 is a graphical representation 2500 of one embodiment of a process resolving collision or conflicts in connections. The alignment module 219 during alignment may identify two or more product facings (e.g., $PF_7$, $PF_8$) in a planogram brand chunk 2502a that connect with a single product facing (e.g., $C_7$) in the realogram brand chunk 2510a. The alignment module 219 retrieves a list of realogram product facing candidates for each of the two or more planogram product facings competing for the same realogram product facing. For example, the alignment module 219 retrieves a set of candidates $\{C_6, C_7, C_8\}$ for planogram product facing $PF_7$ and a set of candidates $\{C_7, C_8\}$ for planogram product facing $PF_8$. The alignment module 219 determines the best connection for each one of the planogram product facing is the same candidate realogram product facing $C_7$. The alignment module 219 establishes realogram product facing $C_7$ as the best connection for planogram product facing $PF_7$. The alignment module 219 identifies the product facing $C_8$ as a next best connection for planogram product facing $PF_8$ from the set of candidates $\{C_7, C_8\}$. The graphical representation 2500 includes a resolved connection scenario where the planogram product facing $PF_7$ in the planogram brand chunk 2502b is connected with realogram product facing $C_8$ in the realogram brand chunk 2510b.

Figure 26A:
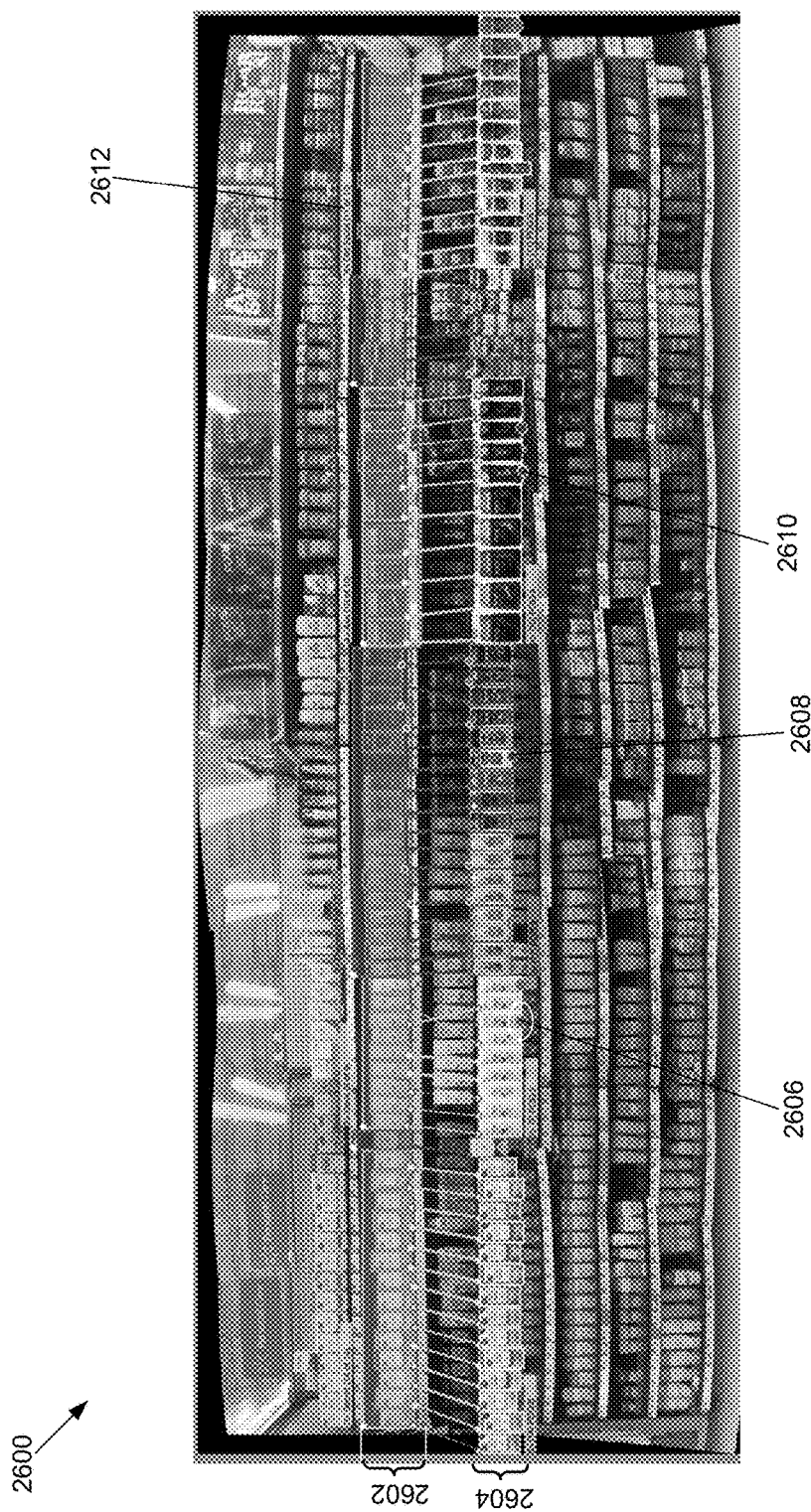
FIGS. 26A-26C are graphical representations of embodiments of an example of aligning planogram product facings and realogram product facings on a corresponding shelf.

FIG. 26A is a graphical representation 2600 of one embodiment of aligning image/realogram product facings and planogram product facings on a corresponding shelf. In the graphical representation 2600, a shelf 2602 of realogram product facings is under consideration. A planogram shelf 2604 corresponding to the realogram shelf 2602 is shown overlaid upon the realogram. A line represents the connection between the realogram product facings in the realogram shelf 2602 and the planogram product facings in the planogram shelf 2604. In some embodiments, line width of the connections reflects the strength of the connection. In some embodiments, an indicator may be placed on select planogram product facings to indicate an issue with the connection. For example, an indicator 2606 may be placed on a planogram product facing to show that there is no connection with a corresponding realogram product facing. In another example, an indicator 2608 may be placed on a planogram product facing to show that the planogram product facing is aligned with a hole in the realogram. In yet another example, an indicator 2610 may be placed on a planogram product facing to show that the planogram product facing is aligned with a hole in the realogram but the corrective action is suppressed because there is a high probability of a product in the location. In some embodiments, the graphical representation 2600 may include a text box 2612 above the realogram shelf 2602 that includes a number representing how many planogram product facings in the planogram shelf 2604 connect with the realogram product facings in the realogram shelf 2602. For example, the text box 2612 displays data that eleven out of thirteen of the product facings of the realogram correspond with the product facings of the planogram in a particular brand chunk.

Figure 26B:
Figure 26C:
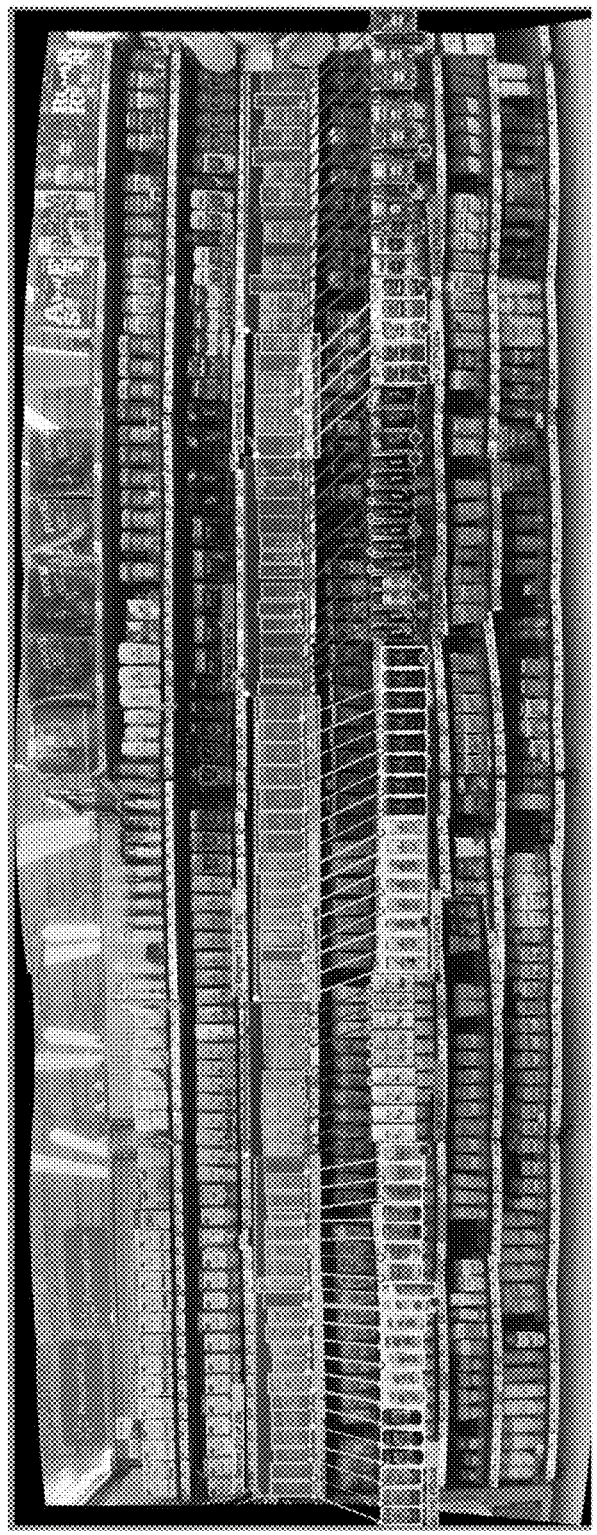

FIG. 26B is a graphical representation 2620 of another embodiment of aligning planogram product facings and realogram product facings. In some embodiments, the connections 2622 may be of different colors to identify connections between product facings of different brand chunks in the planogram shelf and the realogram shelf. FIG. 26C is a graphical representation 2640 of another embodiment of aligning planogram product facings and realogram product facings.

Figure 27:
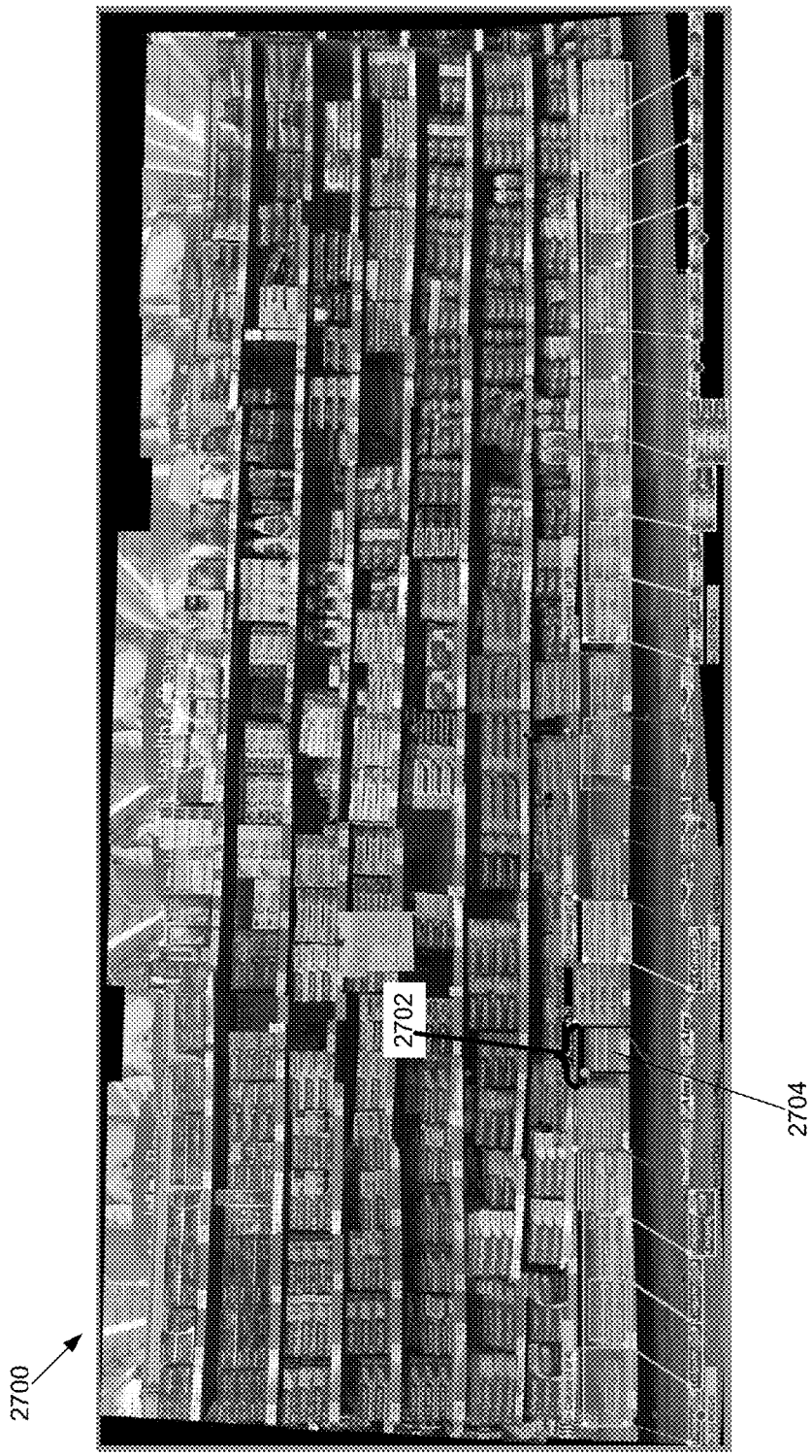
FIG. 27 is a graphical representation of one embodiment of an image with the identified products shown with callouts and showing an unconnected product facing.

FIG. 27 is a graphical representation 2700 of one embodiment of an image with the identified products shown with callouts (e.g., highlighted area) and showing an unconnected product facing. An unconnected facing 2702 is present in the image. The unconnected facing 2702 in some embodiments may also be an unconnected brand chunk. The unconnected facing 2702 did not have any corresponding facing in the planogram to which it could be connected. The corrective action module 215 may be able to determine based on this unconnected facing 2702 that an incorrect product 2704 was placed on that portion of the shelf. The corrective action module 215 may generate a corrective action for presentation to a user.

Figure 28A:
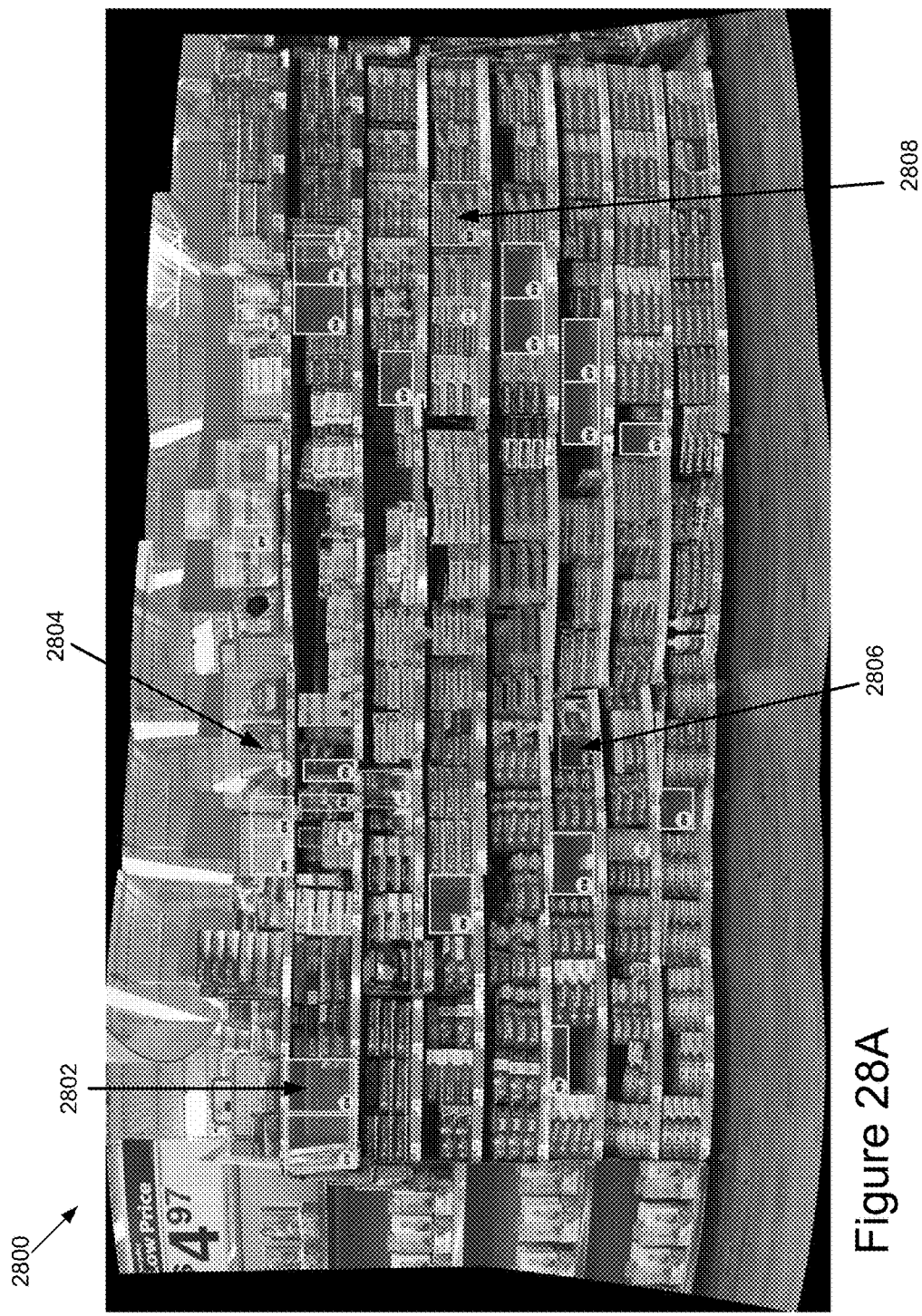
FIG. 28A-28D are graphical representations of embodiments of example display of one or more corrective actions on top of a realogram.
Figure 28B:
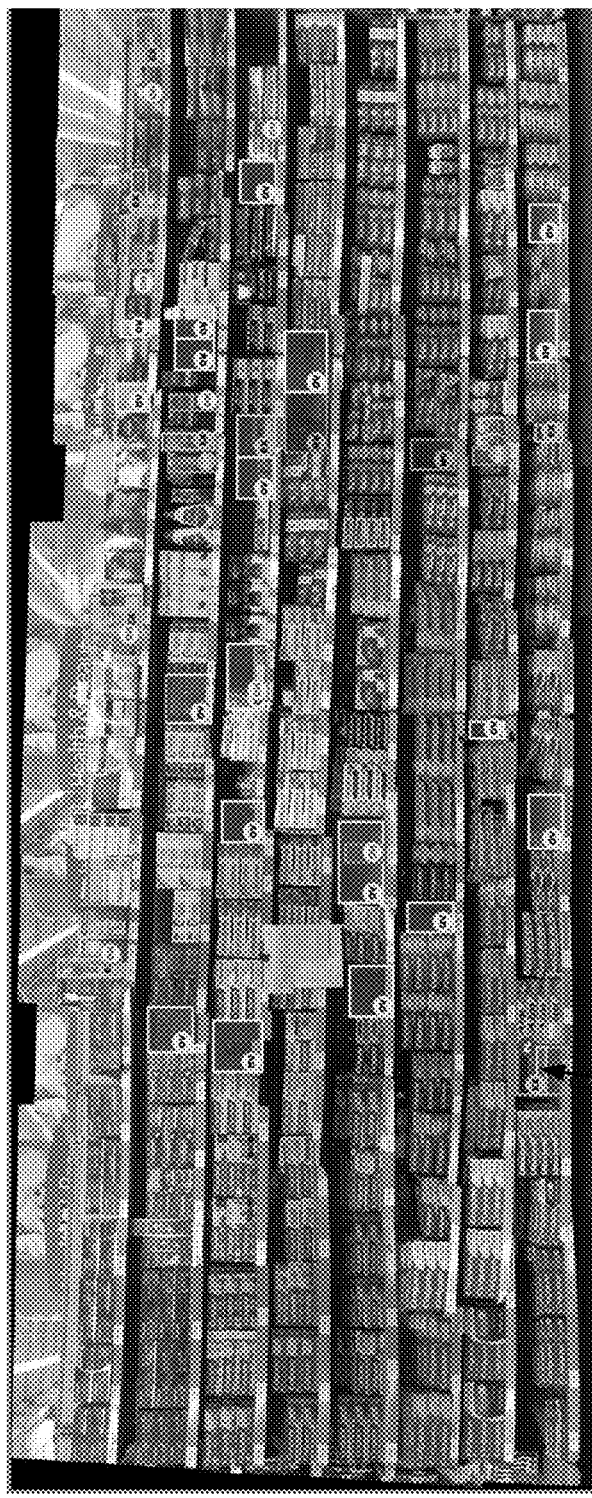
Figure 28C:
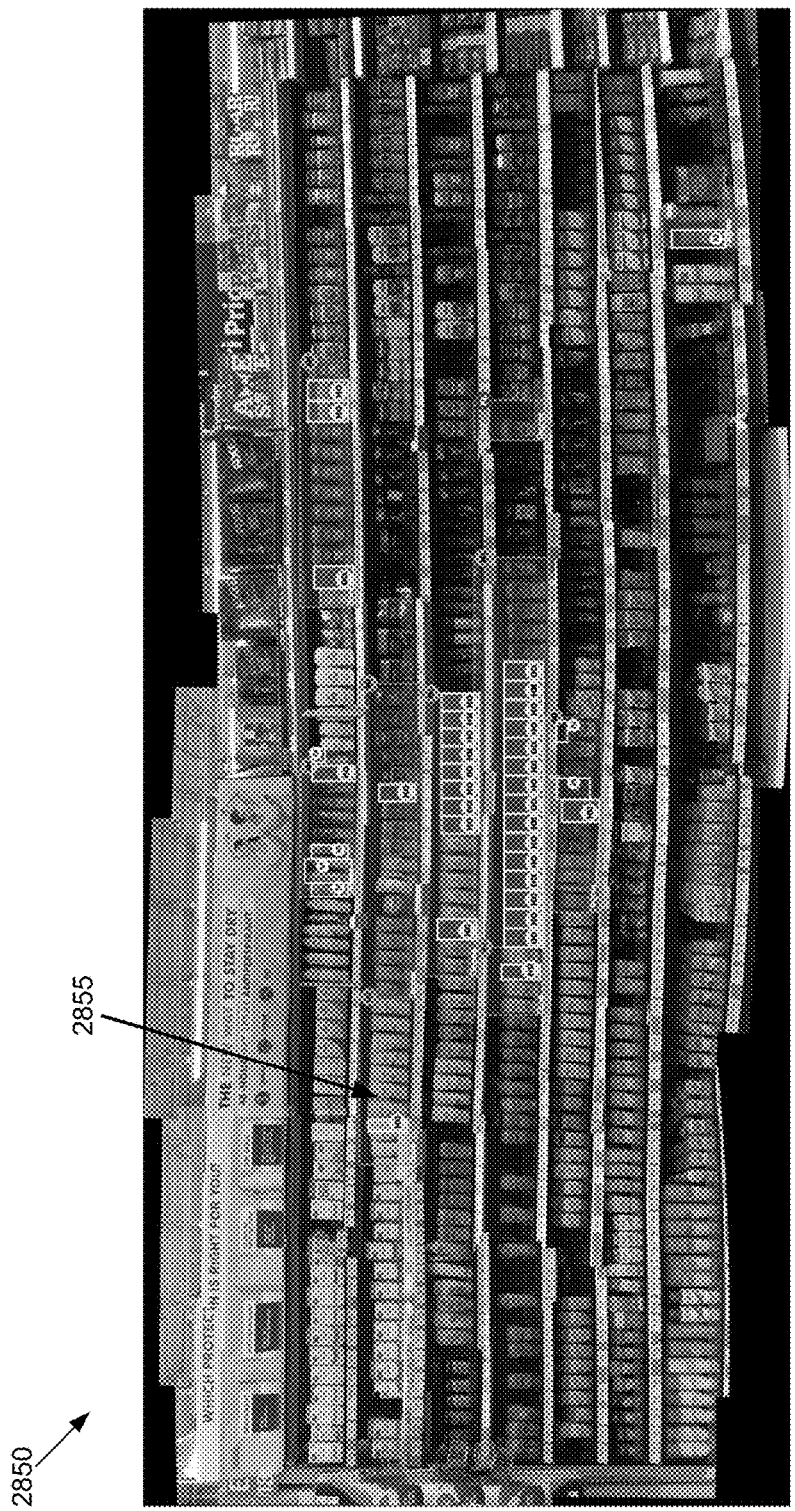
Figure 28D:
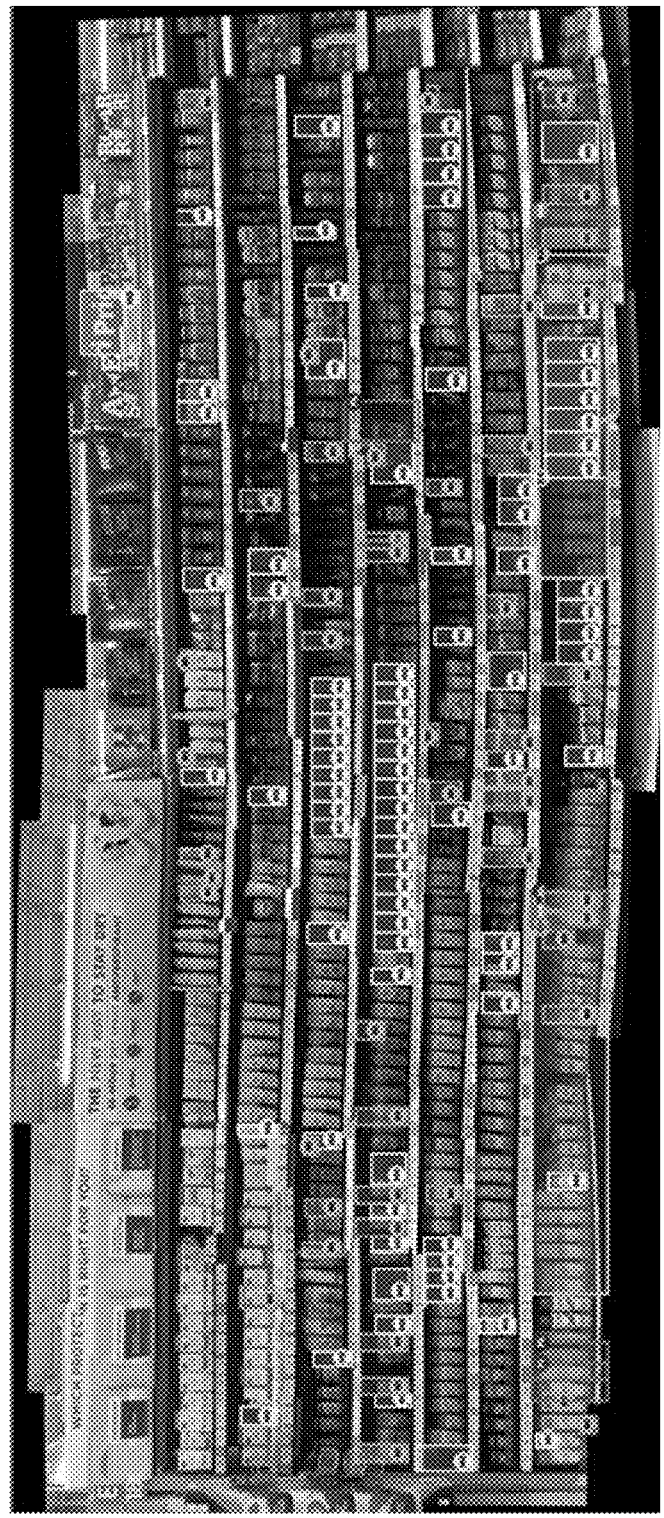

FIGS. 28A-28D are graphical representations of embodiments of example display of one or more corrective actions on top of a realogram. In FIG. 28A, the graphical representation 2800 includes a realogram displaying a set of corrective actions. The graphical representation 2800 includes a visible out of stock 2802 correction action, a hidden out of stock 2804 corrective action, a visible missing facing 2806 corrective action, and an extra product facing 2808 corrective action at different shelf locations in the realogram. The corrective action module 215 labels each corrective action to indicate what type of corrective action it is. FIG. 28B is another graphical representation 2825 of a realogram displaying a set of corrective action. The corrective action module 215 updates the graphical representation 2825 in FIG. 28B from the graphical representation 2700 in FIG. 27. The graphical representation 2825 illustrates that the corrective action module 215 identifies a placement issue 2830 corrective action from the brand chunking shown in FIG. 27. FIG. 28C is a graphical representation 2850 illustrating a set of corrective actions relating to two product facing brands. In the graphical representation 2850, the corrective action module 215 highlights the region 2855 where the issues or corrective actions are present. The corrective action module 215 labels the highlighted region 2855 with the brand name for clarity. FIG. 28D is a graphical representation 2875 illustrating a set of corrective actions for all product facing brands. The corrective action module 215 highlights each type of corrective action in a distinct color to visually distinguish the corrective action for the user.

Figure 29A:
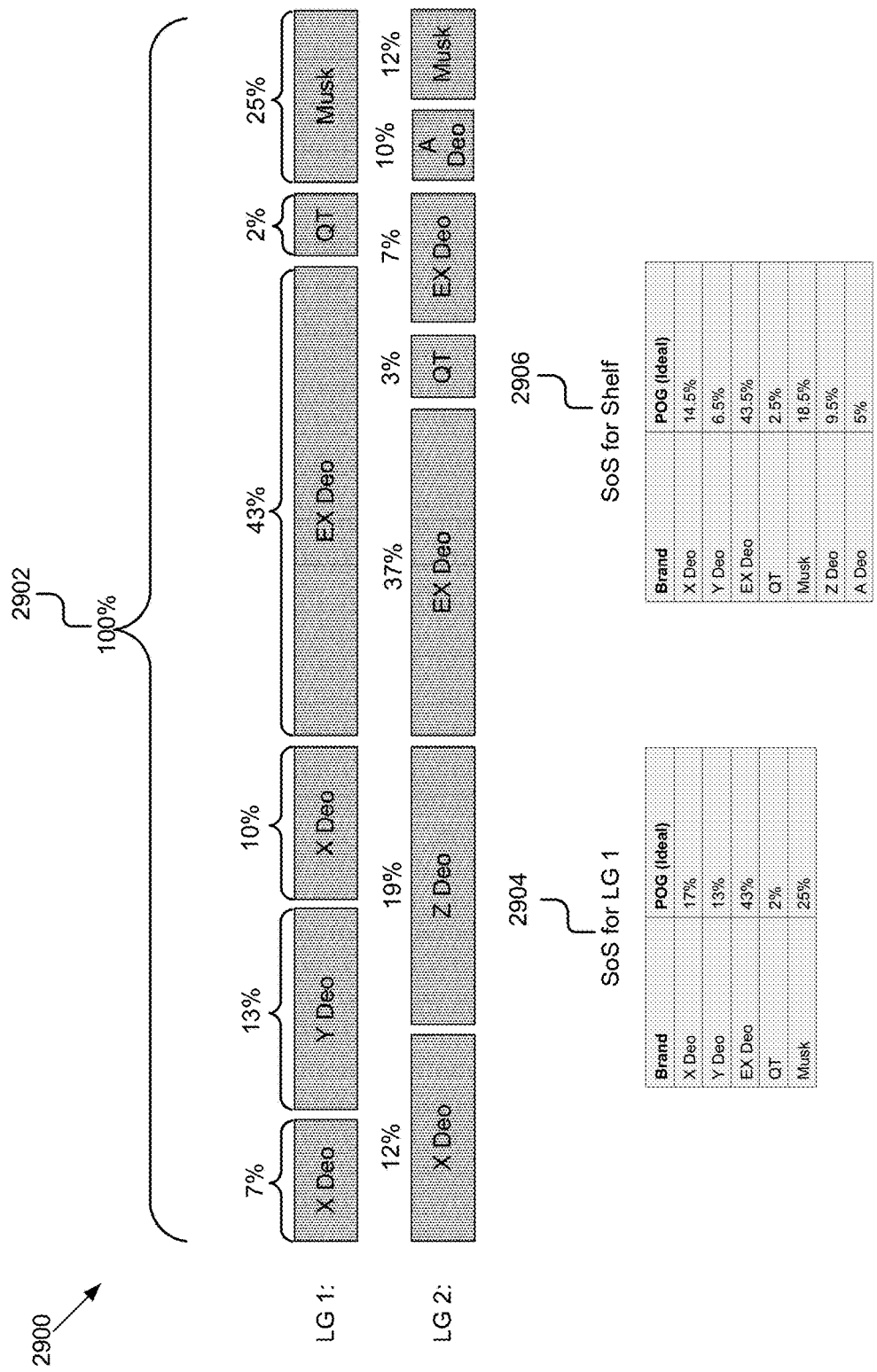

FIGS. 29A-29B are graphical representations of embodiments of generating a share of shelf report. FIG. 29A includes a graphical representation 2900 showing analytics information about share of shelf data produced by the system of the present invention. A share of shelf data 2902 is an indicator used to compare how products compete with other products on the shelf. The share of shelf data 2902 is computed by accounting for the actual space the products take up on the shelf. The actual space the product takes up may be calculated based on processed linear groupings of shelf facings. Once a share of shelf data 2902 is computed, the percentages 2904 for each brand may be determined. The analytics information may include tables showing the percentage of share of shelf by brand for easy reference. FIG. 29B is a graphical representation 2908 of an example share percentage based on brands. Brand chunking by the alignment module 219 automatically produces share of shelf values. The alignment module 219 may calculate a share of shelf value for both an image and a planogram and compare the share of shelf values to determine differences for corrective actions.

Figure 30:
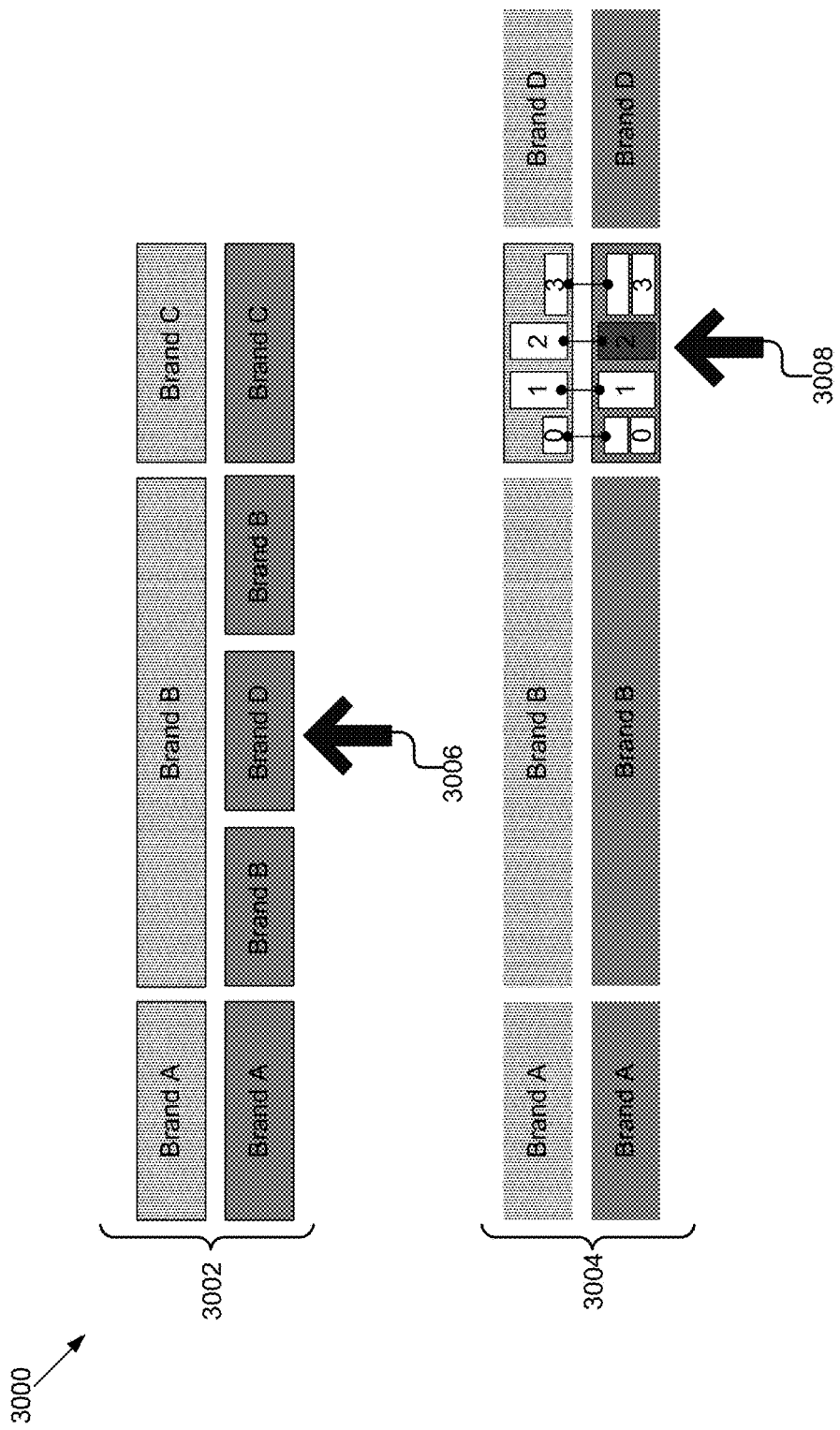
FIG. 30 is a graphical representation of one embodiment of an example developed rule based on comparisons.

FIG. 30 is a graphical representation 3000 of one embodiment of an example developed rule based on comparisons. The corrective action module 215 may develop rules based on known data structures from comparisons of images and planograms. The rules may be developed for both chunk analysis and facing to facing analysis. Chunk rule 3002 may determine that a planogram shows brand chunks including brand A, brand B, and brand C. However, the image chunking 3006 also includes a brand D. The chunk rule 3002 may determine that a corrective action present with regards to chunk D. Facing rule 3004 may determine that a planogram shows a certain organization of facings including chunk 0, chunk 1, chunk 2, and chunk 3. However, the image facing 3008 includes additional chunks. The corrective action module 215 may determine that these additional chunks represent holes and a corrective action may be necessary.

Figure 31:
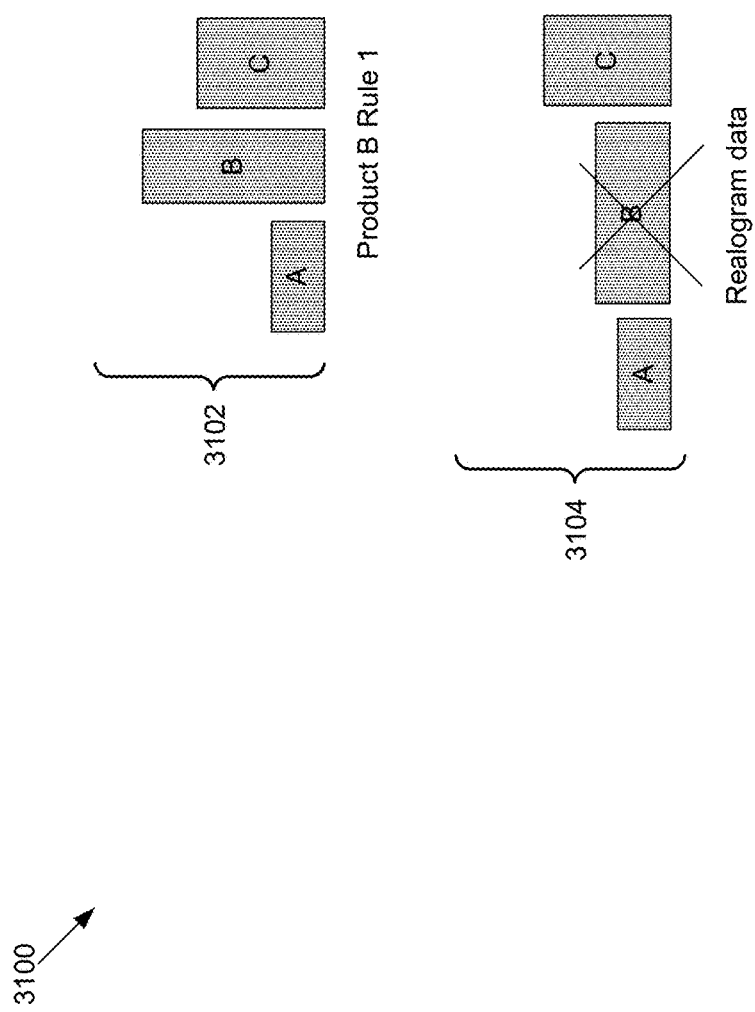
FIG. 31 is a graphical representation of one embodiment of a developed rule for products.

FIG. 31 is a graphical representation 3100 of one embodiment of a developed rule for products. The corrective action module 215 may define a set of heuristics to be used during a corrective action evaluation for objects. For example, Product B in the planogram 3102 is shown as being vertical in position. However, when compared to the image 3104, Product B is horizontal in position. If during the corrective action evaluation, a rule is present stating that Product B may never be horizontal, and it is determined that Product B is recognized and horizontal, a corrective action may be sent. This rule based system leverages rules assigned to the individual products. Thus, each product comes with a set of specific rules that only apply to that product and are leveraged by the corrective action module 215 using an algorithm that incorporates the specific rule when evaluating only that specific product. Thus, in the example, the rule about Product B being horizontal is part of the internal data structure composed around Product B.

Figure 32:
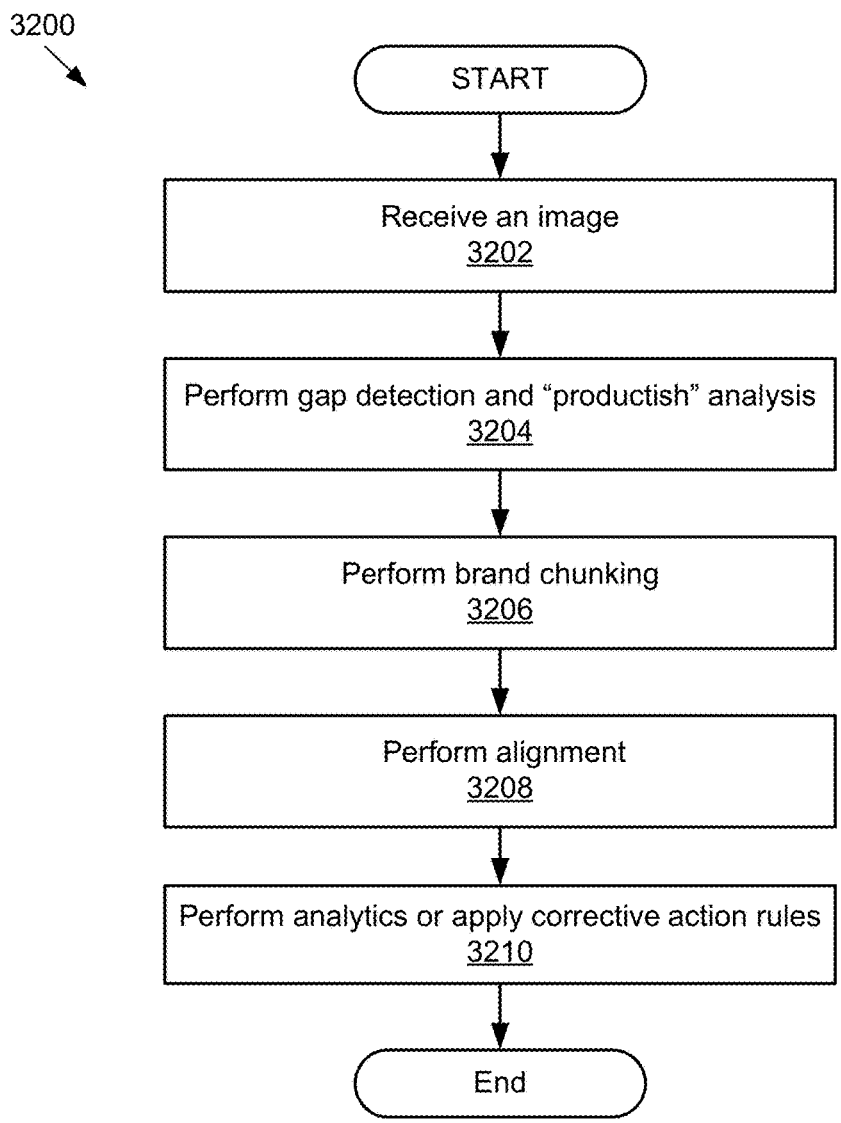
FIG. 32 is a flow diagram illustrating another embodiment of the method for determining a corrective action from a realogram image.

FIG. 32 is a flow diagram of another embodiment of a method 3200 for determining a corrective action from a realogram image. At 3202, the image recognition application 103 may receive an image. At 3204 the gap detection module 217 may perform gap detection and "productish" analysis. The "productish" analysis may be determining by the gap detection module 217 that a gap includes a potential product (e.g. there is a product in a location in a shelving unit, but the product was not recognized by image processing module 203) or a hole (i.e. an empty location in a shelving unit, a visible out-of-stock). In particular, "productish" analysis includes reviewing gaps and doing further analysis to determine the probability that the gaps may include an image of a product that cannot be definitively identified. At 3206, the analytics module 221 may perform brand chunking. At 3208, the alignment module 219 may perform an alignment between an image and a planogram. At 3210, the corrective action module 215 may perform analytics or apply corrective action rules. In some embodiments, the information produced by the alignment module 219, aligning the planogram and image, may be used for stitching images, creating a recognition candidate list, determining corrective actions, generating ground truth data, or manual scoring of images and evaluation of planogram compliance.

Figure 33:
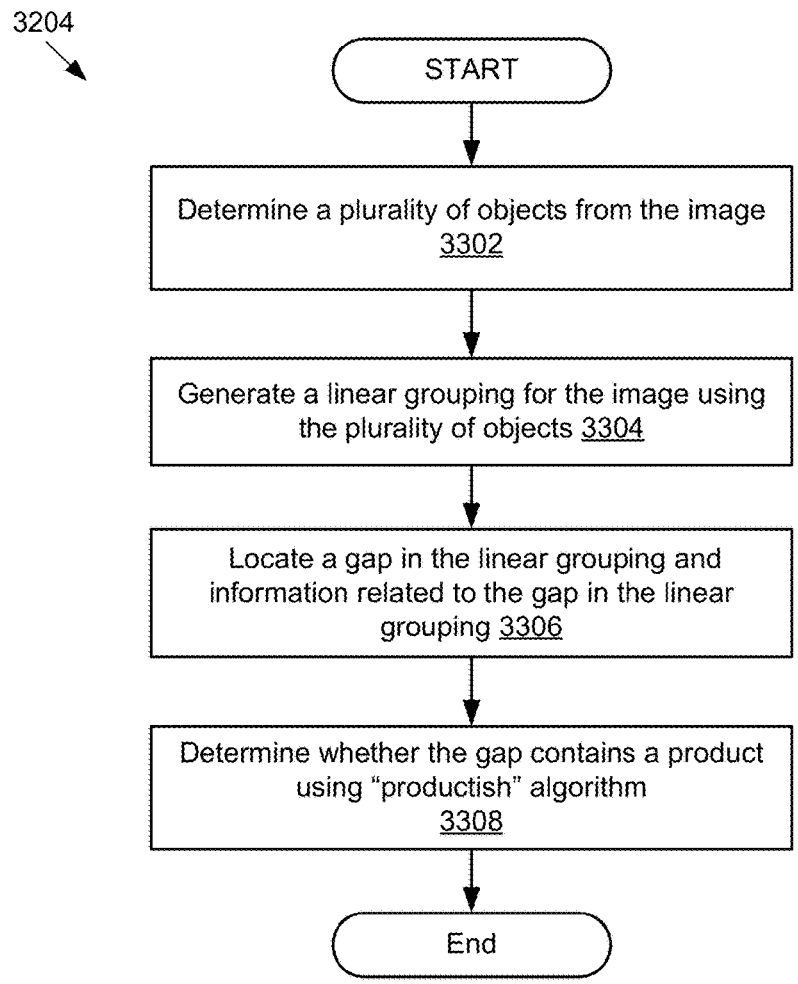
FIG. 33 is a flow diagram of an embodiment of a method for determining whether a gap contains a product.

FIG. 33 is a flow diagram of one embodiment of a method 3204 for determining whether a gap contains a product. At 3302, the gap detection module 217 may determine a plurality of objects from the image. At 3304, the gap detection module 217 may receive linear grouping data related to the plurality of objects from the image processing module 203. At 3306, the gap detection module 217 may locate a gap in the linear grouping and information related to the gap in the linear grouping. At 3308, the gap detection module 217 may determine whether the gap contains a product using the "productish" algorithm. The "productish" algorithm includes determining if the gap contains a potential product or a hole.

Figure 34:
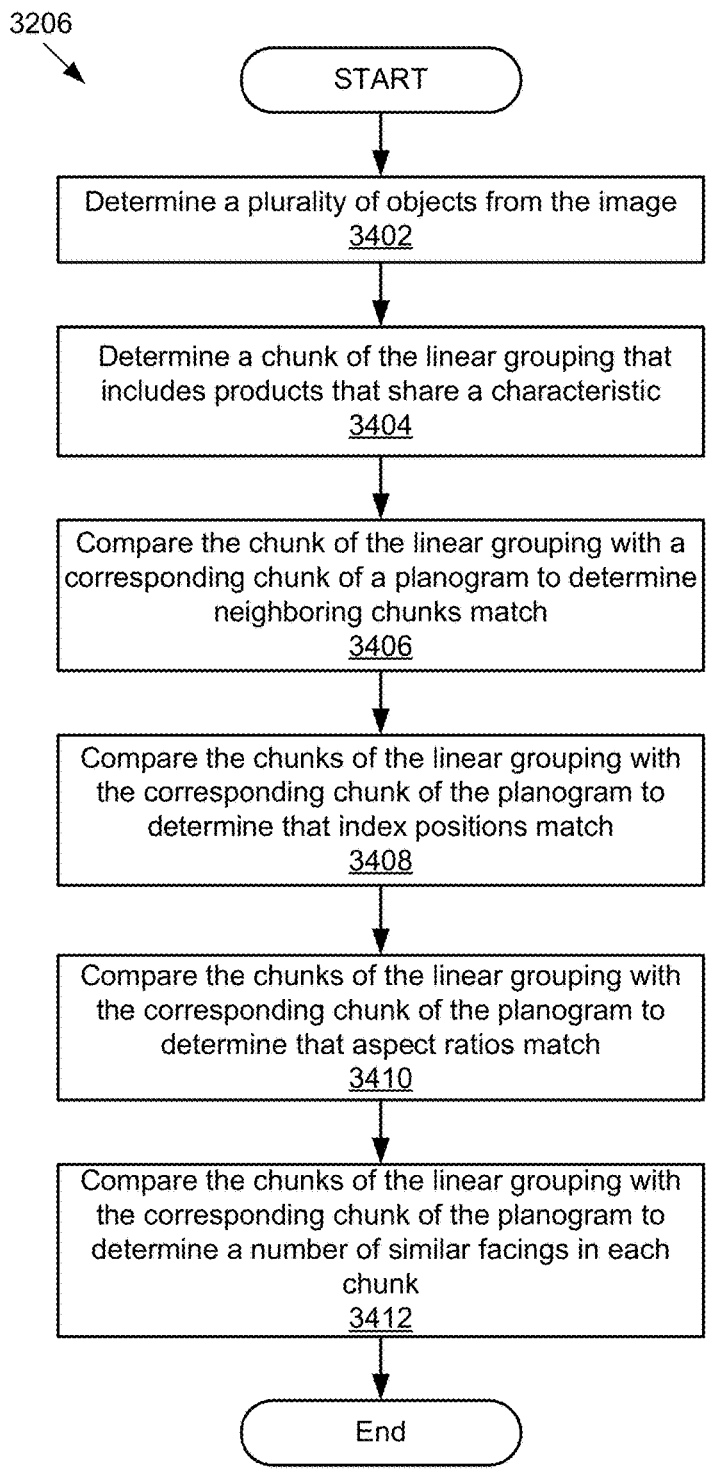
FIG. 34 is a flow diagram of an embodiment of a method for performing brand chunking.

FIG. 34 is a flow diagram 3206 of one embodiment of a method for performing brand chunking. At 3402, the analytics module 221 determines a plurality of objects from the image. At 3404, the analytics module 221 determines a chunk of the linear grouping that includes products that share a characteristic. At 3406, the analytics module 221 compares the chunk of the linear grouping with a corresponding chunk of a planogram to determine neighboring chunks match. At 3408, the analytics module 221 compares the chunks of the linear groupings with the corresponding chunks of the planogram to determine that index positions match. At 3410, the analytics module 221 compares the chunks of the linear groupings with the corresponding chunks of the planogram to determine that aspect ratios match. At 3412, the analytics module 221 compares the chunks of the linear grouping with the corresponding chunks of the planogram to determine the number of similar facings in each chunk.

Figure 35:
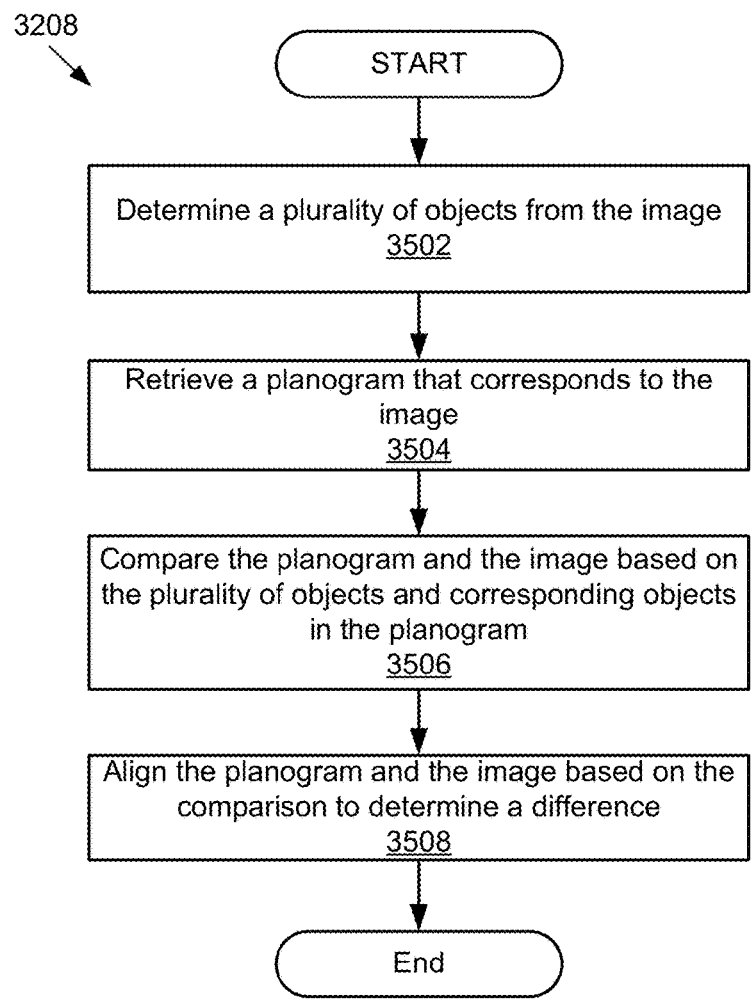
FIG. 35 is a flow diagram of an embodiment of a method for performing alignment.

FIG. 35 is a flow diagram of one embodiment of a method 3208 for performing alignment. At 3502, the alignment module 219 determines a plurality of objects from the image. At 3504, the alignment module 219 retrieves a planogram that corresponds to the image. At 3506, the alignment module 219 compares the planogram and the image based on the plurality of objects and corresponding objects in the planogram. At 3508, the alignment module 219 aligns the planogram and the image based on the comparison to determine a difference.

FIGS. 36A-36E are graphical representations of embodiments of developed rules for corrective actions. In the graphical representation 3600, FIG. 36A corresponds to a rule for a visible out of stock corrective action where a single product facing 456 in the planogram is assigned to a hole in the realogram. FIG. 36B corresponds to a rule for another visible out of stock correction action where multiple product facings 456 in the planogram are all assigned to individual holes in the realogram. FIG. 36C corresponds to a rule for a visible missing facing corrective action where one of the multiple product facings 456 in the planogram is assigned to a hole in the realogram and the hole represents a same planogram product facing as neighbor. FIG. 36D corresponds to a rule for a hidden out of stock corrective action where a single product facing 456 in the realogram is unassigned to any product facing in the realogram. FIG. 36E corresponds to a rule for a hidden missing facing corrective action where there are multiple product facings 456 in the planogram and at least one product facing is unassigned to any product facing in the realogram. FIG. 36F corresponds to a rule for extra facing corrective action where a product facing in the realogram is not connected to any product facing in the planogram.

The output of Corrective Action Module 215 outputs data symbolic data (e.g. JSON, XML, YAML or other formats). The example XML below gives a location and kind for the four corrective actions in FIG. 36. The location may be represented as indices into the planogram based on a linear group index and a facing index. The location may be a planogram location, an image (realogram) location, or both and may specified in other ways (e.g. in image coordinates or physical shelf coordinates). In addition to location and kind, other information, may be included. Examples of other information may include recognition information, mapping between planogram and image (realogram) information, etc.

```
<CorrectiveActions>
  <CA>
    <Location><LinearGroup>5</LinearGroup><Facing>6</Facing>
    </Location>
    <Kind>Hidden OoS</Kind>
  </CA>
  <CA>
    <Location><LinearGroup>5</LinearGroup><Facing>10</Facing>
```

-continued

```
    </Location>
    <Kind>Visible OoS</Kind>
  </CA>
  <CA>
    <Location><LinearGroup>5</LinearGroup><Facing>17</Facing>
    </Location>
    <Kind>Visible OoS</Kind>
  </CA>
  <CA>
    <Location><LinearGroup>5</LinearGroup><Facing>19</Facing>
    </Location>
    <Kind>Visible OoS</Kind>
  </CA>
</CorrectiveActions>
```

Figure 37:
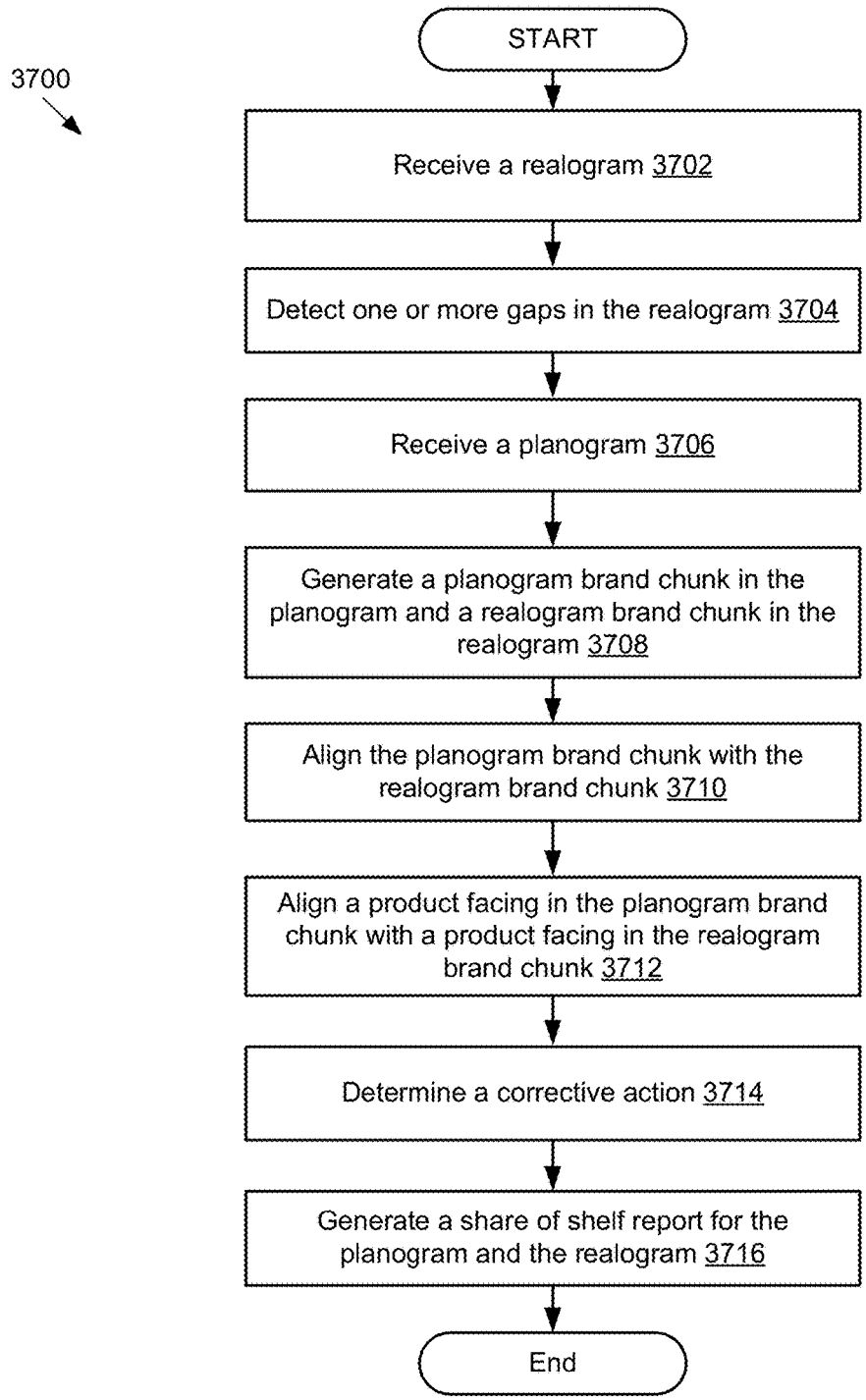
FIG. 37 is a flow diagram of an embodiment of a method for assessing a realogram in the context of a planogram to determine a corrective action.

FIG. 37 is a flow diagram of an embodiment of a method 3700 for assessing a realogram in the context of a planogram to determine a corrective action. At 3702, the gap detection module 217 receives a realogram. For example, the realogram includes product recognition information of a portion of a shelving unit. At 3704, the gap detection module 217 detects one or more gaps in the realogram. At 3706, the alignment module 219 receives a planogram. At 3708, the alignment module 219 generates a planogram brand chunk in the planogram and a realogram brand chunk in the realogram. At 3710, the alignment module 219 aligns the planogram brand chunk with the realogram brand chunk. At 3712, the alignment module 219 aligns a product facing in the planogram brand chunk with a product facing in the realogram brand chunk. At 3714, the corrective action module 215 determines a corrective action. At 3716, the analytics module 221 generates a share of shelf report for the planogram and the realogram.

Figure 38A:
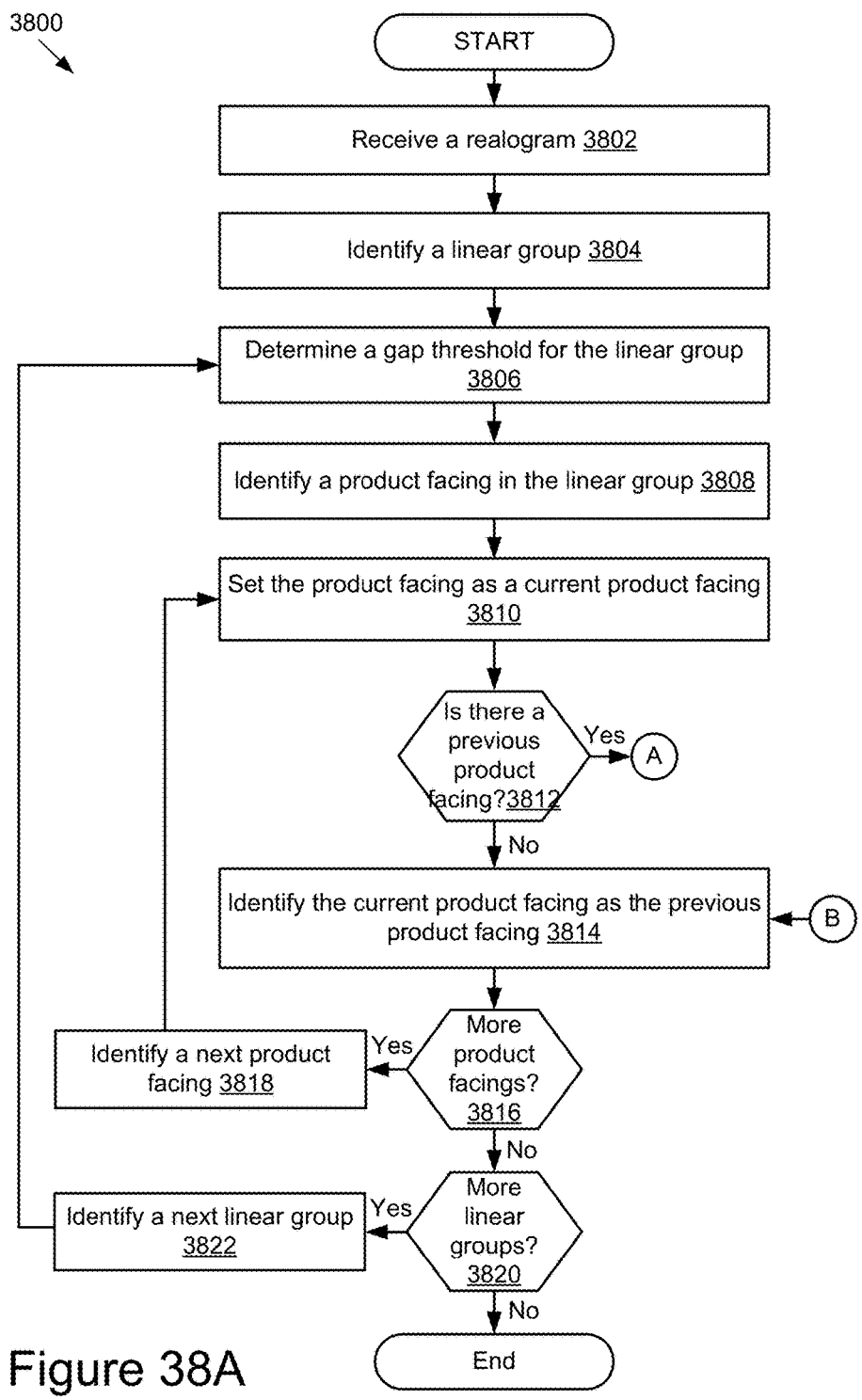
FIGS. 38A and 38B are flow diagrams of an embodiment of a method for detecting gaps.
Figure 38B:
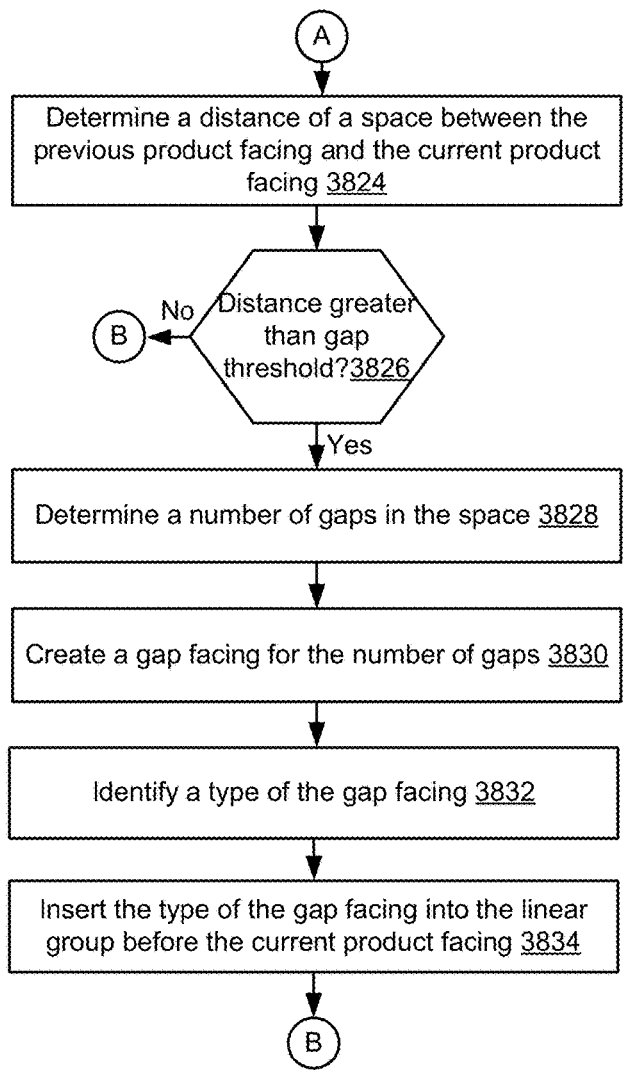

FIGS. 38A and 38B are flow diagrams of an embodiment of a method 3800 for detecting gaps. At 3802, the gap detection module 217 receives a realogram. At 3804, the gap detection module 217 identifies a linear group. At 3806, the gap detection module 217 determines a gap threshold for the linear group. At 3808, the gap detection module 217 identifies a product facing in the linear group. At 3810, the gap detection module 217 sets the product facing as a current product facing. At 3812, the gap detection module 217 determines whether there is a previous product facing to the current product facing.

If there is a previous product facing to the current product facing, at 3824, the gap detection module 217 determines a distance of a space between the previous product facing and the current product facing. At 3826, the gap detection module 217 determines whether the distance is greater than the gap threshold. If the distance is greater than the gap threshold, at 3828, the gap detection module 217 determines a number of gaps in the space. At 3830, the gap detection module 217 creates a gap facing for the number of gaps. At 3832, the gap detection module 217 classifies the gap facing. At 3834, the gap detection module 217 inserts the gap facing into the linear group before the current product facing and the method 3800 repeats the process at 3814.

If there is not a previous product facing to the current product facing, at 3814, the gap detection module 217 identifies the current product facing as the previous product facing. At 3816, the gap detection module 217 determines whether there are more product facings in the linear group. If there are more product facings, at 3818, the gap detection module 217 identifies a next product facing and the method 3800 repeats the process at 3810. If there are no more product facings, at 3820, the gap detection module 217 determines whether there are more linear groups in the realogram. If there are more linear groups, at 3822, the gap detection module 217 identifies a next linear group and the method 3800 repeats the process at 3806. If there are no more linear groups, the method 3800 ends.

Figure 39:
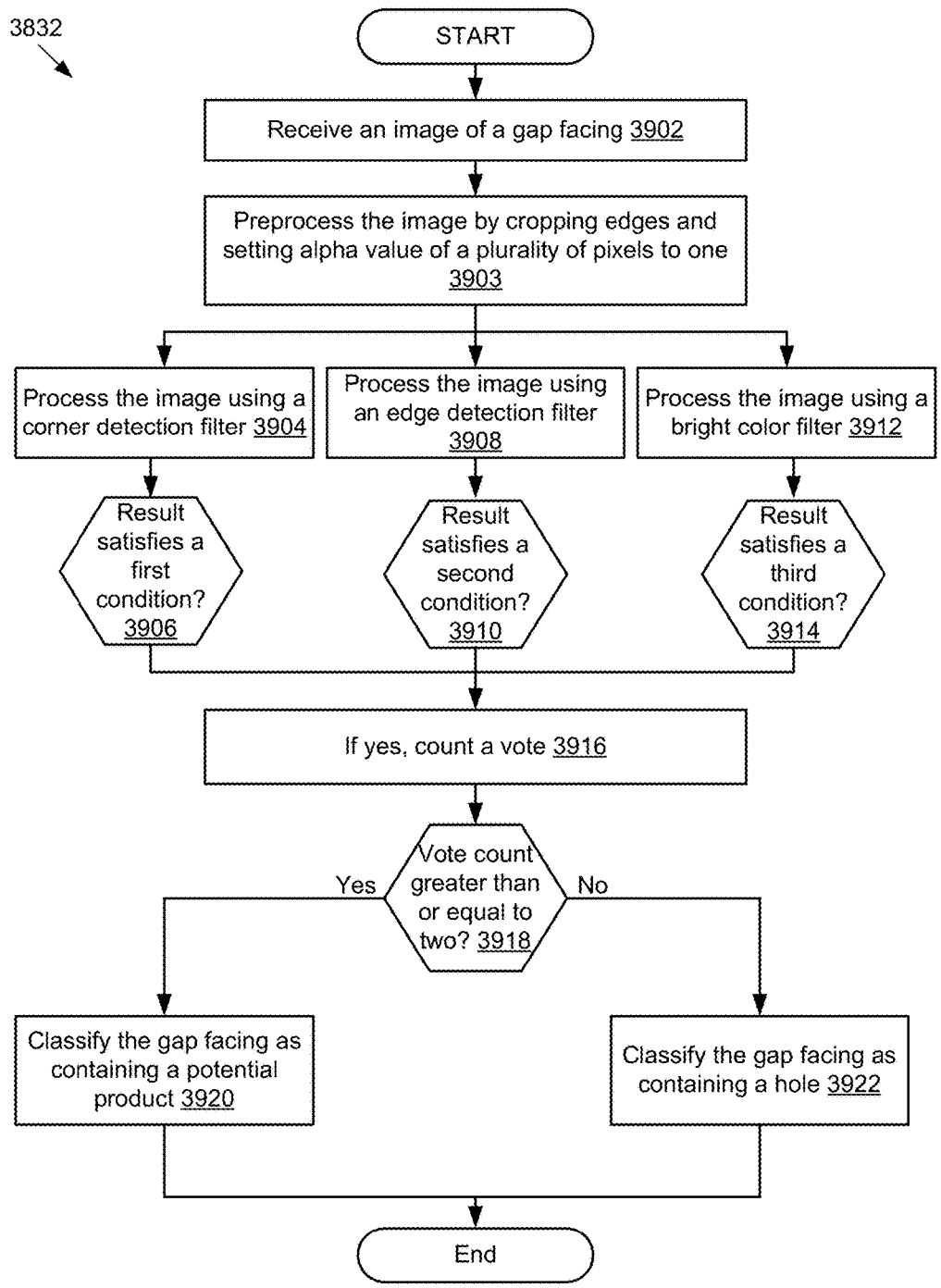
FIG. 39 is a flow diagram of an embodiment of a method for classifying a gap facing.

FIG. 39 is a flow diagram of an embodiment of a method 3832 for classifying a gap facing. At 3902, the gap detection module 217 receives an image of a gap facing. At 3903, the gap detection module 217 preprocesses the image by cropping edges and setting alpha value of all pixels to one.

At 3904, the gap detection module 217 processes the image using a corner detection filter. At 3906, the gap detection module 217 determines whether a result of processing the image using the corner detection filter satisfies a first condition for presence of product like features. At 3916, the gap detection module 217 counts a vote based on the result satisfying the first condition.

At 3908, the gap detection module 217 processes the image using an edge detection filter. At 3910, the gap detection module 217 determines whether a result of processing the image using the edge detection filter satisfies a second condition for presence of product like features. At 3916, the gap detection module 217 counts a vote based on the result satisfying the second condition.

At 3912, the gap detection module 217 processes the image using a bright color filter. At 3914, the gap detection module 217 determines whether a result of processing the image using the bright color filter satisfies a third condition for presence of product like features. At 3916, the gap detection module 217 counts a vote based on the result satisfying the third condition.

At 3918, the gap detection module 217 determines whether the vote count is greater than or equal to two. If the vote count is greater than or equal to two, at 3920, the gap detection module 217 identifies the gap facing as containing a potential product and the method 3832 ends. If the vote count is less than two, at 3922, the gap detection module 217 identifies the gap facing as containing a hole and the method 3822 ends.

Figure 40:
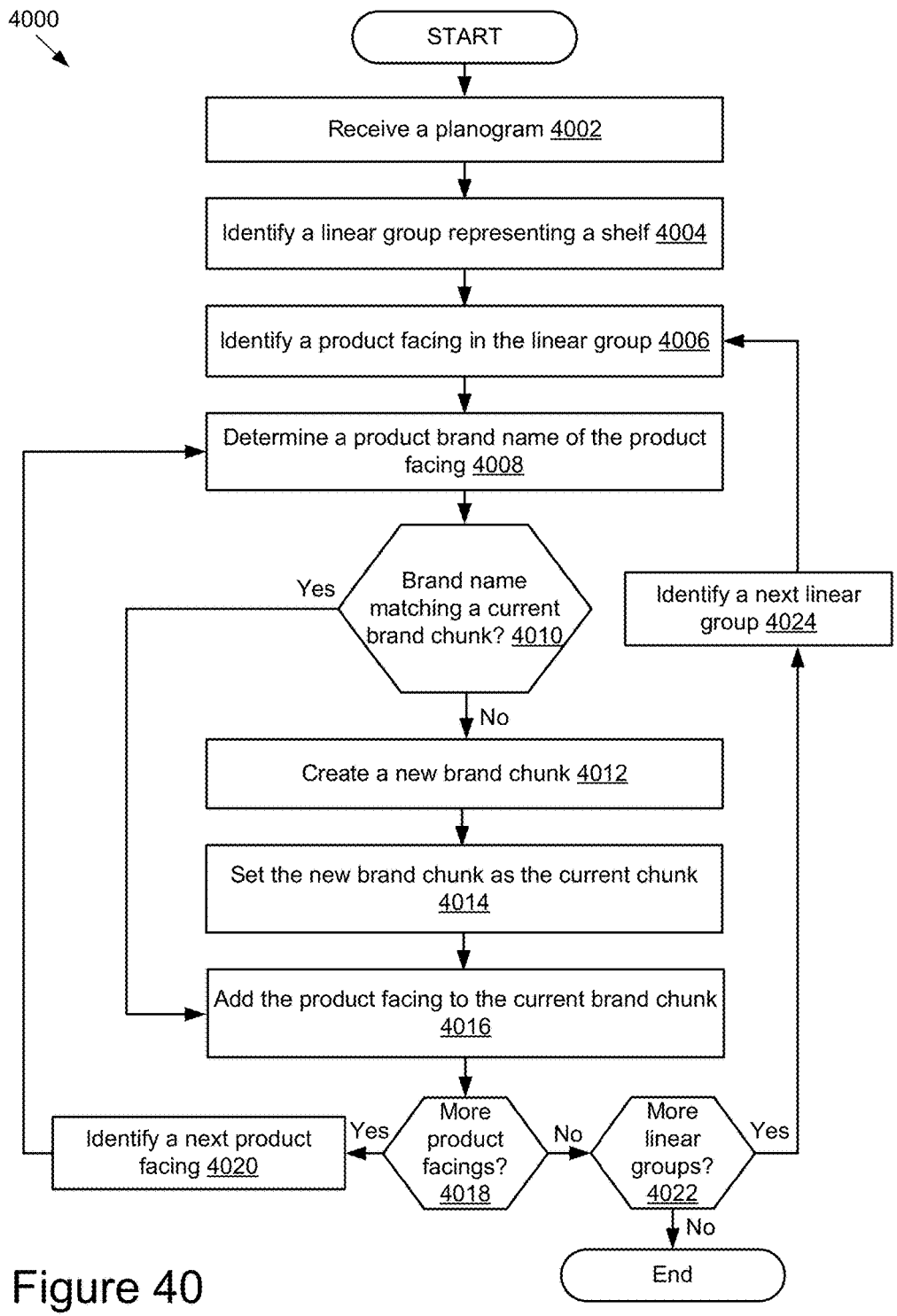
FIG. 40 is a flow diagram of an embodiment of a method for creating brand chunks in a planogram.

FIG. 40 is a flow diagram of an embodiment of a method 4000 for creating brand chunks in a planogram. At 4002, the alignment module 219 receives a planogram. At 4004, the alignment module 219 identifies a linear group representing a shelf. At 4006, the alignment module 219 identifies a product facing in the linear group. At 4008, the alignment module 219 determines a product brand name of the product facing. At 4010, the alignment module 219 determines whether the brand name matches a current brand chunk. If the brand name matches a current brand chunk, the method 4000 skips the process ahead at 4016. If the brand name does not match the current brand chunk, at 4012, the alignment module 219 creates a new brand chunk. At 4014, the alignment module 219 sets the new brand chunk as the current brand chunk. At 4016, the alignment module 219 adds the product facing to the current brand chunk. At 4018, the alignment module 219 determines whether there are more product facings in the linear group. If there are more product facings, at 4020, the alignment module 219 identifies a next product facing and the method 4000 repeats the process at 4008. If there are no more product facings, at 4022, the alignment module 219 determines whether there are more linear groups in the planogram. If there are more linear groups, at 4024, the alignment module 219 identifies a next linear group and the method 4000 repeats the process at 4006. If there are no more linear groups, the method 4000 ends.

Figure 41:
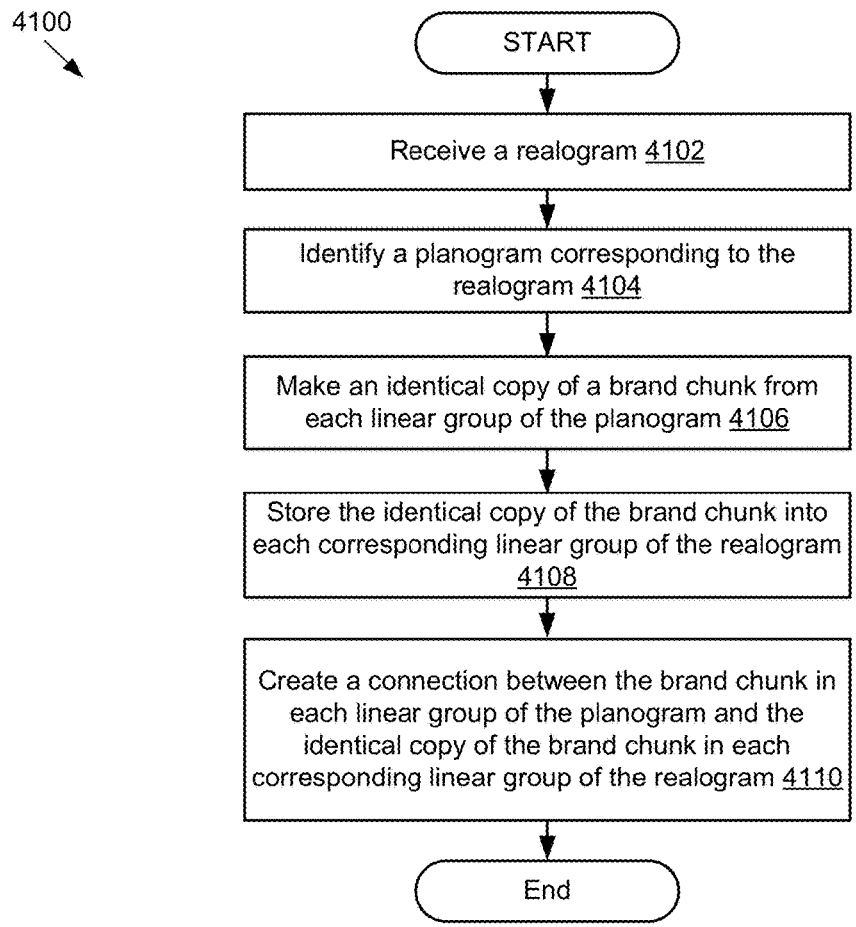
FIG. 41 is a flow diagram of an embodiment of a method for creating brand chunks in a realogram.

FIG. 41 is a flow diagram of an embodiment of a method 4100 for creating brand chunks in a realogram. At 4102, the alignment module 219 receives a realogram. At 4104, the alignment module 219 identifies a planogram corresponding to the realogram. At 4106, the alignment module 219 makes an identical copy of a brand chunk from each linear group of the planogram. At 4108, the alignment module 219 stores the identical copy of the brand chunk into each corresponding linear group of the realogram. At 4110, the alignment module 219 creates a connection between the brand chunk in each linear group of the planogram and the identical copy of the brand chunk in each corresponding linear group of the realogram.

Figure 42A:
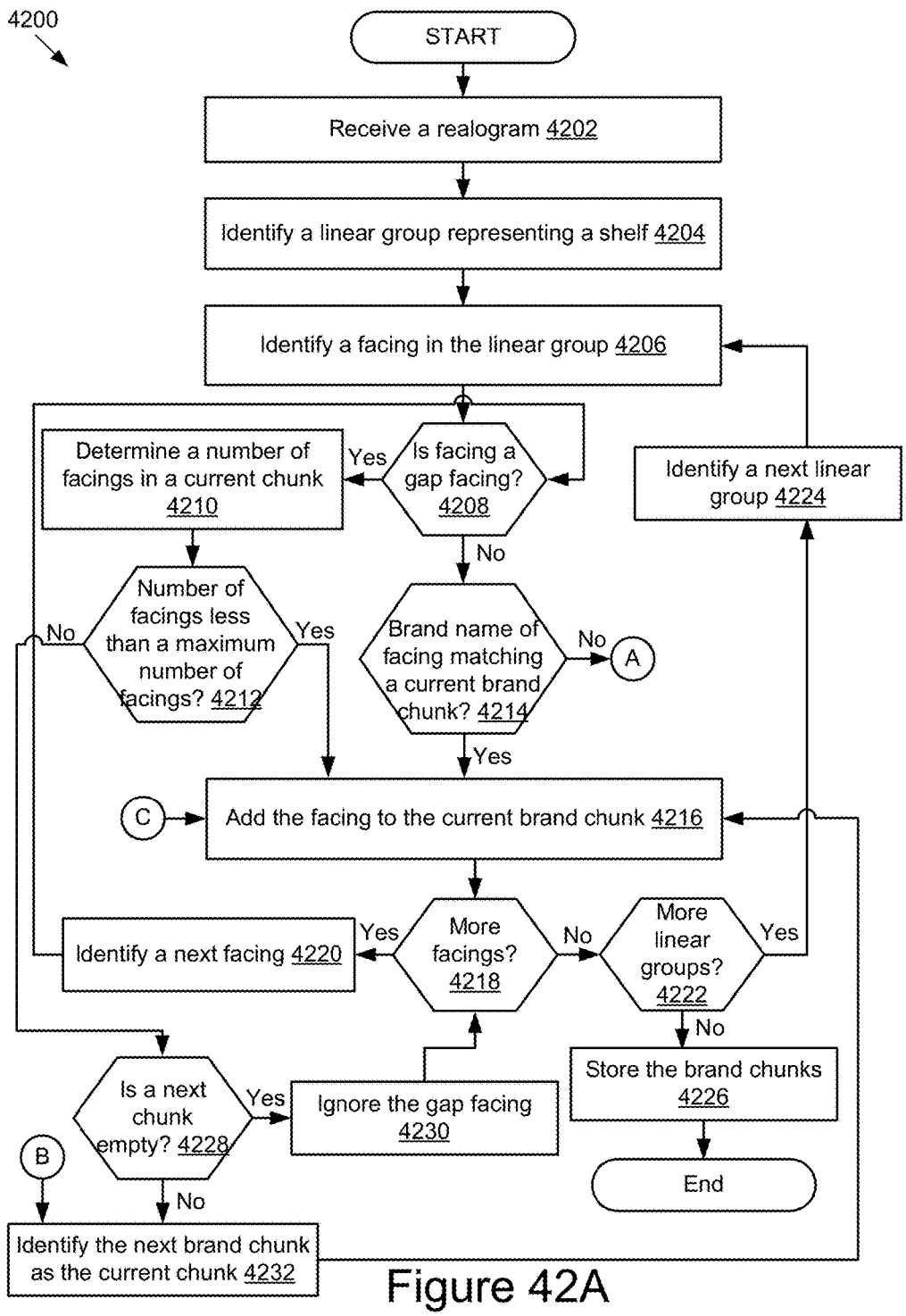
FIGS. 42A and 42B are flow diagrams of an embodiment of a method for refining brand chunks in the realogram.
Figure 42B:
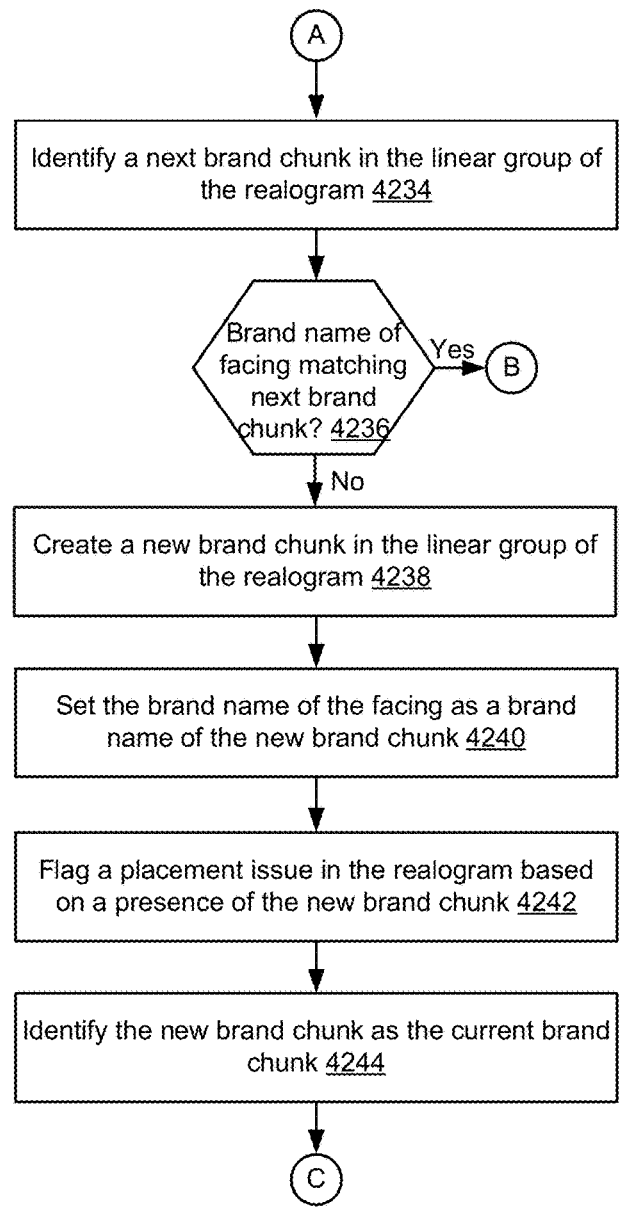

FIGS. 42A and 42B are flow diagrams of an embodiment of a method 4200 for refining the brand chunks in the realogram. At 4202, the alignment module 219 receives a realogram. At 4204, the alignment module 219 identifies a linear group representing a shelf. At 4206, the alignment module 219 identifies a facing in the linear group. At 4208, the alignment module 219 determines whether the facing is a gap facing.

If the facing is a gap facing, at 4210, the alignment module 219 determines a number of facings added to a current brand chunk. At 4212, the alignment module 219 determines whether the number of facings is less than a maximum number of facings allocated to the brand chunk.

If the number of facings is less than the maximum number of facings, at 4216, the alignment module 219 adds the facing to the current brand chunk. At 4218, the alignment module 219 determines whether there are more facings in the linear group. If there are more facings, at 4220, the alignment module 219 identifies a next facing and the method 4200 repeats the process at 4208. If there are no more facings, at 4222, the alignment module 219 determines whether there are more linear groups in the realogram. If there are more linear groups, at 4224, the alignment module 219 identifies a next linear group and the method 4200 repeats the process at 4206. If there are no more linear groups, at 4226, the alignment module 219 stores the brand chunks and the method 4200 ends.

If the number of facings is not less than the maximum number of facings, at 4228, the alignment module 219 determines whether a next brand chunk is empty. If the next brand chunk is empty, at 4230, the alignment module 219 ignores the gap facing and the method 4200 repeats the process at 4218. If the next brand chunk is not empty, at 4232, the alignment module 219 identifies the next brand chunk as the current brand chunk and the method 4200 repeats the process at 4216.

If the facing is not a gap facing, at 4214, the alignment module 219 determines whether a brand name of the facing is matching a current brand chunk. If the brand name is matching the current brand chunk, at 4216, the alignment module 219 adds the facing to the current brand chunk and the method 4200 repeats the process at 4218. If the brand name is not matching the current brand chunk, at 4234, the alignment module 219 identifies a next brand chunk in the linear group of the realogram. At 4236, the alignment module 219 determines whether the brand name of the facing is matching a next brand chunk. If the brand name of the facing is matching the next brand chunk, the method 4200 repeats the process at 4232. If the brand name of the facing is not matching the next brand chunk, at 4238, the alignment module 219 creates a new brand chunk in the linear group of the realogram. At 4240, the alignment module 219 sets the brand name of the facing as a brand name of the new brand chunk. At 4242, the alignment module 219 flags a placement issue in the realogram based on a presence of the new brand chunk. At 4244, the alignment module 219 identifies the new brand chunk as the current brand chunk and the method 4200 repeats the process at 4216.

Figure 43A:
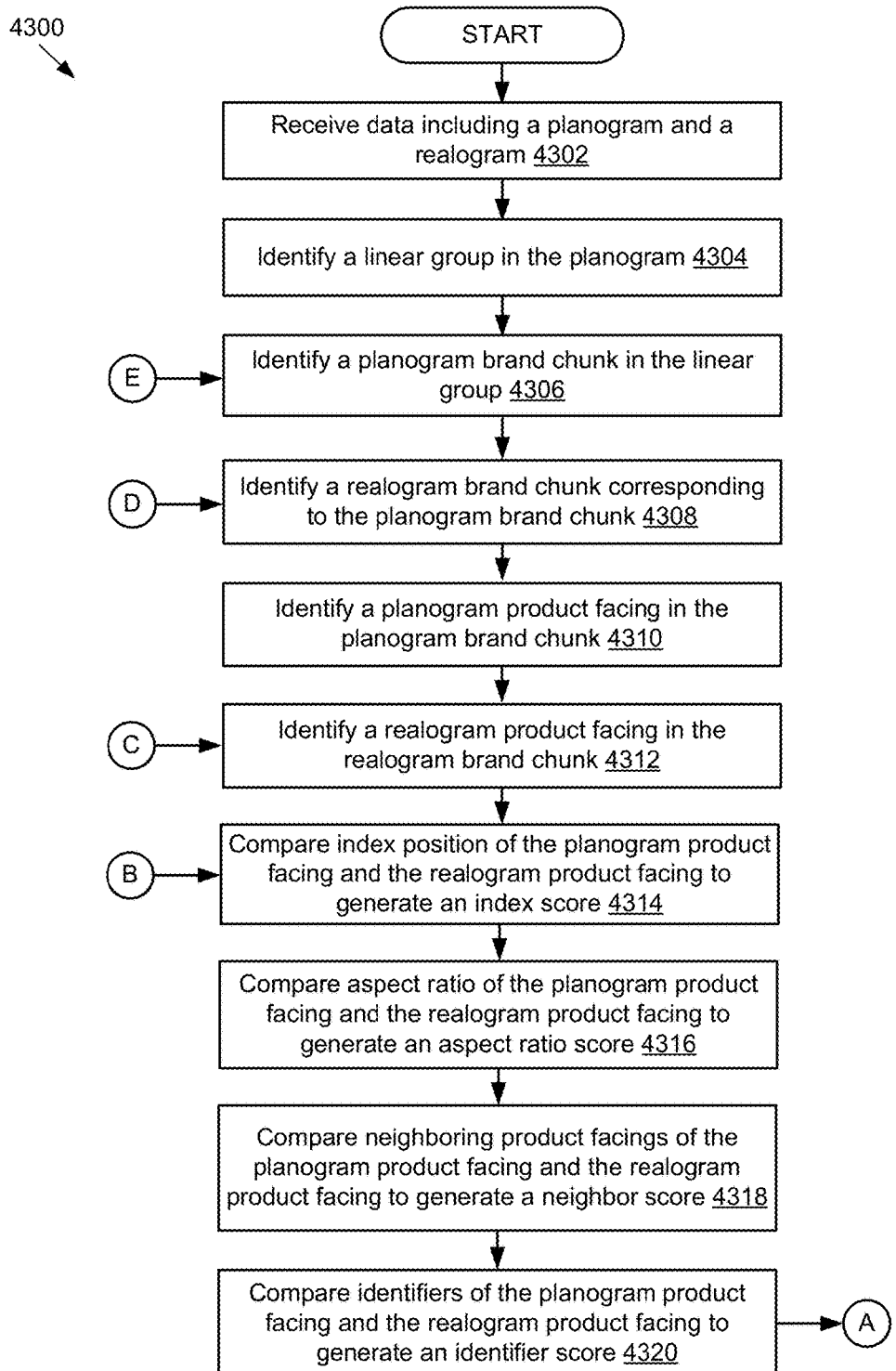
FIG. 43A-43B are flow diagram of an embodiment of a method for aligning a planogram product facing from a planogram brand chunk with a realogram product facing in a realogram brand chunk.
Figure 43B:
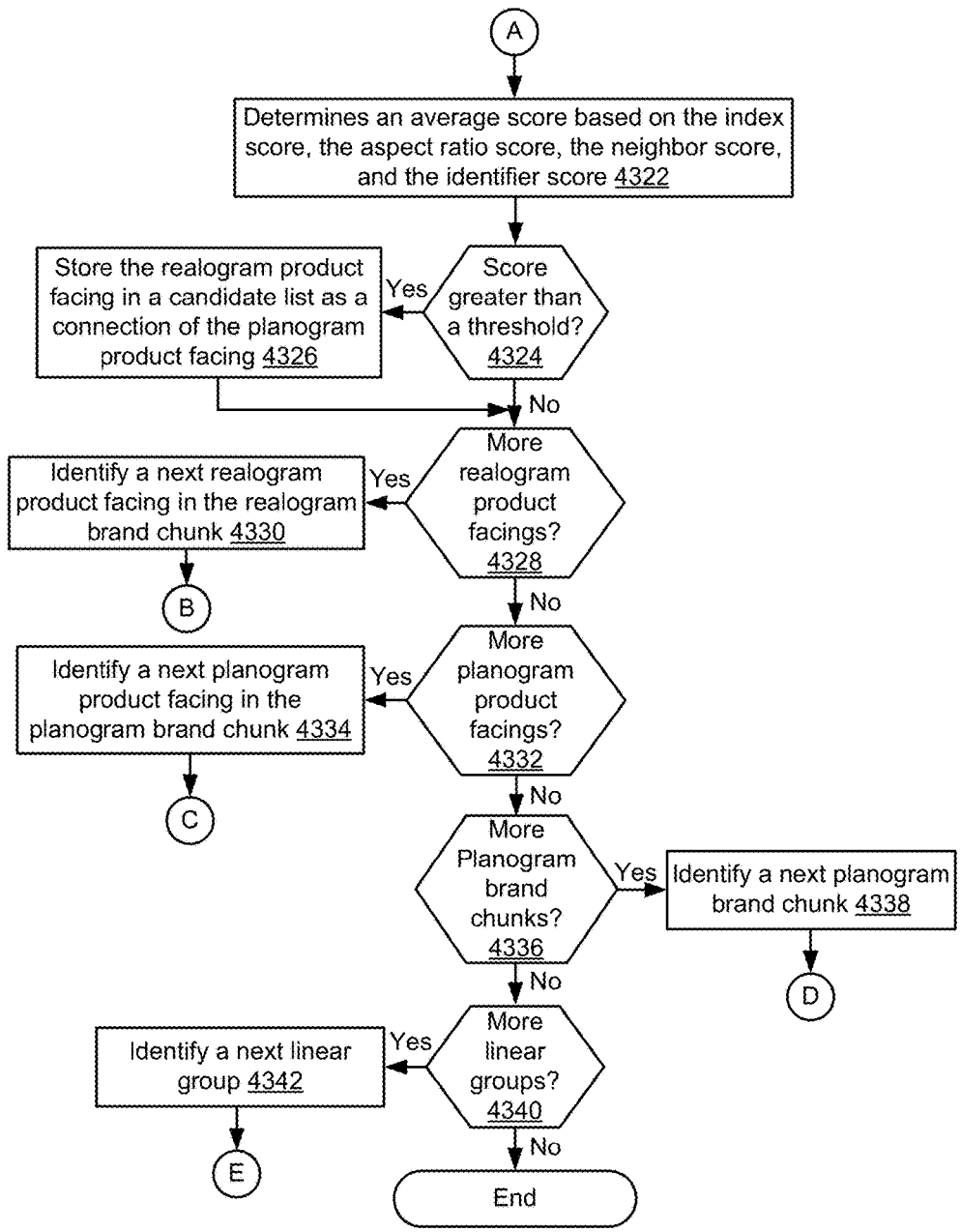

FIGS. 43A and 43B are flow diagrams of an embodiment of a method 4300 for aligning a planogram product facing from a planogram brand chunk with a realogram product facing in a realogram brand chunk. At 4302, the alignment module 219 receives data including a planogram and a realogram. At 4304, the alignment module 219 identifies a linear group in the planogram. At 4306, the alignment module 219 identifies a planogram brand chunk in the linear group. At 4308, the alignment module 219 identifies a realogram brand chunk corresponding to the planogram brand chunk. At 4310, the alignment module 219 identifies a planogram product facing in the planogram brand chunk. At 4312, the alignment module 219 identifies realogram product facing in the realogram brand chunk. At 4314, the alignment module 219 compares index position of the planogram product facing and the realogram product facing to generate an index score. At 4316, the alignment module 219 compares aspect ratio of the planogram product facing and the realogram product facing to generate an aspect ratio score. At 4318, the alignment module 219 compares neighboring product facings of the planogram product facing and the realogram product facing to generate a neighbor score. At 4320, the alignment module 219 compares identifiers of the planogram product facing and the realogram product facing to generate an identifier score. At 4322, the alignment module 219 determines an average score based on the index score, the aspect ratio score, the neighbor score, and the identifier score. At 4324, the alignment module 219 determines whether the average score is greater than a threshold. If the average score is greater than the threshold, at 4326, the alignment module 219 stores the realogram product facing in a candidate list as a connection of the planogram product facing and the method 4300 proceeds to 4328. If the average score is not greater than the threshold, at 4328, the alignment module 219 determines whether there are more realogram product facings in the realogram brand chunk. If there are more realogram product facings, at 4330, the alignment module 219 identifies a next realogram product facing in the realogram brand chunk and the method 4300 repeats the process at 4314. If there are no more realogram product facings, at 4332, the alignment module 219 determines whether there are more planogram product facings in the planogram brand chunk. If there are more planogram product facings, at 4334, the alignment module 219 identifies a next planogram product facing in the planogram brand chunk and the method 4300 repeats the process at 4312. If there are no more planogram product facings, at 4336, the alignment module 219 determines whether there are more planogram brand chunks in the linear group. If there are more planogram brand chunks, at 4338, the alignment module 219 identifies a next planogram brand chunk and the method 4300 repeats the process at 4308. If there are no more planogram brand chunks, at 4340, the alignment module 219 determines whether there are more linear groups in the planogram. If there are more linear groups, at 4342, the alignment module 219 identifies a next linear group and the method 4300 repeats the process at 4306. If there are no more linear groups, the method 4300 ends.

Figure 44:
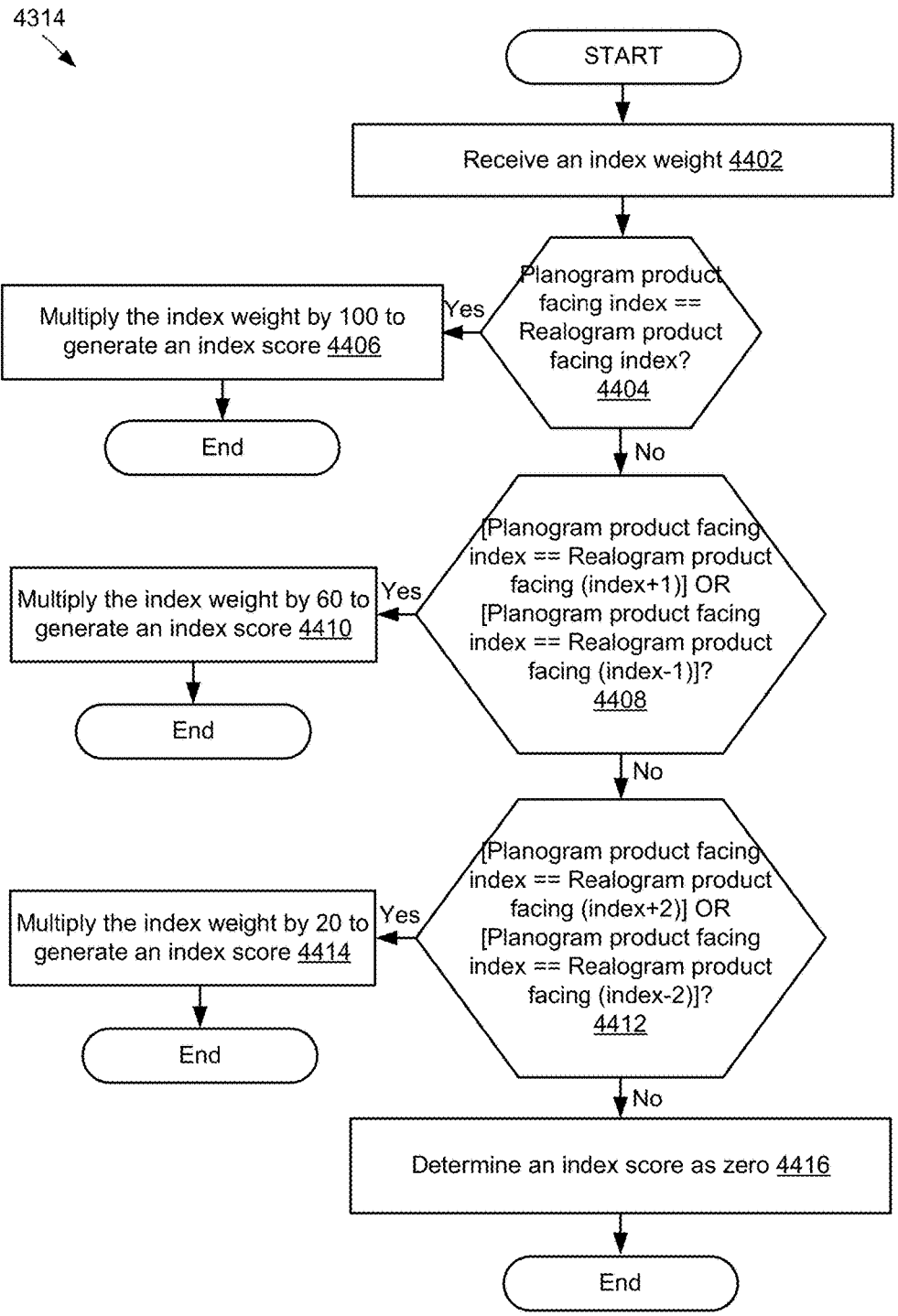
FIG. 44 is a flow diagram of an embodiment of a method for comparing the index positions of a planogram product facing and a realogram product facing.

FIG. 44 is a flow diagram of an embodiment of a method 4314 for comparing the index positions of a planogram product facing and a realogram product facing. At 4402, the alignment module 219 receives an index weight. At 4404, the alignment module 219 determines whether the index position of the planogram product facing matches the index position of the realogram product facing. If the index position of the planogram product facing matches the index position of the realogram product facing, at 4406, the alignment module 219 multiplies the index weight by 100 to generate an index score. If the index position of the planogram product facing does not match the index position of the realogram product facing, at 4408, the alignment module 219 determines whether the index position of the planogram product facing matches an index position of another realogram product facing that is one position to the left or the right of the index position of the realogram product facing. If the index position of the planogram product facing does match an index position of another realogram product facing that is one position to the left or the right, at 4410, the alignment module 219 multiples the index weight by 60 to generate an index score. If the index position of the planogram product facing does not match an index position of another realogram product facing that is one position to the left or the right, at 4412, the alignment module 219 determines whether the index position of the planogram product facing matches an index position of another realogram product facing that is two positions to the left or the right of the index position of the realogram product facing. If the index position of the planogram product facing does match an index position of another realogram product facing that is two positions to the left or the right, at 4414, the alignment module 219 multiplies the index weight by 20 to generate an index score. If the index position of the planogram product facing does not match an index position of another realogram product facing that is two positions to the left or the right, at 4416, the alignment module 219 determines the index score as zero.

Figure 45:
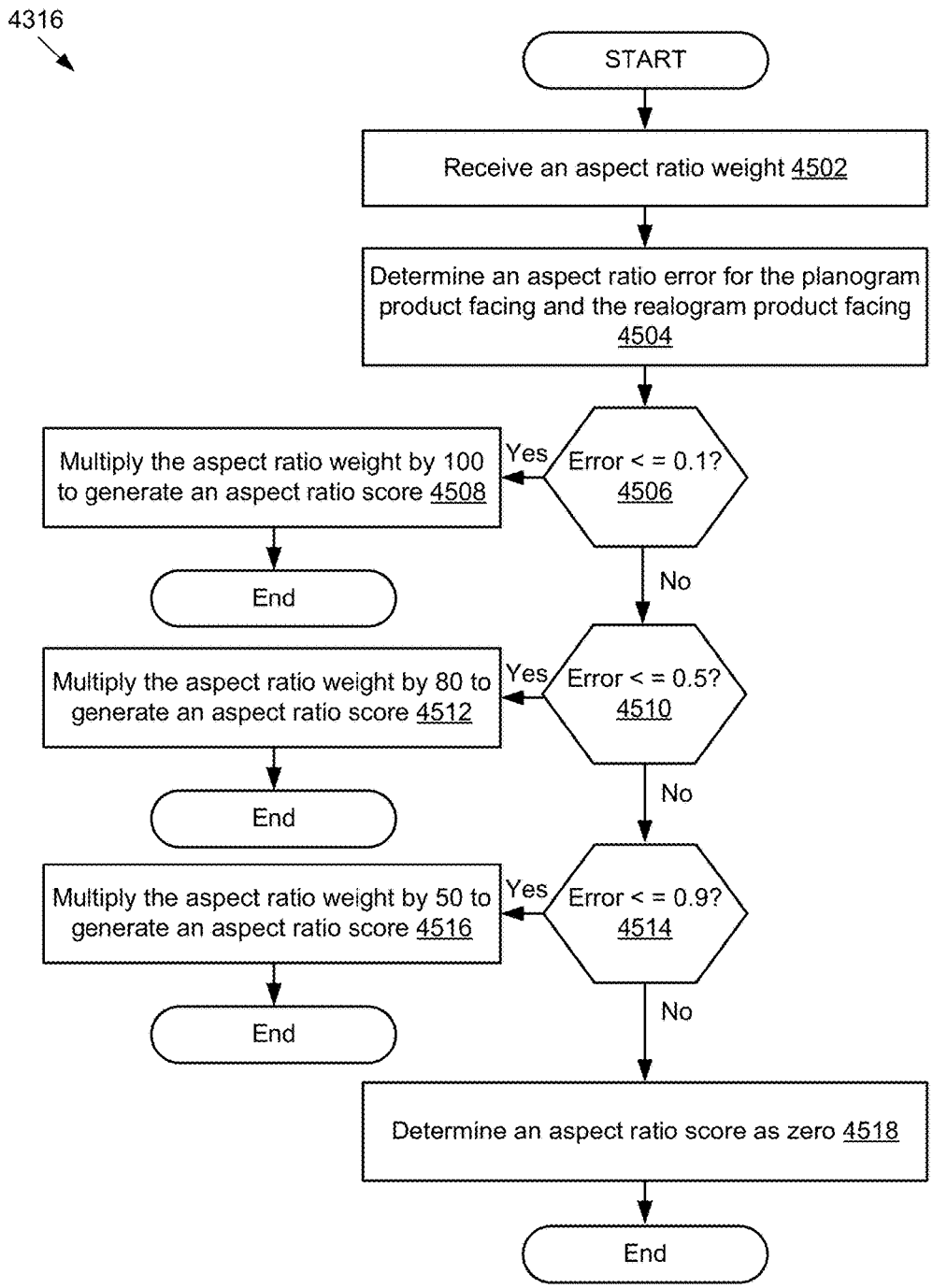
FIG. 45 is a flow diagram of an embodiment of a method for comparing the aspect ratio of a planogram product facing and a realogram product facing.

FIG. 45 is a flow diagram of an embodiment of a method 4316 for comparing the aspect ratio of a planogram product facing and a realogram product facing. At 4502, the alignment module 219 receives an aspect ratio weight. At 4504, the alignment module 219 determines an aspect ratio error for the planogram product facing and the realogram product facing. At 4506, the alignment module 219 determines whether the aspect ratio error is less than 0.1. If the aspect ratio error is less than or equal to 0.1, at 4508, the alignment module 219 multiplies the aspect ratio weight by 100 to generate an aspect ratio score. If the aspect ratio error is greater than 0.1, at 4510, the alignment module 219 determines whether the aspect ratio error is less than or equal to 0.5. If the aspect ratio error is less than or equal to 0.5, at 4512, the alignment module 219 multiplies the aspect ratio weight by 80 to generate an aspect ratio score. If the aspect ratio error is greater than 0.5, at 4514, the alignment module 219 determines whether the aspect ratio error is less than or equal to 0.9. If the aspect ratio error is less than or equal to 0.9, at 4516, the alignment module 219 multiplies the aspect ratio weight by 50 to generate an aspect ratio score. If the aspect ratio error is greater than 0.9, at 4518, the alignment module 219 determines the aspect ratio score as zero.

Figure 46:
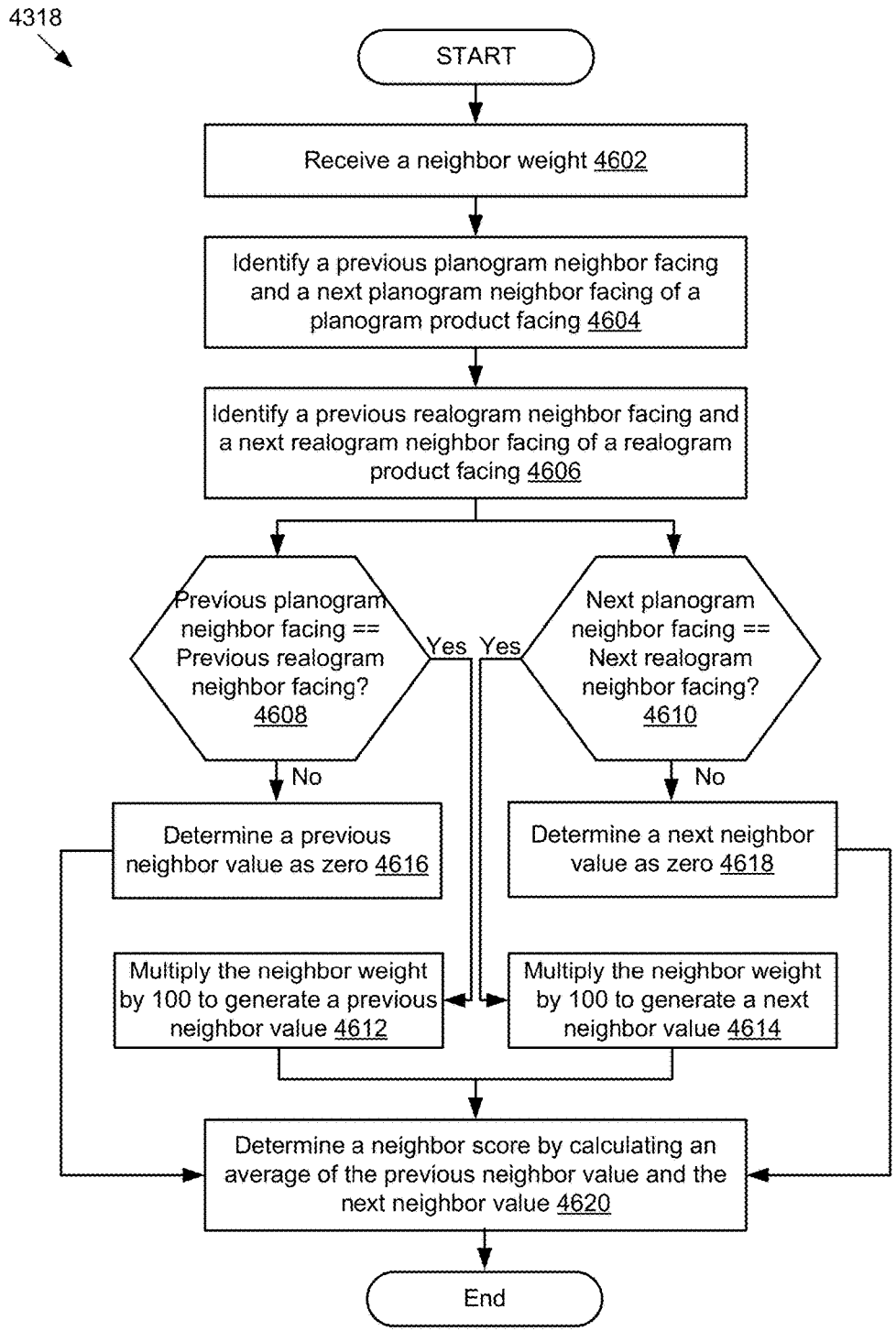
FIG. 46 is a flow diagram of an embodiment of a method for comparing the neighboring product facings of the planogram product facing and the realogram product facing.

FIG. 46 is a flow diagram of an embodiment of a method 4318 for comparing the neighboring product facings of the planogram product facing and the realogram product facing. At 4602, the alignment module 219 receives a neighbor weight. At 4604, the alignment module 219 identifies a previous planogram neighbor facing and a next planogram neighbor facing of a planogram product facing. At 4606, the alignment module 219 identifies a previous realogram neighbor facing and a next realogram neighbor facing of a realogram product facing. For example, the alignment module 219 identifies the UPCs of the neighbor product facings.

At 4608, the alignment module 219 determines whether the previous neighbor product facings of the planogram product facing and the realogram product facing match with each other. If they match, at 4612, the alignment module 219 multiplies the neighbor weight by 100 to generate a previous neighbor value. If they do not match, at 4616, the alignment module 219 determines the previous neighbor value as zero.

At 4610, the alignment module 219 determines whether the next neighbor product facings of the planogram product facing and the realogram product facing match with each other. If they match, at 4614, the alignment module 219 multiplies the neighbor weight by 100 to generate a next neighbor value. If they do not match, at 4618, the alignment module 219 determines the next neighbor value as zero. At 4620, the alignment module 219 determines a neighbor score by calculating an average of the previous neighbor value and the next neighbor value.

Figure 47:
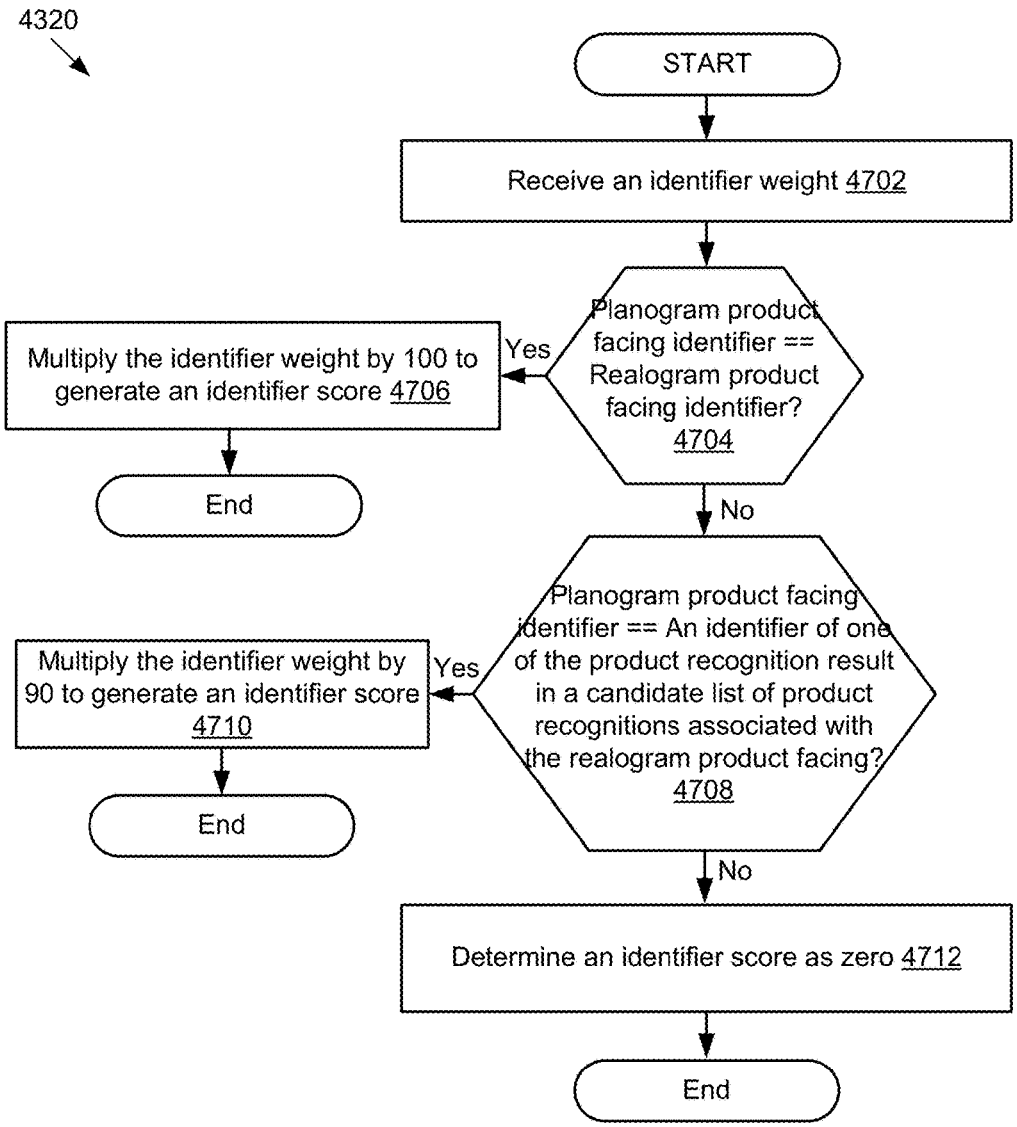
FIG. 47 is a flow diagram of an embodiment of a method for comparing an identifier of the planogram product facing and the realogram product facing.

FIG. 47 is a flow diagram of an embodiment of a method 4320 for comparing an identifier of the planogram product facing and the realogram product facing. At 4702, the alignment module 219 receives an identifier weight. At 4704, the alignment module 219 determines whether the identifier of the planogram product facing matches the identifier of the realogram product facing. If there is an identifier match between the planogram product facing and the realogram product facing, at 4706, the alignment module 219 multiplies the identifier weight by 100 to generate an identifier score. If there is no identifier match between the planogram product facing and the realogram product facing, at 4708, the alignment module 219 determines whether the identifier of the planogram product facing matches the identifier of one of the product recognitions in a candidate list associated with the realogram product facing. If an identifier of one of the product recognitions matches the identifier of the planogram product facing, at 4710, the alignment module 219 multiplies the identifier weight by 90 to generate an identifier score. If there is no match with the identifier of one of the product recognitions, at 4712, the alignment module 219 determines the identifier score as zero.

Figure 48A:
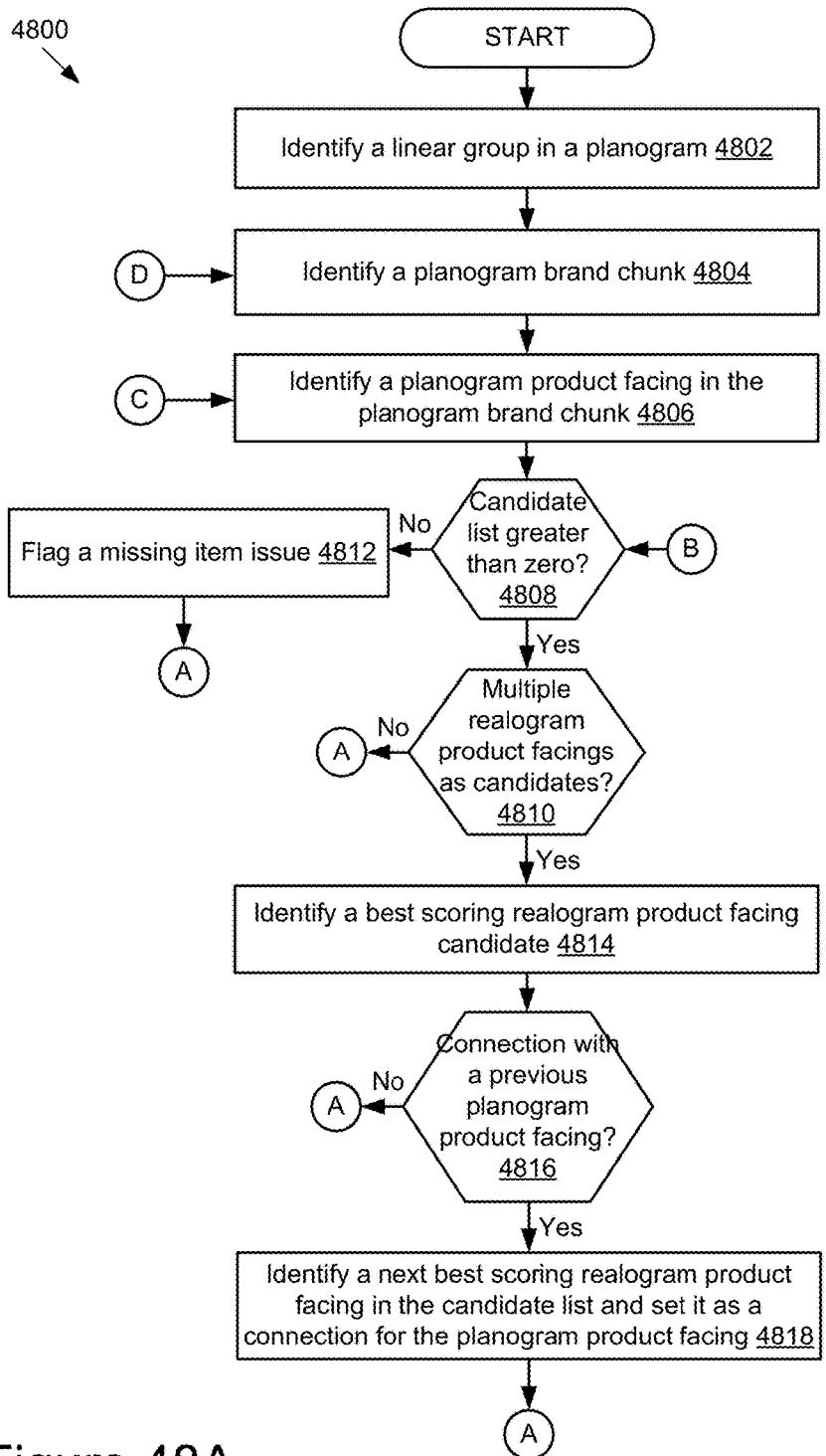
FIGS. 48A and 48B are flow diagrams of an embodiment of a method for resolving a duplicate connection from multiple planogram product facings to a realogram product facing.
Figure 48B:
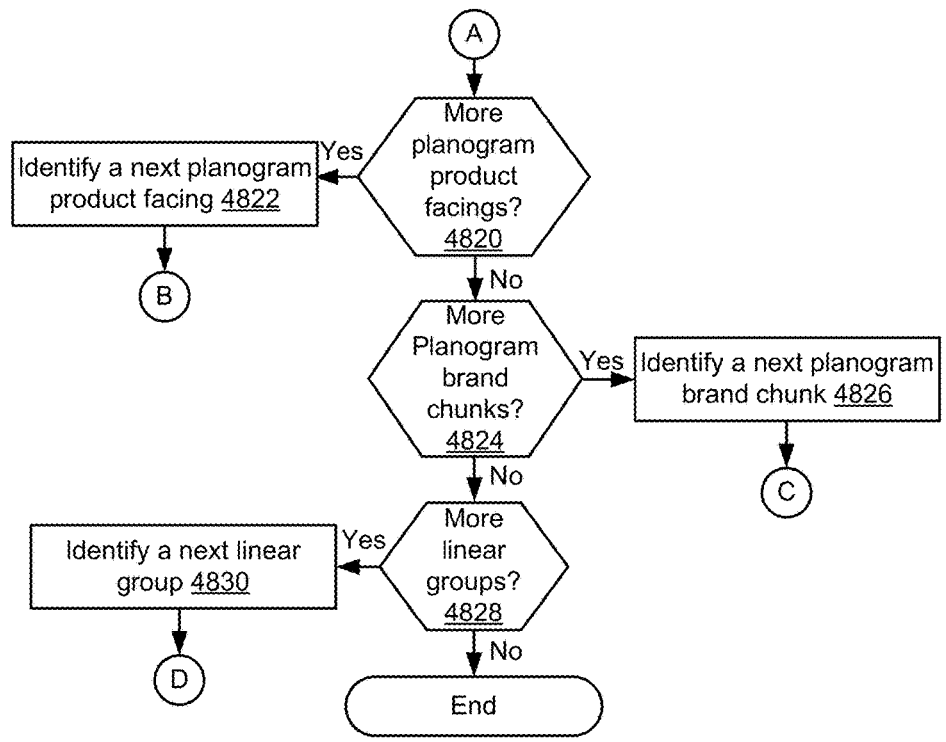

FIGS. 48A and 48B are flow diagrams of an embodiment of a method 4800 for resolving a duplicate connection from multiple planogram product facings to a realogram product facing. At 4802, the alignment module 219 identifies a linear group in a planogram. At 4804, the alignment module 219 identifies a planogram brand chunk. At 4806, the alignment module 219 identifies a planogram product facing in the planogram brand chunk. At 4808, the alignment module 219 determines whether the candidate list of realogram product facings as connections for the planogram product facing is greater than zero.

If the candidate list is not empty, at 4810, the alignment module 219 determines whether there are multiple realogram product facings as candidates in the candidate list. If there are multiple realogram product facings as candidates, at 4814, the alignment module 219 identifies a best scoring realogram product facing candidate for the planogram product facing from the candidate list. If there are no multiple realogram product facings as candidates, the method 4800 moves the process ahead at 4820. If the candidate list is empty, at 4812, the alignment module 219 flags a missing item issue and the method 4800 moves the process ahead at 4820.

At 4816, the alignment module 219 determines whether the best scoring realogram product facing is in a connection with a previous planogram product facing. If there is a connection with the previous planogram product facing, at 4818, the alignment module 219 identifies a next best scoring realogram product facing in the candidate list and sets the next best scoring realogram product facing as a new connection for the planogram product facing. If there is no connection between the best scoring realogram product facing and the previous planogram product facing, the method 4800 moves the process ahead at 4820.

At 4820, the alignment module 219 determines whether there are more planogram product facings in the planogram brand chunk. If there are more planogram product facings, at 4822, the alignment module 219 identifies a next planogram product facing and the method 4800 repeats the process at 4808. If there are no more planogram product facings, at 4824, the alignment module 219 determines whether there are more planogram brand chunks in the linear group. If there are more planogram brand chunks, at 4826, the alignment module 219 identifies a next planogram brand chunk and the method 4800 repeats the process at 4806. If there are no more planogram brand chunks, at 4828, the alignment module 219 determines whether there are more linear groups. If there are more linear groups, at 4830, the alignment module 219 identifies a next linear group and the method 4800 repeats the process at 4804. If there are no more linear groups, the method 4800 ends.

Figure 49:
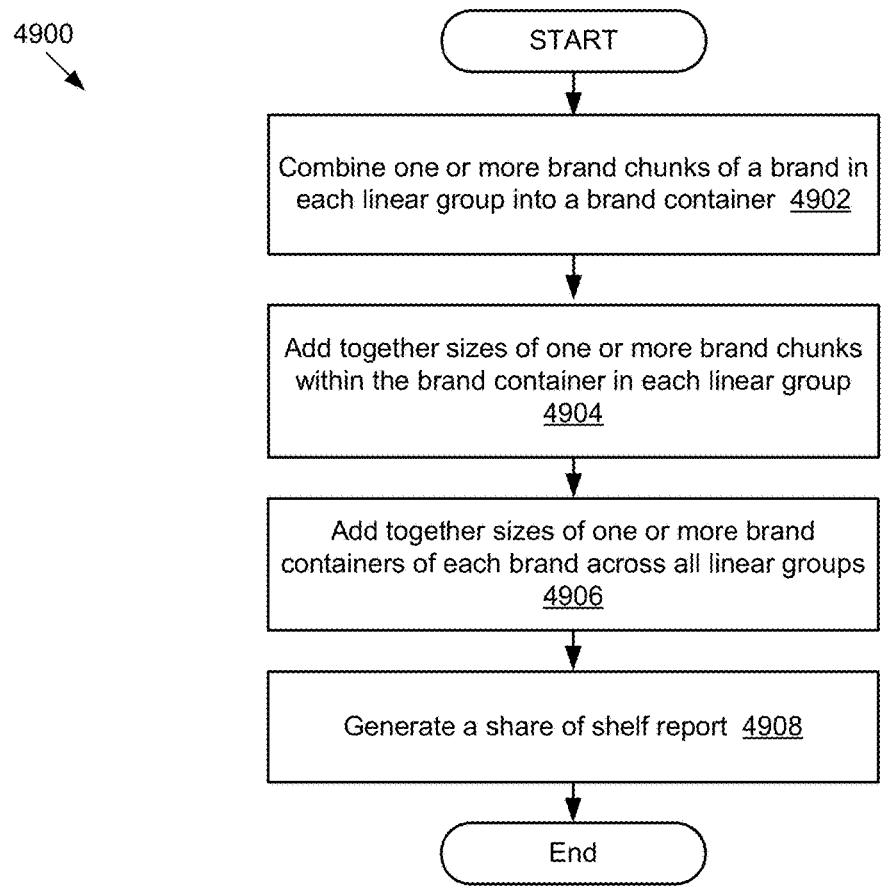
FIG. 49 is a flow diagram of an embodiment of a method for generating a share of shelf report.

FIG. 49 is a flow diagram of an embodiment of a method 4900 for generating a share of shelf report. At 4902, the analytics module 221 combines one or more brand chunks of a brand in each linear group into a brand container. At 4904, the analytics module 221 adds together sizes of one or more brand chunks within the brand container in each linear group. At 4906, the analytics module 221 adds together sizes of one or more brand containers of each brand across all linear groups. At 4908, the analytics module 221 generates a share of shelf report.

Figure 50:
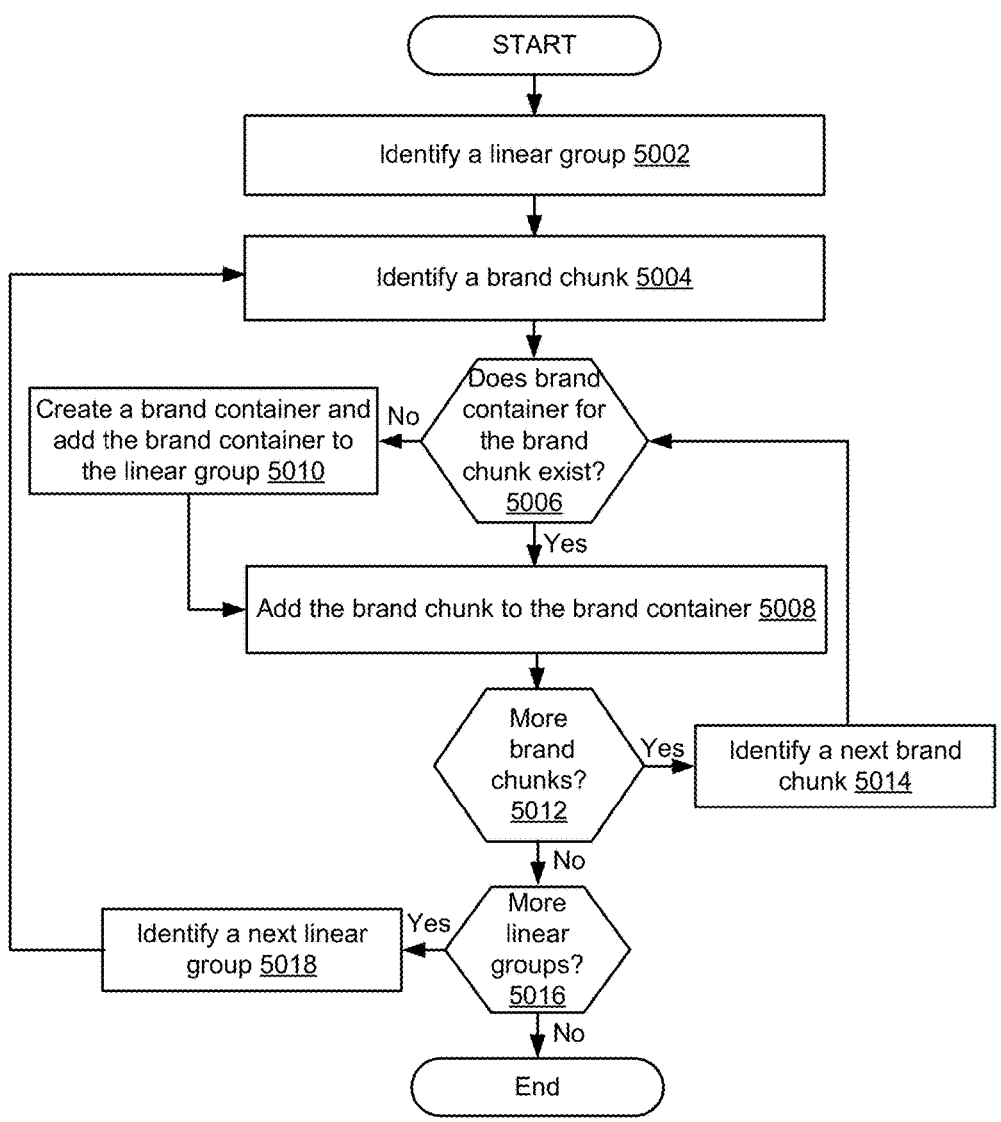
FIG. 50 is a flow diagram of an embodiment of a method for consolidating brand chunks into brand containers.

FIG. 50 is a flow diagram of an embodiment of a method 4902 for consolidating brand chunks into brand containers. At 5002, the analytics module 221 identifies a linear group. At 5004, the analytics module 221 identifies a brand chunk. At 5006, the analytics module 221 determines whether a brand container for the brand chunk exists. If the brand container exists, at 5008, the analytics module 221 adds the brand chunk to the brand container. If the brand container does not exist, at 5010, the analytics module 221 creates a brand container and adds the brand container to the linear group and the method 4902 moves the process ahead at 5008. At 5012, the analytics module 221 determines whether there are more brand chunks. If there are more brand chunks, at 5014, the analytics module 221 identifies a next brand chunk and the method 4902 repeats the process at 5006. If there are no more brand chunks, at 5016, the analytics module 221 determines whether there are more linear groups. If there are more linear groups, at 5018, the analytics module 221 identifies a next linear group and the method 4902 repeats the process at 5004. If there are no more linear groups, the method 4902 ends.

Figure 51:
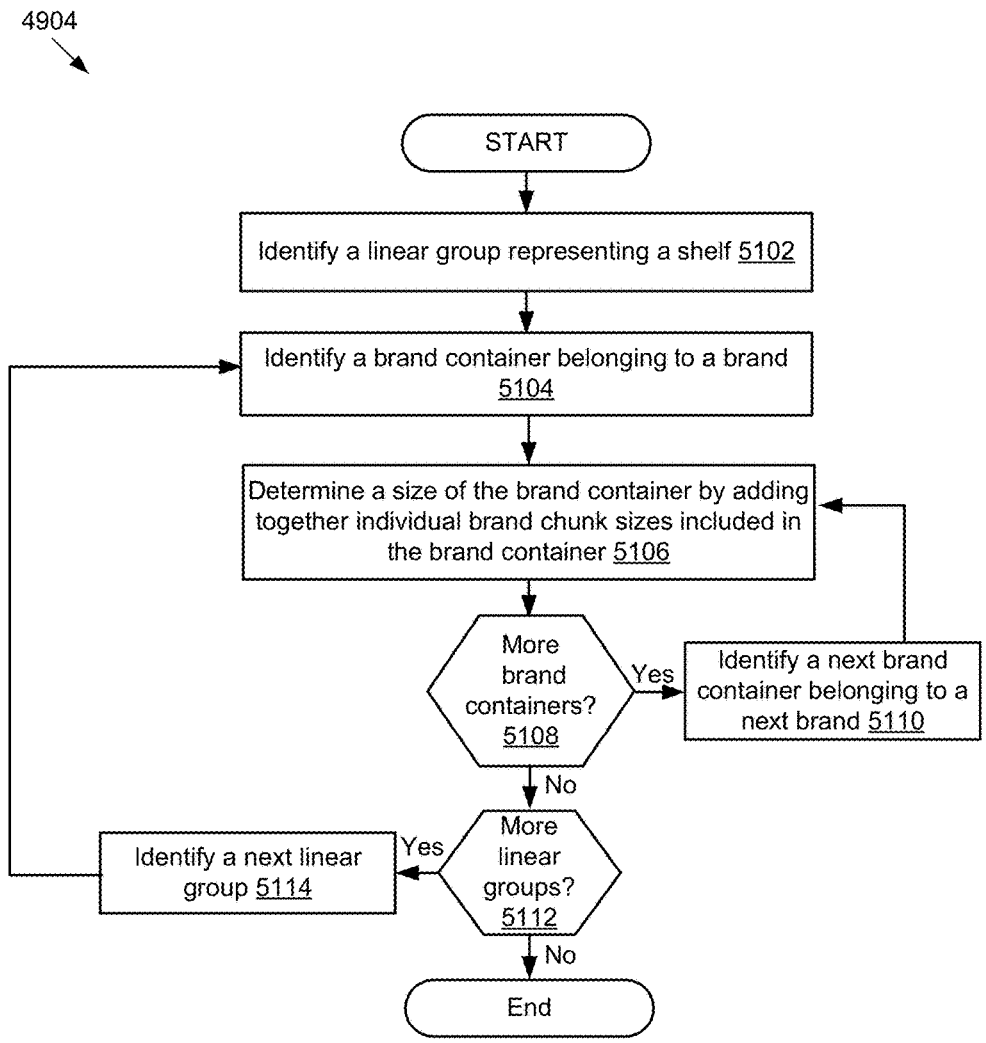
FIG. 51 is a flow diagram of an embodiment of a method for adding together sizes of brand chunks in a brand container.

FIG. 51 is a flow diagram of an embodiment of a method 4904 for adding together sizes of brand chunks in a brand container. At 5102, the analytics module 221 identifies a linear group representing a shelf. At 5104, the analytics module 221 identifies a brand container belonging to a brand. At 5106, the analytics module 221 determines a size of the brand container by adding together individual brand chunk sizes included in the brand container. At 5108, the analytics module 221 determines whether there are more brand containers. If there are more brand containers, at 5110, the analytics module 221 identifies a next brand container belonging to a next brand and the method 4904 repeats the process at 5106. If there are no more brand containers, at 5112, the analytics module 221 determines whether there are more linear groups. If there are more linear groups, at 5114, the analytics module 221 identifies a next linear group and the method 4904 repeats the process at 5104. If there are no more linear groups, the method 4904 ends.

Figure 52:
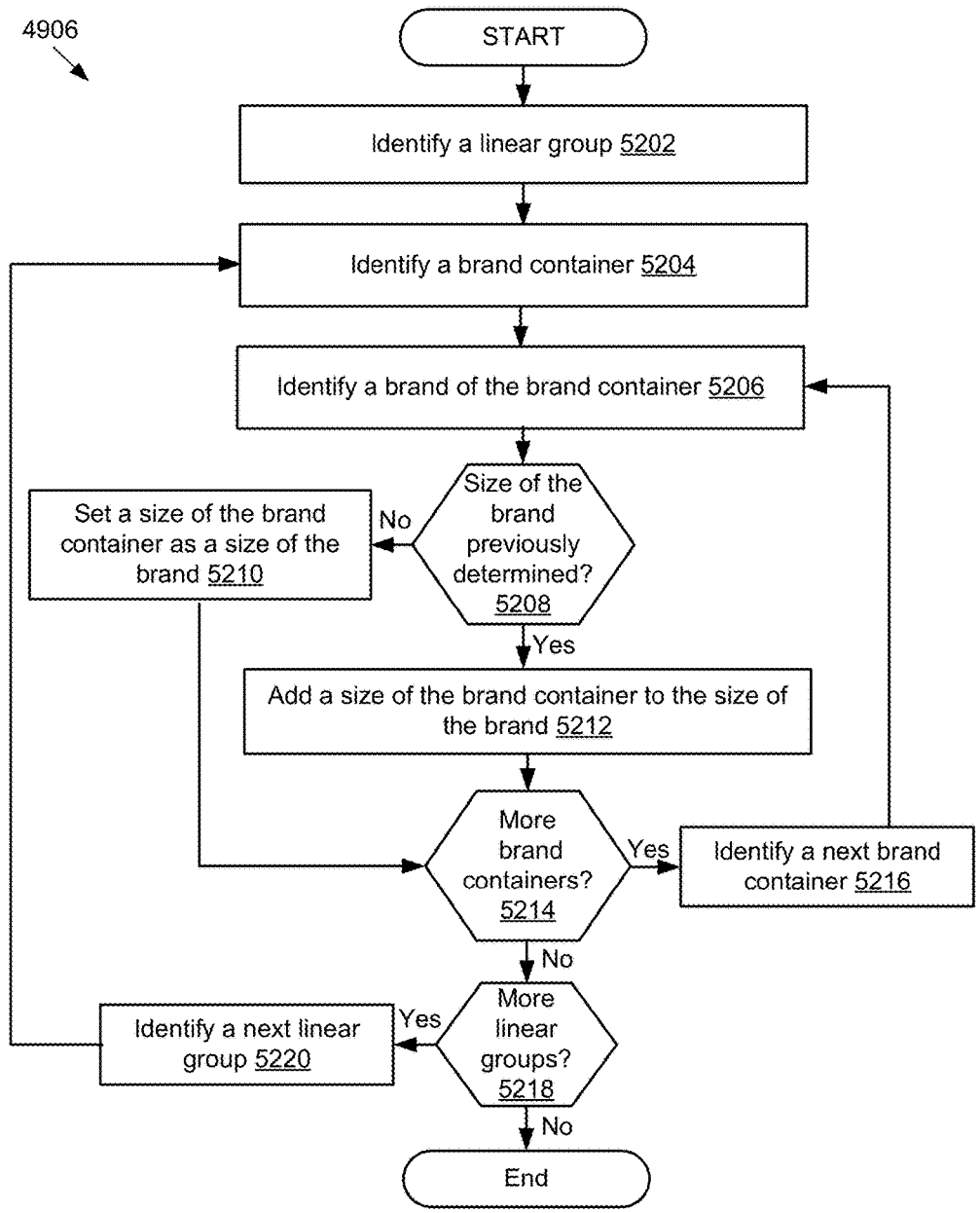
FIG. 52 is a flow diagram of an embodiment of a method for adding together sizes of brand containers of a brand across all linear groups.

FIG. 52 is a flow diagram of an embodiment of a method 4906 for adding together sizes of brand containers of a brand across all linear groups. At 5202, the analytics module 221 identifies a linear group. At 5204, the analytics module 221 identifies a brand container. At 5206, the analytics module 221 identifies a brand of the brand container. At 5208, the analytics module 221 determines whether a size of the brand has previously been determined. If the size has previously been determined, at 5212, the analytics module 221 adds a size of the brand container to the size of the brand. If the size has not previously been determined, at 5210, the analytics module 221 sets a size of the brand container as a size of the brand and the method 4906 moves the process ahead at 5214

At 5214, the analytics module 221 determines whether there are more brand containers. If there are more brand containers, at 5216, the analytics module 221 identifies a next brand container and the method 4906 repeats the process at 5206. If there are no more brand containers, at 5218, the analytics module 221 determines whether there are more linear groups. If there are more linear groups, at 5220, the analytics module 221 identifies a next linear group and the method 4906 repeats the process at 5204. If there are no more linear groups, the method 4906 ends.

A system and method for classifying conditions of a data stream of object information and generating suggestion based on a condition has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, by one or more processors, a realogram from a client device, the realogram including information about product recognitions in the realogram;
   receiving, by the one or more processors, a planogram corresponding to the realogram;
   generating, by the one or more processors, a planogram brand chunk in the planogram, the planogram brand chunk grouping a plurality of planogram product facings belonging to a same brand;
   generating, by the one or more processors, a realogram brand chunk in the realogram based on the planogram brand chunk;
   identifying, by the one or more processors, a planogram product facing in the planogram brand chunk;
   identifying, by the one or more processors, a realogram product facing in the realogram brand chunk;
   comparing, by the one or more processors, one or more of an index position, an aspect ratio, an identifier, and a neighboring product facing of the planogram product facing in the planogram brand chunk and the realogram product facing in the realogram brand chunk;
   determining, by the one or more processors, whether a score computed based on comparing one or more of the index position, the aspect ratio, the identifier, and the neighboring product facing of the planogram product facing in the planogram brand chunk and the realogram product facing in the realogram brand chunk satisfies a threshold; and
   aligning, by the one or more processors, the planogram product facing with the realogram product facing based on the score satisfying the threshold.

2. The method of claim 1, wherein generating the planogram brand chunk comprises:
   identifying a first planogram product facing on a shelf of the planogram;
   determining a brand of the first planogram product facing;
   determining whether the brand is matching an existing planogram brand chunk;
   responsive to determining the brand is matching the existing planogram brand chunk, adding the first planogram product facing to the existing planogram brand chunk; and
   responsive to determining the brand is not matching the existing planogram brand chunk, creating a new planogram brand chunk and adding the first planogram product facing to the new planogram brand chunk.

3. The method of claim 1, wherein generating the realogram brand chunk comprises:
   creating an identical copy of the planogram brand chunk;
   storing the identical copy of the planogram brand chunk in a corresponding shelf of the realogram as the realogram brand chunk; and
   refining the realogram brand chunk based on analyzing a plurality of realogram product facings identified within the realogram brand chunk.

4. The method of claim 1, wherein generating the score comprises:
   comparing the index position of the planogram product facing in the planogram brand chunk and the realogram product facing in the realogram brand chunk to generate an index score;
   comparing the aspect ratio of the planogram product facing and the realogram product facing to generate an aspect ratio score;
   comparing neighboring product facings of the planogram product facing and the realogram product facing to generate a neighbor score;
   comparing the identifier of the planogram product facing and the realogram product facing to generate an identifier score; and
   determining the score as an average of the index score, the aspect ratio score, the neighbor score, and the identifier score.

5. The method of claim 1, further comprising:
   determining a gap threshold for a shelf in the realogram;
   determining a distance between two realogram product facings on the shelf;
   determining whether the distance between the two realogram product facings satisfies the gap threshold;
   responsive to determining the distance between the two realogram product facings satisfies the gap threshold:
      creating a gap facing;
      classifying the gap facing; and
      inserting the gap facing into the shelf between the two realogram product facings.

6. The method of claim 5, wherein classifying the gap facing comprises:
  preprocessing an image of the gap facing by cropping edges and setting alpha values of a plurality of pixels in the image of the gap facing to one;
  processing the image of the gap facing using a corner detection filter, an edge detection filter, and a bright color filter;
  determining whether at least two of the corner detection filter, the edge detection filter, and the bright color filter indicate a presence of product like features in the gap facing; and
  responsive to determining that at least two of the corner detection filter, the edge detection filter, and the bright color filter indicate the presence of product like features, classifying the gap facing as containing an unrecognized product facing.

7. The method of claim 6, further comprising, responsive to determining that fewer than two of the corner detection filter, the edge detection filter, and the bright color filter indicate the presence of product like features, classifying the gap facing as containing a hole.

8. A system comprising:
  one or more processors; and
  a memory, the memory storing instructions, which when executed cause the one or more processors to:
    receive a realogram from a client device, the realogram including information about product recognitions in the realogram;
    receive a planogram corresponding to the realogram;
    generate a planogram brand chunk in the planogram, the planogram brand chunk grouping a plurality of planogram product facings belonging to a same brand;
    generate a realogram brand chunk in the realogram based on the planogram brand chunk;
    identify a planogram product facing in the planogram brand chunk;
    identify a realogram product facing in the realogram brand chunk;
    compare one or more of an index position, an aspect ratio, an identifier, and a neighboring product facing of the planogram product facing in the planogram brand chunk and the realogram product facing in the realogram brand chunk;
    determine whether a score computed based on comparing one or more of the index position, the aspect ratio, the identifier, and the neighboring product facing of the planogram product facing in the planogram brand chunk and the realogram product facing in the realogram brand chunk satisfies a threshold; and
    align the planogram product facing with the realogram product facing based on the score satisfying the threshold.

9. The system of claim 8, wherein to generate the planogram brand chunk, the instructions cause the one or more processors to:
  identify a first planogram product facing on a shelf of the planogram;
  determine a brand of the first planogram product facing;
  determine whether the brand is matching an existing planogram brand chunk;
  responsive to determining the brand is matching the existing planogram brand chunk, add the first planogram product facing to the existing planogram brand chunk; and
  responsive to determining the brand is not matching the existing planogram brand chunk, create a new planogram brand chunk and add the first planogram product facing to the new planogram brand chunk.

10. The system of claim 8, wherein to generate the realogram brand chunk, the instructions cause the one or more processors to:
  create an identical copy of the planogram brand chunk;
  store the identical copy of the planogram brand chunk in a corresponding shelf of the realogram as the realogram brand chunk; and
  refine the realogram brand chunk based on analyzing a plurality of realogram product facings identified within the realogram brand chunk.

11. The system of claim 8, wherein to generate the score, the instructions cause the one or more processors to:
  compare the index position of the planogram product facing in the planogram brand chunk and the realogram product facing in the realogram brand chunk to generate an index score;
  compare the aspect ratio of the planogram product facing and the realogram product facing to generate an aspect ratio score;
  compare neighboring product facings of the planogram product facing and the realogram product facing to generate a neighbor score;
  compare the identifier of the planogram product facing and the realogram product facing to generate an identifier score; and
  determine the score as an average of the index score, the aspect ratio score, the neighbor score, and the identifier score.

12. The system of claim 8, wherein the instructions cause the one or more processors to:
  determine a gap threshold for a shelf in the realogram;
  determine a distance between two realogram product facings on the shelf;
  determine whether the distance between the two realogram product facings satisfies the gap threshold;
  responsive to determining the distance between the two realogram product facings satisfies the gap threshold:
    create a gap facing;
    classify the gap facing; and
    insert the gap facing into the shelf between the two realogram product facings.

13. The system of claim 12, wherein to classify the gap facing, the instructions cause the one or more processors to:
  preprocess an image of the gap facing by cropping edges and setting alpha values of a plurality of pixels in the image of the gap facing to one;
  process the image of the gap facing using a corner detection filter, an edge detection filter, and a bright color filter;
  determine whether at least two of the corner detection filter, the edge detection filter, and the bright color filter indicate a presence of product like features in the gap facing; and
  responsive to determining that at least two of the corner detection filter, the edge detection filter, and the bright color filter indicate the presence of product like features, classify the gap facing as containing an unrecognized product facing.

14. The system of claim 13, wherein the instructions cause the one or more processors to, responsive to determining that fewer than two of the corner detection filter, the edge detection filter, and the bright color filter indicate the presence of product like features, classify the gap facing as containing a hole.

15. A computer program product comprising a non-transitory computer readable medium storing a computer readable program, wherein the computer readable program when executed on a computer causes the computer to:
receive a realogram from a client device, the realogram including information about product recognitions in the realogram;
receive a planogram corresponding to the realogram;
generate a planogram brand chunk in the planogram, the planogram brand chunk grouping a plurality of planogram product facings belonging to a same brand;
generate a realogram brand chunk in the realogram based on the planogram brand chunk;
identify a planogram product facing in the planogram brand chunk;
identify a realogram product facing in the realogram brand chunk;
compare one or more of an index position, an aspect ratio, an identifier, and a neighboring product facing of the planogram product facing in the planogram brand chunk and the realogram product facing in the realogram brand chunk;
determine whether a score computed based on comparing one or more of the index position, the aspect ratio, the identifier, and the neighboring product facing of the planogram product facing in the planogram brand chunk and the realogram product facing in the realogram brand chunk satisfies a threshold; and
align the planogram product facing with the realogram product facing based on the score satisfying the threshold.

16. The computer program product of claim 15, wherein to generate the planogram brand chunk the computer readable program when executed on the computer further causes the computer to:
identify a first planogram product facing on a shelf of the planogram;
determine a brand of the first planogram product facing;
determine whether the brand is matching an existing planogram brand chunk;
responsive to determining the brand is matching the existing planogram brand chunk, add the first planogram product facing to the existing planogram brand chunk; and
responsive to determining the brand is not matching the existing planogram brand chunk, create a new planogram brand chunk and add the first planogram product facing to the new planogram brand chunk.

17. The computer program product of claim 15, wherein to generate the realogram brand chunk the computer readable program when executed on the computer further causes the computer to:
create an identical copy of the planogram brand chunk;
store the identical copy of the planogram brand chunk in a corresponding shelf of the realogram as the realogram brand chunk; and
refine the realogram brand chunk based on analyzing a plurality of realogram product facings identified within the realogram brand chunk.

18. The computer program product of claim 15, wherein to generate the score, the computer readable program when executed on the computer further causes the computer to:
compare the index position of the planogram product facing in the planogram brand chunk and the realogram product facing in the realogram brand chunk to generate an index score;
compare the aspect ratio of the planogram product facing and the realogram product facing to generate an aspect ratio score;
compare neighboring product facings of the planogram product facing and the realogram product facing to generate a neighbor score;
compare the identifier of the planogram product facing and the realogram product facing to generate an identifier score; and
determine the score as an average of the index score, the aspect ratio score, the neighbor score, and the identifier score.

19. The computer program product of claim 15, wherein the computer readable program when executed on the computer further causes the computer to:
determine a gap threshold for a shelf in the realogram;
determine a distance between two realogram product facings on the shelf;
determine whether the distance between the two realogram product facings satisfies the gap threshold;
responsive to determining the distance between the two realogram product facings satisfies the gap threshold:
create a gap facing;
classify the gap facing; and
insert the gap facing into the shelf between the two realogram product facings.

20. The computer program product of claim 19, wherein to classify the gap facing, the computer readable program when executed on the computer causes the computer to:
preprocess an image of the gap facing by cropping edges and setting alpha values of a plurality of pixels in the image of the gap facing to one;
process the image of the gap facing using a corner detection filter, an edge detection filter, and a bright color filter;
determine whether at least two of the corner detection filter, the edge detection filter, and the bright color filter indicate a presence of product like features in the gap facing;
responsive to determining that at least two of the corner detection filter, the edge detection filter, and the bright color filter indicate the presence of product like features, classify the gap facing as containing an unrecognized product facing; and
responsive to determining that fewer than two of the corner detection filter, the edge detection filter, and the bright color filter indicate the presence of product like features, classify the gap facing as containing a hole.

* * * * *